(12) United States Patent
Guo

(10) Patent No.: US 12,382,163 B2
(45) Date of Patent: Aug. 5, 2025

(54) SHOOTING METHOD AND RELATED DEVICE

(71) Applicant: Honor Device Co., Ltd., Shenzhen (CN)

(72) Inventor: Jinning Guo, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 18/554,133

(22) PCT Filed: May 5, 2023

(86) PCT No.: PCT/CN2023/092193
§ 371 (c)(1),
(2) Date: Oct. 5, 2023

(87) PCT Pub. No.: WO2024/007715
PCT Pub. Date: Jan. 11, 2024

(65) Prior Publication Data
US 2025/0080831 A1   Mar. 6, 2025

(30) Foreign Application Priority Data
Jul. 6, 2022   (CN) .......................... 202210788481.1

(51) Int. Cl.
*H04N 23/63* (2023.01)
*H04N 23/60* (2023.01)
(Continued)

(52) U.S. Cl.
CPC ........... *H04N 23/632* (2023.01); *H04N 23/64* (2023.01); *H04N 23/667* (2023.01); *H04N 23/69* (2023.01)

(58) Field of Classification Search
CPC ........ H04N 23/64; H04N 23/62; H04N 23/69; H04N 23/611; H04N 23/667; H04N 23/90;
(Continued)

(56) References Cited

U.S. PATENT DOCUMENTS 6,430,367 B1   8/2002   Koike et al.
7,693,413 B2   4/2010   Sueyoshi et al.
(Continued)

FOREIGN PATENT DOCUMENTS

CN   1901672 A   1/2007
CN   101553707 A   10/2009
(Continued)

OTHER PUBLICATIONS

Along., "Photo magic—dual rear camera phone shopping guide," Computer knowledge and technology, 2017, 11 pages, with English Abstract.

*Primary Examiner* — Pritham D Prabhakher
(74) *Attorney, Agent, or Firm* — Conley Rose, P.C.

(57) ABSTRACT

A shooting method and a related device. An electronic device may adjust a human face proportion in a rear-facing viewfinder frame using a human face proportion in a front-facing viewfinder frame as a reference, or adjust a human face proportion in a front-facing viewfinder frame using a human face proportion in a rear-facing viewfinder frame as a reference. The electronic device may further implement collaborative zoom of front-facing and rear-facing cameras, to collaboratively zoom in or zoom out pictures in the front-facing and rear-facing viewfinder frames. In this manner, a shooting preparation time can be reduced, and human face proportions in front-facing and rear-facing viewfinder frames in a dual-view recording mode can be adjusted more quickly and simply, to make the human face proportions in the front-facing and rear-facing viewfinder frames consis- (Continued)

tent, so that a video meeting expectations of a user is obtained.

20 Claims, 23 Drawing Sheets

(51) Int. Cl.
  *H04N 23/667* (2023.01)
  *H04N 23/69* (2023.01)
(58) Field of Classification Search
  CPC .... H04N 23/632; H04N 23/63; H04N 23/631; H04N 23/45; H04N 5/772; H04N 5/2624; G06V 40/166; G06F 3/04845; G06F 3/04847; G06F 9/451; G06F 1/1686; G06F 2203/04803; G06N 3/08; G06N 3/04; H04M 1/72403; H04M 2250/52
  USPC ...................................................... 348/240.2
  See application file for complete search history.

(56) References Cited

U.S. PATENT DOCUMENTS

| | | | |
|---|---|---|---|
| 8,031,331 B2 | 10/2011 | Meier et al. | |
| 9,602,732 B2* | 3/2017 | Mäkinen | H04R 5/027 |
| 10,404,921 B2* | 9/2019 | Makinen | H04N 23/667 |
| 11,310,433 B1* | 4/2022 | Huffman | H04N 23/69 |
| 11,765,463 B2* | 9/2023 | Li | H04N 23/631 |
| | | | 348/207.99 |
| 2012/0120186 A1* | 5/2012 | Diaz | H04N 23/63 |
| | | | 348/E13.001 |
| 2014/0184854 A1 | 7/2014 | Musatenko | |
| 2014/0240543 A1* | 8/2014 | Kim | H04N 5/272 |
| | | | 348/262 |
| 2015/0237268 A1* | 8/2015 | Vaiaoga | H04N 23/90 |
| | | | 348/218.1 |
| 2015/0326793 A1* | 11/2015 | Mäkinen | H04N 23/69 |
| | | | 348/240.99 |
| 2016/0156838 A1 | 6/2016 | Cheng et al. | |
| 2017/0289462 A1 | 10/2017 | Eum | |
| 2018/0063434 A1* | 3/2018 | Seol | G06V 40/197 |
| 2018/0196472 A1* | 7/2018 | Lee | H04N 5/772 |
| 2019/0028652 A1 | 1/2019 | Park | |
| 2019/0037205 A1 | 1/2019 | Itoh et al. | |
| 2020/0120269 A1* | 4/2020 | Shirmohamadi | G06F 3/04845 |
| 2021/0405828 A1* | 12/2021 | Jiang | G06Q 30/0633 |
| 2022/0159183 A1 | 5/2022 | Li et al. | |
| 2022/0303476 A1* | 9/2022 | Jang | H04N 5/2628 |
| 2022/0417433 A1 | 12/2022 | Wei | |
| 2023/0156144 A1 | 5/2023 | Cui | |
| 2023/0185518 A1 | 6/2023 | Yang et al. | |

FOREIGN PATENT DOCUMENTS

| | | |
|---|---|---|
| CN | 102938825 A | 2/2013 |
| CN | 103685957 A | 3/2014 |
| CN | 104469178 A | 3/2015 |
| CN | 111147755 A | 5/2020 |
| CN | 112672174 A | 4/2021 |
| CN | 112954218 A | 6/2021 |
| CN | 113422903 A | 9/2021 |
| CN | 113542581 A | 10/2021 |
| CN | 113573120 A | 10/2021 |
| CN | 114268741 A | 4/2022 |
| CN | 114500901 A | 5/2022 |
| CN | 114845059 A | 8/2022 |
| DE | 60025962 T2 | 4/2006 |
| JP | 2013013145 A | 1/2013 |
| WO | 2021244368 A1 | 12/2021 |
| WO | 2022057723 A1 | 3/2022 |

* cited by examiner

CONT. FROM
FIG. 3A

S307: The electronic device determines a target zoom ratio based on the proportion C1 and the proportion C2, and adjust the zoom ratio of the front-facing camera or the rear-facing camera based on the target zoom ratio S308: The electronic device displays a preview interface B2, where the preview interface B2 includes an image I3 and an image I4, the image I3 is displayed in a front-facing viewfinder frame, and the image I4 is displayed in a rear-facing viewfinder frame; and an absolute value of a difference between the proportion C3 and the proportion C4 is less than the threshold D2, the proportion C3 is a proportion of a human face in the image I3 to the image I3, the proportion C4 is a proportion of a human face in the image I4 to the image I4, and the threshold D2 is less than the threshold D1

S309: The electronic device collaboratively adjusts the zoom ratios of the front-facing camera and the rear-facing camera in response to an operation A3, and displays a preview interface B3, where the preview interface B3 includes an image I5 and an image I6; the image I5 is displayed in a front-facing viewfinder frame, and the image I6 is displayed in a rear-facing viewfinder frame; and an absolute value of a difference between a proportion difference E1 and a proportion difference E2 is less than a threshold D3, the proportion difference E1 is a difference between a proportion C5 and the proportion C3, the proportion difference E2 is the difference between the proportion C6 and the proportion C4, the proportion C5 is a proportion of a human face in the image I5 to the image I5, and the proportion C6 is a proportion of a human face in the image I6 to the image I6

FIG. 3B

SHOOTING METHOD AND RELATED DEVICE

CROSS-REFERENCE TO RELATED APPLICATIONS

This is a U.S. National Stage of International Application No. PCT/CN2023/092193 filed on May 5, 2023, which claims priority to Chinese Patent Application No. 202210788481.1, filed with the China National Intellectual Property Administration on Jul. 6, 2022, both of which are incorporated herein by reference in their entireties.

TECHNICAL FIELD

This application relates to the field of terminal technologies, and in particular to a shooting method and a related device.

BACKGROUND

With development of terminal technologies, terminals such as mobile phones can meet communication requirements of users and can provide users with a channel for obtaining outside information and a variety of entertainments. Videos are a common way of entertainment and information obtaining. Especially as short videos emerge and develop in recent years, people are paying increasing attention to video shooting and making, and shooting scenes become increasingly varied. For example, a plurality of cameras may be turned on simultaneously on terminals such as mobile phones to obtain images from different angles.

Dual-view recording is used as an example. A front-facing camera and a rear-facing camera may be turned on simultaneously to perform shooting, and images obtained by the front-facing camera and the rear-facing camera are displayed on a display of a terminal. A video obtained in this shooting mode includes both a video picture obtained based on the front-facing camera and a video picture obtained based on the rear-facing camera. However, the front-facing camera and the rear-facing camera have different device parameters and support different zoom effects and the like. As a result, the front-facing camera and the rear-facing camera have different angles of view. It means that if a human is present in a shooting scene, human face proportions (that is, human face proportions in front-facing and rear-facing viewfinder frames) in images obtained by the front-facing and rear-facing cameras are clearly different, and a shot video fails to meet expectations of a user. In this case, human face proportions displayed in front-facing and rear-facing viewfinder frames may be improved by performing rear zoom and manually adjusting a distance between the human in the shooting scene and the terminal. This mode requires adjustments by a user before shooting. Once a background is changed (for example, the terminal is moved to obtain a human on different backgrounds), the user needs to make adjustments again to perform shooting. This shooting mode requires complex operations and a lot of time and effort.

Therefore, how to quickly and simply adjust human face proportions in front-facing and rear-facing viewfinder frames in a dual-view recording mode to make the human face proportions in the front-facing and rear-facing viewfinder frames consistent is an urgent problem to be resolved currently.

SUMMARY

This application provides a shooting method and a related device. According to the shooting method, an electronic device may adjust a zoom ratio of a rear-facing camera based on a human face proportion in an image acquired with front-facing camera or adjust a zoom ratio of a front-facing camera based on a human face proportion in an image acquired with a rear-facing camera. The electronic device may further implement collaborative zoom of the front-facing camera and the rear-facing camera, that is, collaborative adjustment of zoom ratios of the front-facing camera and the rear-facing camera. In this manner, a user does not need to determine and specifically adjust a difference between human face proportions in images acquired with the front-facing camera the rear-facing camera. A shooting preparation time is greatly reduced, and zoom ratios of the front-facing camera and the rear-facing camera are adjusted more quickly and simply, to keep the human face proportions in the images acquired with the front-facing camera the rear-facing camera consistent, so that a video meeting expectations of a user is obtained.

According to a first aspect, this application provides a shooting method. The shooting method may be applied to an electronic device provided with a plurality of cameras. According to the shooting method, the electronic device may detect a first operation performed on a first control. The electronic device enters a dual-view recording mode in response to the first operation, and acquires images based on a first camera and a second camera. The electronic device may display a first interface. The first interface may include a first image and a second image. A proportion of a target object region in the first image to the first image is a first proportion, and a proportion of a target object region in the second image to the second image is a second proportion. An absolute value of a difference between the first proportion and the second proportion is a first value. After displaying the first interface, the electronic device may further display a second interface. The second interface may include a third image and a fourth image. A proportion of a target object region in the third image to the third image is a third proportion, and a proportion of a target object region in the fourth image to the fourth image is a fourth proportion. An absolute value of a difference between the third proportion and the fourth proportion is a second value. The first image and the third image are the images acquired by the electronic device based on the first camera. The second image and the fourth image are the images acquired by the electronic device based on the second camera. The second value is less than the first value.

In the solution provided in this application, after entering the dual-view recording mode, the electronic device may acquire images based on the first camera and the second camera, and in a case that a difference exists between proportions of a target object in the images acquired with the first camera and the second camera, the difference between the proportions of the target object in the images acquired with the first camera and the second camera is reduced. In a possible implementation, in a case that a large difference exists between proportions of a target object in the images acquired with the first camera and the second camera, the electronic device may adjust the zoom ratio of the first camera or the second camera. In another possible implementation, in a case that a large difference exists between proportions of a target object in the images acquired with the first camera and the second camera, the electronic device may detect an operation performed by a user on a dual-view recording interface, and adjust the zoom ratio of the first camera or the second camera based on the operation. In this case, instead of spending time to observe and adjust zoom ratios of cameras, the user only triggers the electronic device to adjust the zoom ratios of the cameras.

For example, after entering the dual-view recording mode, the electronic device may respectively acquire images based on a front-facing camera and a rear-facing camera. In a case that a difference exists between human face proportions in the images acquired with the front-facing camera and the rear-facing camera, the electronic device may adjust the human face proportions in the images acquired with the front-facing camera the rear-facing camera, and display images with the human face proportions adjusted.

In the foregoing manner, a user does not need to determine and specifically adjust proportions of a target object in images acquired with two cameras, and more simply and more conveniently make the proportions of the target object in the images acquired with the two cameras consistent. In other words, in the foregoing manner, the user does not need to repeatedly adjust zoom ratios of cameras to make proportions of a target object in images acquired with two cameras be close or even the same. It may be understood that, in the foregoing manner, a shooting preparation time is greatly reduced, and a video meeting expectations of a user can be obtained more quickly.

It should be noted that the first interface and the second interface may present different content displayed in a same window at different moments. It may be understood that the first interface and the second interface may include a same control, and a difference between the two interfaces lies in that images displayed on the first interface and the second interface are different.

It may be understood that the first control is configured to trigger to enter the dual-view recording mode. In some embodiments of this application, the first control may be a dual-view recording mode control. For example, the first control may be a dual-view recording mode option 401 shown in FIG. 2C. In some embodiments of this application, the first control may be a shortcut control for triggering to enter the dual-view recording mode. For example, the first control may be a control on a desktop (that is, an interface on which a plurality of application icons are placed) of the electronic device. A user may trigger the control through a click or in another manner. Correspondingly, the electronic device enters the dual-view recording mode, and display a preview interface (as shown in FIG. 2D and FIG. 2E) in the dual-view recording mode. For example, the first control may be a control on a user interface shown in FIG. 2A.

In some embodiments of this application, before the electronic device detects an operation performed on the first control, the electronic device may further start a camera application in response to a user operation performed on a camera application icon, and display a shooting preview interface.

In some embodiments of this application, the first camera includes a front-facing camera, and the second camera includes a rear-facing camera. In some embodiments of this application, the first camera includes a rear-facing camera, and the second camera includes a front-facing camera. In some embodiments of this application, the first camera and the second camera are both rear-facing cameras. In some embodiments of this application, the first camera and the second camera are both front-facing cameras.

In some embodiments of this application, the first interface may be a preview interface B1. The first image is an image I1, and the second image is I2. The first proportion is a proportion C1, and the second proportion is a proportion C2. The first value is |the proportion C1−the proportion C2|. The second interface may be a preview interface B2. The third image is an image I3, and the fourth image is I4. The third proportion is a proportion C3, and the fourth proportion is a proportion C4. The second value is |the proportion C3−the proportion C4|. It may be understood that |the proportion C3−the proportion C4| is less than the proportion C1−the proportion C2|.

In some embodiments of this application, the target object region may be a detection frame region that is displayed by the electronic device and that is used for box-selecting the target object. The target object may be a human face, may be an animal, or may be a flower or plant, a tree, or another specified object. This is not limited in this application. It may be understood that in a case that the target object is a human face, the target object region may be a human face portion that is directly detected by the electronic device, or may be a human face detection frame region that is displayed by the electronic device and that is used for box-selecting a human face.

It should be noted that the electronic device may perform target object detection on an image acquired with a camera, that is, detect whether a target object exists in the image acquired with the camera. Specifically, the electronic device may detect a target object according to a target object recognition algorithm. It may be understood that the target object recognition algorithm includes an object detection algorithm, for example, a human face detection algorithm, or a human body detection algorithm. The object detection algorithm may implement object detection based on big data and a deep neural network model. For related descriptions of the object detection algorithm, refer to related technical documents. This is not limited in this application.

In some embodiments of this application, the first value is greater than a threshold D1. In other words, a difference between the first proportion and the second proportion is large. That is, a difference between sizes of a target object in the first image and the second image is clear.

In some embodiments of this application, the second value is less than a threshold D2. In other words, a difference between the third proportion and the fourth proportion is small. That is, a difference between sizes of a target object in the third image and the fourth image is not clear.

It may be understood that the first operation may include a click, a gesture, voice, or the like. This is not limited in this application. In some embodiments of this application, the first operation may be an operation A2.

With reference to the first aspect, in a possible implementation, the displaying a second interface specifically includes: The electronic device may detect a second operation performed on the first interface, and display the second interface.

In the solution provided in this application, a user may trigger the electronic device to adjust a difference between proportions of a target object in the images acquired with the first camera and the second camera. In some embodiments of this application, the user may double-click or triple-click the first interface. The electronic device may detect the operation of the user, reduce the difference between the proportions of the target object in the images acquired with the first camera and the second camera, and display the second interface. Certainly, the user may use another manner (for example, a gesture, or voice) to trigger the electronic device to adjust a difference between proportions of a target object in the images acquired with the first camera and the second camera. This is not limited in this application.

In some embodiments of this application, if the electronic device detects the second operation performed on the first interface, the electronic device may determine, based on the operation, a specific manner of adjusting the difference between the proportions of the target object in the images acquired with the first camera and the second camera. If the electronic device does not detect the second operation performed on the first interface, the electronic device may directly adjust, in a preset manner, the difference between the proportions of the target object in the images acquired with the first camera and the second camera. For example, if the electronic device does not detect, within five second after entering the dual-view recording mode, the second operation performed by the user on the first interface, the electronic device may adjust the zoom ratio of the first camera or the second camera in a preset manner, and display the second interface, to reduce the difference between the proportions of the target object in the images acquired with the first camera and the second camera.

It may be understood that each of the foregoing specific manner of adjusting the difference between the proportions of the target object in the images acquired with the first camera and the second camera and the foregoing preset manner may include: adjusting the zoom ratio of the second camera based on the proportion of the target object in the image acquired with the first camera or adjusting the zoom ratio of the first camera based on the proportion of the target object in the image acquired with the second camera.

It may be understood that the second operation may include a click, a gesture, voice, or the like. This is not limited in this application.

With reference to the first aspect, in a possible implementation, the first interface includes a second control and a third control. The second control is configured to trigger to adjust a zoom ratio of the first camera. The third control is configured to trigger to adjust a zoom ratio of the second camera. A zoom ratio is used for representing a degree of change in a focal length of a camera. In a possible implementation, the detecting a second operation performed on the first interface, and displaying the second interface specifically includes: detecting the second operation performed on the second control, and displaying the second interface. In this case, the fourth proportion and the second proportion are consistent and equal, and the third proportion and the first proportion are not consistent and equal. In another possible implementation, the detecting a second operation performed on the first interface, and displaying the second interface specifically includes: detecting the second operation performed on the third control, and displaying the second interface. In this case, the fourth proportion and the second proportion are not consistent and equal, and the third proportion and the first proportion are consistent and equal.

In the solution provided in this application, the first interface may include a second control and a third control. The user may trigger, through the second control and the third control, the electronic device to respectively adjust the zoom ratios of the first camera and the second camera. Specifically, the electronic device may detect a user operation performed on the second control. In response to the user operation, the electronic device may adjust the zoom ratio of the first camera with the proportion of the target object in the image acquired using the second camera as a reference, and display the second interface. In this case, the proportion of the target object in the image acquired by the electronic device with the first camera is changed. Because the zoom ratio of the second camera is not changed, the proportion of the target object in the image acquired by the electronic device with the second camera is not changed. Therefore, the third proportion is not equal to the first proportion, and the fourth proportion is equal to the second proportion. Similarly, the electronic device may detect a user operation performed on the third control. In response to the user operation, the electronic device may adjust the zoom ratio of the second camera with the proportion of the target object in the image acquired using the first camera as a reference, and display the second interface. In this case, the proportion of the target object in the image acquired by the electronic device with the second camera is changed. Because the zoom ratio of the first camera is not changed, the proportion of the target object in the image acquired by the electronic device with the first camera is not changed. Therefore, the third proportion is equal to the first proportion, and the fourth proportion is not equal to the second proportion.

In the foregoing manner, two controls are disposed to respectively adjust zoom ratios of corresponding cameras based on the first proportion and the second proportion, and a user does not need to keep changing the zoom ratios of the cameras to reduce the difference between the proportions of the target object in the images acquired with the first camera and the second camera. For example, the user does not need to keep adjusting zoom ratio controls corresponding to the first camera and the second camera to find appropriate zoom ratios of the first camera and the second camera. It may be understood that the zoom ratio of the first camera or the second camera is the appropriate zoom ratio, the difference between the proportions of the target object in the images acquired by the electronic device with the first camera and the second camera is small. It means that, in the foregoing manner, a shooting preparation time can be reduced, and a video meeting expectations of a user can be obtained more quickly.

In some embodiments of this application, the second control and the third control may be respectively a proportion setting control 1401 and a proportion setting control 1402 shown in FIG. 2M.

With reference to the first aspect, in a possible implementation, the second control is located in a first viewfinder frame in the second interface. The first viewfinder frame is configured to display the images acquired with the first camera. The third control is located in a second viewfinder frame in the second interface. The second viewfinder frame is configured to display the images acquired with the second camera.

It may be understood that for this implementation, refer to FIG. 2N to FIG. 2O.

In the solution provided in this application, if a user needs to adjust a proportion of the target object in the image displayed in the first viewfinder frame to make the proportion equal to a proportion of the target object in the image displayed in the second viewfinder frame, the user may directly trigger the second control through a click or in another manner. In this case, the electronic device may adjust the zoom ratio of the first camera. Similarly, if a user needs to adjust a proportion of the target object in the image displayed in the second viewfinder frame to make the proportion equal to a proportion of the target object in the image displayed in the first viewfinder frame, the user may directly trigger the third control through a click or in another manner. In this case, the electronic device may adjust the zoom ratio of the second camera. In this manner, a difference between proportions of a target object in images acquired with two cameras can be reduced more simply and more conveniently, so that a shooting preparation time is reduced, and a video meeting expectations of a user is obtained more quickly.

In some embodiments of this application, the first viewfinder frame is a front-facing viewfinder frame, and the second viewfinder frame is a rear-facing viewfinder frame.

With reference to the first aspect, in a possible implementation, the first interface includes a fourth control. Before the displaying a second interface, the method further includes: displaying a prompt region in the first interface in response to an operation performed on the fourth control. The prompt region in the first interface includes the second control and the third control.

In some embodiments of this application, the fourth control may be a proportion setting control 5103 shown in FIG. 2J. The second control may be a control 12012 shown in FIG. 2K, and the third control may be a control 12011 shown in FIG. 2K.

It may be understood that for this implementation, refer to FIG. 2J to FIG. 2L.

In the solution provided in this application, the user may trigger, through the second control and the third control, the electronic device to respectively adjust the zoom ratios of the first camera and the second camera. In this manner, a difference between proportions of a target object in images acquired with two cameras can be reduced more simply and more conveniently, so that a shooting preparation time is reduced, and a video meeting expectations of a user is obtained more quickly.

With reference to the first aspect, in a possible implementation, before the displaying a second interface, the method further includes: The electronic device determines a target zoom ratio based on the first proportion and the second proportion, and adjusts the zoom ratio of the first camera or the second camera based on the target zoom ratio. A zoom ratio is used for representing a degree of change in a focal length of a camera.

In the solution provided in this application, the electronic device may determine the target zoom ratio based on the first proportion and the second proportion, and adjust the first camera or the second camera based on the target zoom ratio, to reduce the difference between the proportions of the target object in the images acquired with the first camera and the second camera, so that a video meeting expectations of a user is obtained.

It may be understood that, for related descriptions of the zoom ratios and the target zoom ratio, refer to the following text. Details are not described in this application.

With reference to the first aspect, in a possible implementation, the adjusting the zoom ratio of the first camera or the second camera based on the target zoom ratio specifically includes: In a case that the target zoom ratio is a ratio of the first proportion to the second proportion, the electronic device may adjust the zoom ratio of the second camera based on the target zoom ratio. In a case that the target zoom ratio is the ratio of the first proportion to the second proportion, the electronic device may adjust the zoom ratio of the first camera based on the target zoom ratio.

With reference to the first aspect, in a possible implementation, the adjusting the zoom ratio of the first camera or the second camera based on the target zoom ratio specifically includes: If the target zoom ratio is a ratio of the first proportion to the second proportion, and the target zoom ratio is within a preset zoom range, the electronic device adjusts the zoom ratio of the second camera to the target zoom ratio.

In the solution provided in this application, the electronic device may adjust the zoom ratio of the second camera using the first ratio as a reference. Specifically, the electronic device may determine that the target zoom ratio is a ratio of the first proportion to the second proportion. In this case, if the target zoom ratio is within a preset zoom range, the electronic device may adjust the zoom ratio of the second camera to the target zoom ratio, and acquire a fourth image based on the second camera. In this manner, the proportions of the target object in the images acquired with the first camera and the second camera may be the same, so that a video meeting expectations of a user is obtained, and user experience is improved.

It may be understood that, the preset zoom range is related to a camera zoom capability (for example, an optical zoom capability, and a digital zoom capability) and an image processing capability of the electronic device. For related descriptions of the preset zoom range, refer to the following text. Details are not described in this application.

With reference to the first aspect, in a possible implementation, the adjusting the zoom ratio of the first camera or the second camera based on the target zoom ratio specifically includes: If the target zoom ratio is a ratio of the first proportion to the second proportion, and the target zoom ratio is not within a preset zoom range, the electronic device may select a zoom ratio closest to the target zoom ratio from the preset zoom range, and adjust the zoom ratio of the second camera to the zoom ratio closest to the target zoom ratio.

In the solution provided in this application, the electronic device may adjust the zoom ratio of the second camera using the first ratio as a reference. Specifically, the electronic device may determine that the target zoom ratio is a ratio of the first proportion to the second proportion. In this case, if the target zoom ratio is not within a preset zoom range, the electronic device may select a zoom ratio closest to the target zoom ratio from the preset zoom range, adjust the zoom ratio of the second camera to the zoom ratio closest to the target zoom ratio, and perform acquisition with the second camera. In this manner, a difference between the proportions of the target object in the images acquired with the first camera and the second camera may be reduced, so that a video meeting expectations of a user is obtained, and user experience is improved.

With reference to the first aspect, in a possible implementation, the adjusting the zoom ratio of the first camera or the second camera based on the target zoom ratio specifically includes: If the target zoom ratio is a ratio of the second proportion to the first proportion, and the target zoom ratio is within a preset zoom range, the electronic device may adjust the zoom ratio of the first camera to the target zoom ratio.

In the solution provided in this application, the electronic device may adjust the zoom ratio of the second camera using the second ratio as a reference. Specifically, the electronic device may determine that the target zoom ratio is a ratio of the second proportion to the first proportion. In this case, if the target zoom ratio is within a preset zoom range, the electronic device may adjust the zoom ratio of the first camera to the target zoom ratio, and acquire a third image based on the first camera. In this manner, the proportions of the target object in the images acquired with the first camera and the second camera may be the same, so that a video meeting expectations of a user is obtained, and user experience is improved.

With reference to the first aspect, in a possible implementation, the adjusting the zoom ratio of the first camera or the second camera based on the target zoom ratio specifically includes: If the target zoom ratio is a ratio of the second proportion to the first proportion, and the target zoom ratio is not within a preset zoom range, the electronic device may select a zoom ratio closest to the target zoom ratio from the preset zoom range, and adjust the zoom ratio of the first camera to the zoom ratio closest to the target zoom ratio.

In the solution provided in this application, the electronic device may adjust the zoom ratio of the second camera using the second ratio as a reference. Specifically, the electronic device may determine that the target zoom ratio is a ratio of the second proportion to the first proportion. In this case, if the target zoom ratio is not within a preset zoom range, the electronic device may select a zoom ratio closest to the target zoom ratio from the preset zoom range, adjust the zoom ratio of the first camera to the zoom ratio closest to the target zoom ratio, and acquire the third image with the first camera. In this manner, a difference between the proportions of the target object in the images acquired with the first camera and the second camera may be reduced, so that a video meeting expectations of a user is obtained, and user experience is improved.

With reference to the first aspect, in a possible implementation, after the displaying a second interface, the method further includes. The electronic device may detect a third operation performed on a fifth control. In response to the third operation, the electronic device may display a third interface. The third operation is used for adjusting the zoom ratios of the first camera and the second camera based on a collaborative zoom ratio. The collaborative zoom ratio is an increase ratio or a decrease ratio of the zoom ratios of the first camera and the second camera. The third interface includes a fifth image and a sixth image. The fifth image is an image acquired with the first camera with the zoom ratio adjusted. The sixth image is an image acquired with the second camera with the zoom ratio adjusted.

In the solution provided in this application, the electronic device may further perform collaborative zoom on the first camera and the second camera. That is, the electronic device may adjust the zoom ratios of the first camera and the second camera, so that the proportions of the target object in the images acquired with the first camera and the second camera are collaboratively increased or reduced. In the foregoing manner, various shooting requirements can be met, so that user experience is improved.

In some embodiments of this application, the fifth control may be a collaborative zoom control. The third operation may be A3. The third interface may be a preview interface B3. The fifth image may be an image I5, and the sixth image may be an image I6.

It may be understood that the third operation may be a click, a gesture, voice, or another operation. This is not limited in this application.

In some embodiments of this application, the third interface and the second interface may present different content displayed in a same window at different moments. It may be understood that the third interface and the second interface may include a same control, and a difference between the two interfaces lies in that images displayed on the third interface and the second interface are different. For example, the third interface and the second interface may both be preview interfaces in the dual-view recording mode. In another example, the second interface may be a preview interface in the dual-view recording mode, and the third interface may be a recording interface in the dual-view recording mode. With reference to the first aspect, in a possible implementation, a fifth proportion is a proportion of a target object region in the fifth image to the fifth image. A first proportion difference is a difference between the fifth proportion and the third proportion. A sixth proportion is a proportion of a target object region in the sixth image to the sixth image. A second proportion difference is a difference between the sixth proportion and the fourth proportion. An absolute value of a difference between the first proportion difference and the second proportion difference is less than a first threshold. An absolute value of the first proportion difference and an absolute value of the second proportion difference are both greater than a second threshold.

In the solution provided in this application, an absolute value of a difference between the first proportion difference and the second proportion difference is less than a first threshold. It means that, before and after collaborative zoom, the differences between the proportions of the target object in the images acquired by the electronic device with the first camera and the second camera are both small. An absolute value of the first proportion difference and an absolute value of the second proportion difference are both greater than a second threshold. It means that, before and after collaborative zoom, the proportion of the target object in the images acquired by the electronic device with the first camera is clearly changed, the proportion of the target object in the images acquired by the electronic device with the first camera is also clearly changed.

In some embodiments of this application, the first threshold may be a threshold D3. The fifth proportion may be C5, and the sixth proportion may be C6. The first proportion difference may be E1, and the second proportion difference may be E2.

With reference to the first aspect, in a possible implementation, before the displaying a third interface, the method further includes. The electronic device may detect a fourth operation performed on a sixth control. The electronic device starts to record a video in response to the fourth operation. The electronic device may display a dual-view recording interface. The dual-view recording interface includes a first region and a second region. The first region is configured to display the images acquired based on the first camera, and the second region is configured to display the images acquired based on the second camera.

In the solution provided in this application, in a process of recording a video, the electronic device may perform collaborative zoom on the first camera and the second camera. It may be understood that the first region may be understood as the first viewfinder frame, and the second region may be understood as the second viewfinder frame. In some embodiments of this application, the first viewfinder frame is a front-facing viewfinder frame, and the second viewfinder frame is a rear-facing viewfinder frame.

In some embodiments of this application, the sixth control may be a recording start control, for example, a recording start control 506 shown in FIG. 2L. The fourth operation may be a click, a gesture, voice, or another operation. This is not limited in this application.

With reference to the first aspect, in a possible implementation, after the displaying a third interface, the method further includes. The electronic device may detect a fourth operation performed on a sixth control. The electronic device starts to record a video in response to the fourth operation. The electronic device may display a dual-view recording interface. The dual-view recording interface includes a first region and a second region. The first region is configured to display the images acquired based on the first camera. The second region is configured to display the images acquired based on the second camera.

In the solution provided in this application, the electronic device may record a video after performing collaborative zoom on the first camera and the second camera.

With reference to the first aspect, in a possible implementation, the first camera includes a front-facing camera, and the second camera includes a rear-facing camera.

In the solution provided in this application, in a dual-view recording scenario based on the front-facing and rear-facing cameras, the electronic device may adjust the zoom ratio of the first camera or the second camera, so that the difference between the proportions of the target object in the images acquired with the first camera and the second camera is reduced. The electronic device may further perform collaborative zoom on the first camera and the second camera.

With reference to the first aspect, in a possible implementation, the target object region includes a human face region of a shot object.

According to a second aspect, an embodiment of this application provides an electronic device. The electronic device may include a plurality of cameras, a display, a memory, and one or more processors. The memory is configured to store a computer program. The processor is configured to invoke the computer program. The plurality of cameras may include a first camera and a second camera. The plurality of cameras may be configured to acquire images. The processor may be configured to: detect a first operation performed on a first control; and enter a dual-view recording mode in response to the first operation, and control the first camera and the second camera to acquire images. The display is configured to display a first interface. The first interface includes a first image and a second image. A proportion of a target object region in the first image to the first image is a first proportion, and a proportion of a target object region in the second image to the second image is a second proportion. An absolute value of a difference between the first proportion and the second proportion is a first value. The display may be further configured to display a second interface, where the second interface includes a third image and a fourth image. A proportion of a target object region in the third image to the third image is a third proportion, and a proportion of a target object region in the fourth image to the fourth image is a fourth proportion. An absolute value of a difference between the third proportion and the fourth proportion is a second value. The first image and the third image are the images acquired based on the first camera. The second image and the fourth image are the images acquired based on the second camera. The second value is less than the first value.

With reference to the second aspect, in a possible implementation, before the display displays the second interface, the processor may be further configured to detect a second operation performed on the first interface.

With reference to the second aspect, in a possible implementation, the first interface includes a second control and a third control. The second control is configured to trigger to adjust a zoom ratio of the first camera. The third control is configured to trigger to adjust a zoom ratio of the second camera. A zoom ratio is used for representing a degree of change in a focal length of a camera. The processor, when detecting the second operation performed on the first interface, is specifically configured to detect the second operation performed on the second control. In this case, the display may display a second interface. The fourth proportion is equal to the second proportion, and the third proportion is not equal to the first proportion. The processor, when detecting the second operation performed on the first interface, is specifically configured to detect the second operation performed on the third control. In this case, the display may display a second interface. The fourth proportion is not equal to the second proportion. The third proportion is equal to the first proportion.

With reference to the second aspect, in a possible implementation, the second control is located in a first viewfinder frame in the second interface. The first viewfinder frame is configured to display the images acquired with the first camera. The third control is located in a second viewfinder frame in the second interface. The second viewfinder frame is configured to display the images acquired with the second camera.

With reference to the second aspect, in a possible implementation, the first interface includes a fourth control. The display, before displaying the second interface, may be further configured to display a prompt region in the first interface in response to an operation performed on the fourth control. The prompt region in the first interface includes the second control and the third control.

With reference to the second aspect, in a possible implementation, before the display displays the second interface, the processor may be further configured to: determine a target zoom ratio based on the first proportion and the second proportion, and adjust the zoom ratio of the first camera or the second camera based on the target zoom ratio. A zoom ratio is used for representing a degree of change in a focal length of a camera.

With reference to the second aspect, in a possible implementation, the processor, when adjusting the zoom ratio of the first camera or the second camera based on the target zoom ratio, may be specifically configured to: if the target zoom ratio is a ratio of the first proportion to the second proportion, and the target zoom ratio is within a preset zoom range, adjust the zoom ratio of the second camera to the target zoom ratio.

With reference to the second aspect, in a possible implementation, the processor, when adjusting the zoom ratio of the first camera or the second camera based on the target zoom ratio, may be specifically configured to: if the target zoom ratio is a ratio of the first proportion to the second proportion, and the target zoom ratio is not within a preset zoom range, select a zoom ratio closest to the target zoom ratio from the preset zoom range, and adjust the zoom ratio of the second camera to the zoom ratio closest to the target zoom ratio.

With reference to the second aspect, in a possible implementation, the processor, when adjusting the zoom ratio of the first camera or the second camera based on the target zoom ratio, may be specifically configured to: if the target zoom ratio is a ratio of the second proportion to the first proportion, and the target zoom ratio is within a preset zoom range, adjust the zoom ratio of the first camera to the target zoom ratio.

With reference to the second aspect, in a possible implementation, the processor, when adjusting the zoom ratio of the first camera or the second camera based on the target zoom ratio, may be specifically configured to: if the target zoom ratio is a ratio of the second proportion to the first proportion, and the target zoom ratio is not within a preset zoom range, select a zoom ratio closest to the target zoom ratio from the preset zoom range, and adjust the zoom ratio of the first camera to the zoom ratio closest to the target zoom ratio.

With reference to the second aspect, in a possible implementation, after the display displays the second interface, the processor may be further configured to detect a third operation performed on a fifth control. The third operation is used for adjusting the zoom ratios of the first camera and the second camera based on a collaborative zoom ratio. The collaborative zoom ratio is an increase ratio or a decrease ratio of the zoom ratios of the first camera and the second camera. The display may be further configured to display a third interface in response to the third operation. The third interface includes a fifth image and a sixth image. The fifth image is an image acquired with the first camera with the zoom ratio adjusted. The sixth image is an image acquired with the second camera with the zoom ratio adjusted.

With reference to the second aspect, in a possible implementation, a fifth proportion is a proportion of a target object region in the fifth image to the fifth image. A first proportion difference is a difference between the fifth proportion and the third proportion. A sixth proportion is a proportion of a target object region in the sixth image to the sixth image. A second proportion difference is a difference between the sixth proportion and the fourth proportion. An absolute value of a difference between the first proportion difference and the second proportion difference is less than a first threshold. An absolute value of the first proportion difference and an absolute value of the second proportion difference are both greater than a second threshold.

With reference to the second aspect, in a possible implementation, before the display displays the third interface, the processor may be further configured to: detect a fourth operation performed on a sixth control, and start to record a video in response to the fourth operation. The display may be further configured to display a dual-view recording interface. The dual-view recording interface includes a first region and a second region. The first region is configured to display the images acquired based on the first camera. The second region is configured to display the images acquired based on the second camera.

With reference to the second aspect, in a possible implementation, after the display displays the third interface, the processor may be further configured to: detect a fourth operation performed on a sixth control, and start to record a video in response to the fourth operation. The display may be further configured to display a dual-view recording interface. The dual-view recording interface includes a first region and a second region. The first region is configured to display the images acquired based on the first camera. The second region is configured to display the images acquired based on the second camera.

With reference to the second aspect, in a possible implementation, the first camera includes a front-facing camera, and the second camera includes a rear-facing camera.

With reference to the second aspect, in a possible implementation, the target object region includes a human face region of a shot object.

According to a third aspect, this application provides a computer storage medium. The computer storage medium includes computer instructions. When the computer instructions are run on an electronic device, the electronic device is enabled to perform any of the possible implementations in the first aspect described above.

According to a fourth aspect, an embodiment of this application provides a chip. The chip may be used in an electronic device. The chip includes one or more processors. The processor is configured to invoke computer instructions to enable the electronic device to perform any one of the possible implementations in the first aspect.

According to a fifth aspect, an embodiment of this application provides a computer program product including instructions. When the computer program product is run on an electronic device, the electronic device is enabled to perform any of the possible implementations in the first aspect described above.

It may be understood that, the electronic device provided in the second aspect, the computer storage medium provided in the third aspect, the chip provided in the fourth aspect, and the computer program product provided in the fifth aspect are all used to perform any of the possible implementations in the first aspect described above. Therefore, for beneficial effects that can be achieved, reference may be made to the beneficial effects in any one of the possible implementations in the first aspect. The details are not described herein again.

BRIEF DESCRIPTION OF DRAWINGS

FIG. 3A and FIG. 3B are a flowchart of a shooting method according to an embodiment of this application;

DESCRIPTION OF EMBODIMENTS

Figure 1:
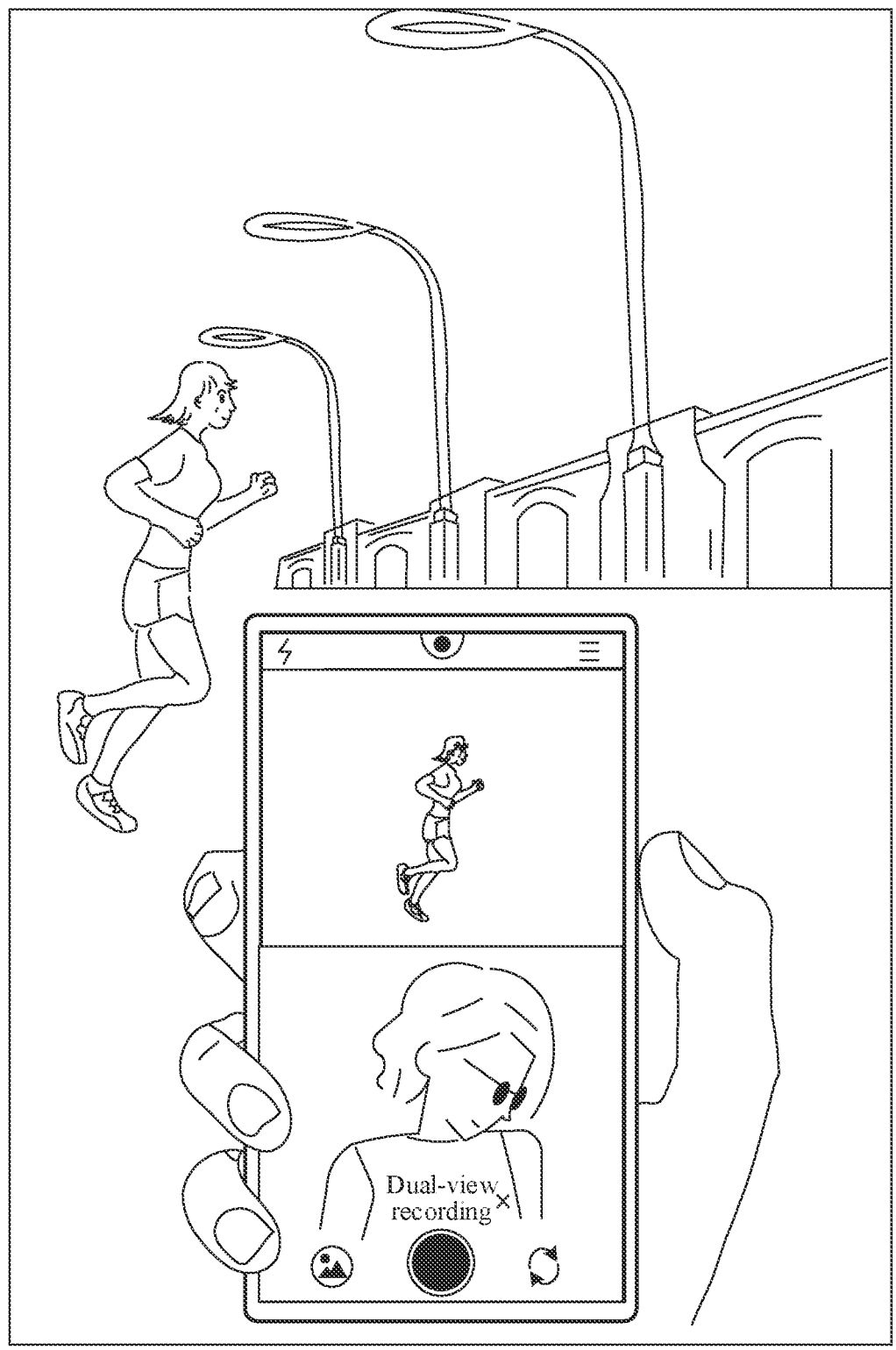
FIG. 1 is a schematic diagram of a shooting scene according to an embodiment of this application.

The following clearly and completely describes technical solutions in embodiments of this application with reference to the accompanying drawings in embodiments of this application. In the descriptions of embodiments of this application, unless otherwise specified, "/" indicates "or". For example, A/B may indicate A or B. The term "and/or" in this specification only describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

It should be understood that, in this specification, claims, and accompanying drawings of this application, terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this application means that a particular characteristic, structure, or feature described with reference to embodiments may be included in at least one embodiment of this application. The phrase appear at various locations in this specification may neither necessarily mean a same embodiment, nor mean an independent or optional embodiment exclusive from another embodiment. It is explicitly and implicitly understood by a person skilled in the art that the embodiments described in this application may be combined with another embodiment.

This application provides a shooting method, which may be applied to an electronic device including a plurality of cameras. According to the shooting method, an electronic device may adjust a human face proportion in a rear-facing viewfinder frame using a human face proportion in a front-facing viewfinder frame as a reference, or adjust a human face proportion in a front-facing viewfinder frame using a human face proportion in a rear-facing viewfinder frame as a reference. The electronic device may further implement collaborative zoom of front-facing and rear-facing cameras, to collaboratively zoom in or zoom out pictures in the front-facing and rear-facing viewfinder frames. In this manner, a shooting preparation time can be reduced, and human face proportions in front-facing and rear-facing viewfinder frames in a dual-view recording mode can be adjusted more quickly and simply, to make the human face proportions in the front-facing and rear-facing viewfinder frames consistent, so that a video meeting expectations of a user is obtained.

FIG. 1 is a schematic diagram of a shooting scene according to an embodiment of this application.

As shown in FIG. 1, a user may perform dual-view recording with an electronic device, to obtain a video including images from a plurality of angles of view. A specific meaning of "recording" is "recording a video". In a process of performing dual-view recording, the electronic device may acquire images based on a front-facing camera and a rear-facing camera, and display the images on a display of the electronic device. That is, the images shot by the front-facing and rear-facing cameras may be simultaneously displayed on the display of the electronic device. To be specific, the images acquired with the front-facing and rear-facing cameras are respectively displayed in a front-facing viewfinder frame and a rear-facing viewfinder frame. Because the front-facing and rear-facing cameras have different device parameters and support different zoom effects and humans in a shooting scene are at different distances from the electronic device, differences between face proportions of the humans displayed in the front-facing viewfinder frame and the rear-facing viewfinder frame are large. As a result, an effect of an obtained video is poor. In this case, the electronic device may adjust a zoom ratio of the front-facing camera or the rear-facing camera based on a human face proportion in an image displayed in the front-facing viewfinder frame and a human face proportion in an image displayed in the rear-facing viewfinder frame, so that the differences between the face proportions of the humans displayed in the front-facing viewfinder frame and the rear-facing viewfinder frame are reduced, and a video effect in dual-view recording is improved. In addition, the electronic device may further implement collaborative zoom of the front-facing camera and the rear-facing camera, that is, may collaboratively adjust the zoom ratios of the front-facing camera and the rear-facing camera.

It may be understood that the electronic device may be specifically a mobile phone, a tablet computer, a wearable device, an in-vehicle device, an augmented reality (Augmented Reality, AR) device/a virtual reality (Virtual Reality, VR) device, a notebook computer, an ultra-mobile personal computer (Ultra-Mobile Personal Computer, UMPC), a netbook, a personal digital assistant (Personal Digital Assistant, PDA), a dedicated camera (for example, a digital single lens reflex or a cube camera), among other electronic devices. A specific type of the electronic device is not limited in embodiments of this application.

A shooting scene provided in this application is described below in detail with reference to schematic diagrams of a group of user interfaces.

It may be understood that the terms "interface" and "user interface" in this specification, claims, and accompanying drawings of this application are medium interfaces that are used for interaction and information exchange between an application or an operating system and a user, and implement conversion between an internal form of information and a form that can be accepted by the user. A common representation form of the user interface is a graphic user interface (graphic user interface, GUI), which is a graphically displayed user interface related to a computer operation. The user interface may be a user interface element such as an icon, a window, or a control displayed on a display of an electronic device, and the control may include a visual user interface element such as an icon, a button, a menu, a tab, a text box, a dialog box, a state bar, a navigation bar, or a widget.

It should be noted that the "interface" and the "user interface" in this application may present different content displayed in a same window at different moments, and may present different content displayed in different windows at different moments.

1. Enter a Dual-View Recording Mode (FIG. 2A to FIG. 2E)

Figure 2A:
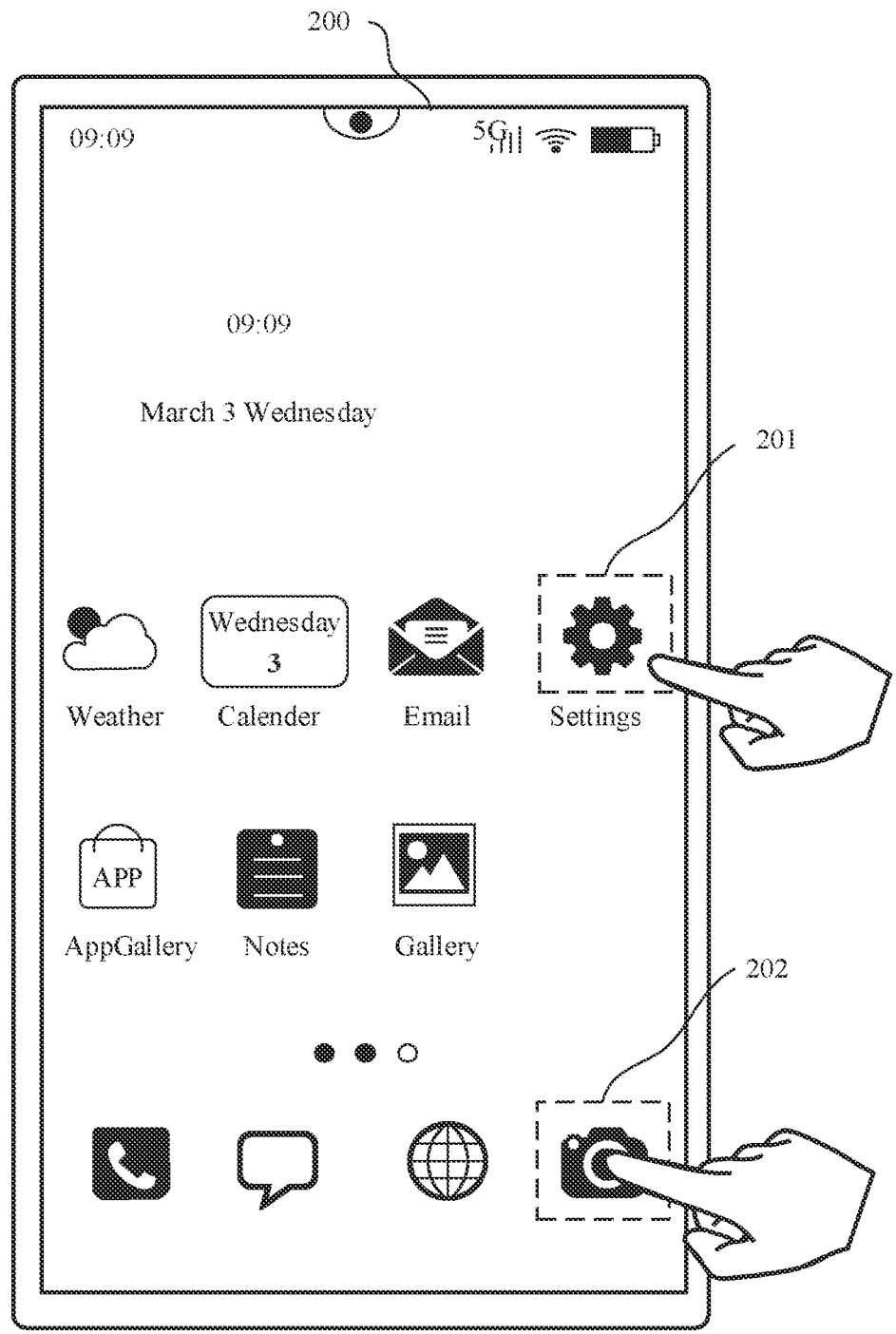
FIG. 2A to FIG. 2Z are schematic diagrams of a group of user interfaces according to an embodiment of this application.

FIG. 2A shows an example of a user interface 200 for displaying an application installed on an electronic device.

The user interface 200 displays a page with application icons. The page may include a plurality of application icons (for example, a weather application icon, a calendar application icon, a gallery application icon, a notes application icon, an email application icon, an AppGallery icon, a settings application icon 201, and the like). Page indicators may also be displayed below the plurality of application icons, to indicate a positional relationship between a currently displayed page and other pages. There are a plurality of application icons (for example, a camera application icon 202, a browser application icon, an information application icon, a phone application icon) below the page indicators. The application icon below the page indicators remains displayed during page switching.

It may be understood that the camera application icon 202 is an icon of a camera application. The camera application icon 202 may be configured to trigger to start a camera application program. The camera application is an image shooting application on an electronic device such as a smartphone or a tablet computer. A name of the application is not limited in this application.

The electronic device may detect a user operation performed on the camera application icon 202. In response to the operation, the electronic device may start the camera application program, and display a shooting interface 300 shown in FIG. 2B. The shooting interface 30) may be a user interface of a default shooting mode of the camera application program. A user may preview an image on the interface and complete shooting.

It may be understood that the user operation in this application may include, but not limited to, a touch (for example, a click), voice control, a gesture, or the like. This is not limited in this application.

Figure 2B:
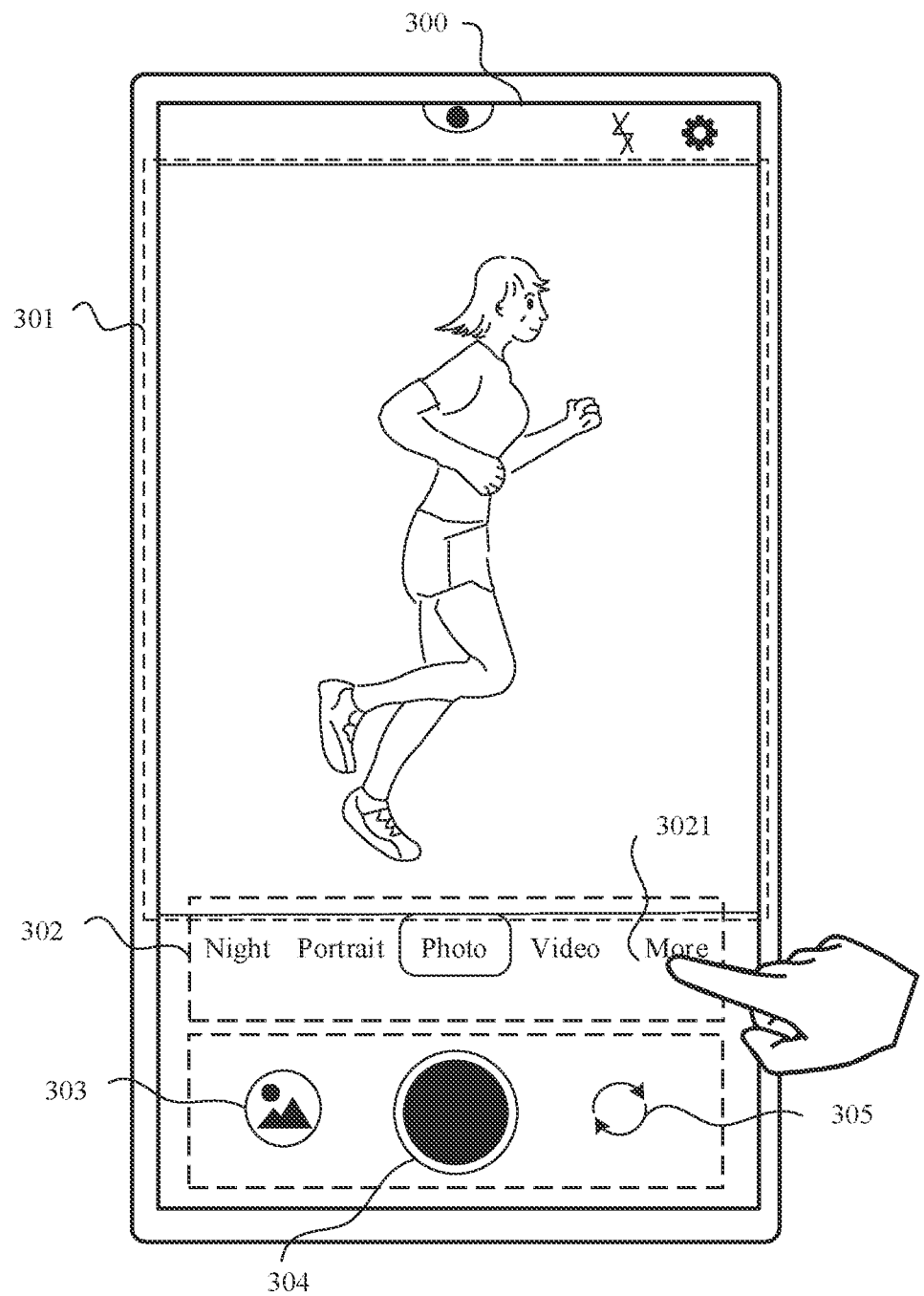

As shown in FIG. 2B, the shooting interface 300 may include a preview region 301, a camera mode option 302, a gallery shortcut control 303, a shutter control 304, and a camera flipping control 305.

The preview region 301 may be configured to display a preview image. The preview image is an image captured in real time by the electronic device with a camera. The electronic device may refresh, in real time, content displayed in the preview region 301, so that the user can preview an image captured by the camera currently.

One or more shooting mode options may be displayed in the camera mode option 302. The camera mode option 302 may include a night mode option, a portrait mode option, a photo mode option, a video mode option, and a more option 3021. It may be understood that the one or more photographing mode options may be presented as textual information, such as "night", "smart portrait", "photo", "video", "more", at the interface, or may be presented as an icon or another form of interactive element (interactive element, IE). This is not limited in this application. It may be understood that the camera mode option 302 may include more or fewer shooting mode options. The shooting and camera mode options shown in FIG. 2B are merely an implementation of this application, and should not be regarded as limitations on this application.

The gallery shortcut control 303 may be configured to open a gallery application program.

The shutter control 304 may be used for monitoring an operation performed by the user to trigger shooting. The electronic device may detect the user operation performed on the shutter control 304. In response to the user operation, the electronic device may store, in the gallery application program, images captured with cameras. In addition, the electronic device may also display a thumbnail of the saved image in the gallery shortcut control 303.

The camera flipping control 305 may be used for monitoring an operation performed by the user to trigger flipping of a camera. The electronic device may detect a user operation performed on the camera flipping control 305. In response to the operation, the electronic device may flip a camera for shooting, for example, switch the rear-facing camera to the first-facing camera, or switch the front-facing camera to the rear-facing camera.

The electronic device may detect a user operation performed on the more option 3021. In response to the user operation, the electronic device may display a user interface 400 shown in FIG. 2C. The user interface 400 may display more shooting mode options, for example, a time-lapse shooting mode option, a burst shooting mode option, a professional shooting mode option, and a dual-view recording mode option 401. The dual-view recording mode option 401 is configured to start the dual-view recording mode. The dual-view recording mode is turning on two cameras to shoot a video simultaneously. In the dual-view recording mode, images captured by the electronic device with the two cameras that are turned on are displayed on a display of the electronic device.

In some embodiments of this application, after entering the dual-view recording mode, the electronic device turns on the front-facing camera and the rear-facing camera by default for shooting. It may be understood that the rear-facing camera that is turned on by default may be a main camera. For descriptions of the main camera, refer to the following description. Details are not described herein.

The electronic device may detect a user operation performed on the dual-view recording option 401. In response to the user operation, the electronic device enters the dual-view recording mode, and displays a user interface 500 shown in FIG. 2D.

The user interface 500 may include a parameter adjustment region 501, a rear-facing viewfinder frame 502, a zoom ratio control 503, a viewfinder frame boundary 504, a front-facing viewfinder frame 505, the gallery shortcut control 303, a recording start control 506, and the camera flipping control 305.

The parameter adjustment region 501 may include a camera switching control 5011, a collaborative zoom control 5012, the proportion setting control 5103, a viewfinder frame adjustment control 5014, a flash control 5015, and another settings control 5016. The camera switching control 5011 is configured to switch the two cameras that are turned on by the electronic device. For example, the camera switching control 5011 may be configured to switch cameras that are turned on in the dual-view recording mode from the main camera and the front-facing camera to a telephoto camera and an ultra-wide-angle camera. The collaborative zoom control 5012 is configured to trigger to collaboratively adjust zoom ratios of the two cameras that are turned on in the dual-view recording mode. It may be understood that a zoom ratio may be used for representing a degree of change in a focal length of a camera. For a specific meaning of the zoom ratio, refer to the following description. Details are not described herein. The proportion setting control 5103 is configured to trigger to adjust human face proportions in two viewfinder frames (for example, the front-facing viewfinder frame and the rear-facing viewfinder frame) that correspond to the two cameras that are turned on by the electronic device, that is, to make the human face proportions in the two viewfinder frames consistent. It should be noted that a specific manner of making the human face proportions in the two viewfinder frames consistent may be adjusting the zoom ratios of the cameras that are turned on by the electronic device. In other words, the proportion setting control 5103 essentially triggers the electronic device to adjust the zoom ratios of the cameras that are turned on by the electronic device in the dual-view recording mode. The viewfinder frame adjustment control 5014 is configured to adjust a size, a shape, a location, and the like of a viewfinder frame. For example, the electronic device may detect a user operation performed on the viewfinder frame adjustment control 5014. In response to the user operation, the electronic device may adjust the viewfinder frames that are displayed on the display in two halves (as shown in FIG. 2D) to a picture-in-picture mode. In the picture-in-picture mode, one viewfinder frame covers the entire display, and the other viewfinder frame is displayed in a form of a floating window. The flash control 5015 is configured to control on/off of a flash. The other settings control 5016 is configured to trigger to display more parameter adjustment controls.

The rear-facing viewfinder frame 502 is configured to display an image acquired with the rear-facing camera.

The zoom ratio control 503 is configured to display a zoom ratio of a camera. The zoom ratio control 503 may be further configured to adjust the zoom ratio of the camera. For example, the electronic device may detect a swipe-up operation or a swipe-down operation performed on the zoom ratio control 503. In response to the operation, the electronic device may adjust the zoom ratio of the camera. As shown in FIG. 2D, the zoom ratio control 503 is displayed in the rear-facing viewfinder frame 502, and indicates that a zoom ratio of the rear-facing camera is 1×. Certainly, a zoom ratio control may also be displayed in the front-facing viewfinder frame. This is not limited in this application.

The viewfinder frame boundary 504 is configured to distinguish the rear-facing viewfinder frame 502 and the front-facing viewfinder frame 505. The viewfinder frame boundary 504 may be further configured to adjust sizes of the rear-facing viewfinder frame 502 and the front-facing viewfinder frame 505. For example, the electronic device may detect a swipe-up operation performed on the viewfinder frame boundary 504. In response to the operation, the electronic device may reduce a length of the rear-facing viewfinder frame 502 and correspondingly increase a length of the front-facing viewfinder frame 505.

The front-facing viewfinder frame 505 is configured to display an image acquired with the front-facing camera. It may be understood that locations of the rear-facing viewfinder frame 502 and the front-facing viewfinder frame 505 are interchangeable.

The recording start control 506 is configured to start recording.

In some embodiments of this application, after entering the dual-view recording mode, the electronic device may perform landscape mode recording. Specifically, the electronic device may detect a posture through a gyroscope. Once detecting that a posture of a mobile phone is in a landscape mode, the electronic device may display a user interface 600 shown in FIG. 2E. Content included in the user interface 600 is substantially the same as content included in the user interface 500. Details are not described herein again.

2. Human Face Detection and Human Face Proportion Adjustment (FIG. 2F to FIG. 2O)

After entering the dual-view recording mode, the electronic device may perform human face detection on the images acquired with the front-facing camera and the rear-facing camera. The electronic device may detect that the images acquired with the front-facing camera and the rear-facing camera include a human face, and display a user interface 700 shown in FIG. 2F. In the user interface 700, a human face detection frame 701 may be displayed in the rear-facing viewfinder frame 502, and a human face detection frame 702 may be displayed in the front-facing viewfinder frame 505.

It may be understood that, for a specific manner of human face detection, refer to the following text. Details are not described herein.

After detecting that the images acquired with the front-facing camera and the rear-facing camera include a human face, the electronic device may adjust a zoom ratio of the front-facing camera or the rear-facing camera. Specifically, the electronic device may adjust the zoom ratio of the rear-facing camera based on a human face proportion in the front-facing viewfinder frame, so that a human face proportion in an image acquired with the rear-facing camera with the zoom ratio adjusted is consistent with the human face proportion in the front-facing viewfinder frame. Alternatively, the electronic device may adjust the zoom ratio of the front-facing camera based on a human face proportion in the rear-facing viewfinder frame, so that a human face proportion in an image acquired with the front-facing camera with the zoom ratio adjusted is consistent with the human face proportion in the rear-facing viewfinder frame. It may be understood that a viewfinder frame may completely display an image acquired with a camera. In other words, a size of a viewfinder frame may be consistent with a size of an image acquired with a camera.

After the zoom ratio of the front-facing camera or the rear-facing camera is adjusted, the electronic device may continue to acquire images with the front-facing camera and the rear-facing camera, and display the images on the display. The electronic device may display a user interface 800 shown in FIG. 2G. A human face proportion in the rear-facing viewfinder frame 502 of the user interface 800 is consistent with a human face proportion in the front-facing viewfinder frame 505 of the user interface. A zoom ratio control 801 is displayed in the rear-facing viewfinder frame 502 of the user interface 800. It may be understood that the zoom ratio control 801 indicates that a zoom ratio of the rear-facing camera is 12×. In the user interfaces shown in FIG. 2D to FIG. 2F, zoom ratios displayed in the rear-facing viewfinder frames 502 are 1×. It may mean that the zoom ratio of the rear-facing camera is increased to 12 times an original zoom ratio, and a focal length of the rear-facing camera is also increased to 12 times an original focal length.

In some embodiments of this application, the user may cancel adjustments to the zoom ratio of the front-facing camera or the rear-facing camera or adjust a zoom ratio of a camera in another manner.

The electronic device may detect a user operation performed on the proportion setting control 5103 included in the user interface 800. In response to the user operation, the electronic device may display a user interface 900 shown in FIG. 2H. The user interface 900 may include a display region 901. The display region 901 includes a control 9011, a control 9012, and a control 9013. The control 9011 is configured to trigger to adjust the human face proportion in the front-facing viewfinder frame (that is, adjust the zoom ratio of the front-facing camera) using the human face proportion in the rear-facing viewfinder frame as a reference. The control 9012 is configured to trigger to restore an original human face proportion. The control 9013 is configured to return to a previous user interface.

The electronic device may detect a user operation performed on the control 9012. In response to the user operation, the electronic device may adjust the zoom ratio of the rear-facing camera to the original zoom ratio (that is, adjust the zoom ratio from 12× to 1×), and display a corresponding user interface. For example, the electronic device may display the user interface 600 shown in FIG. 2E or the user interface 700 shown in FIG. 2F.

In some embodiments of this application, the user may adjust a zoom ratio of a camera through a zoom ratio control to adjust a human face proportion in a viewfinder frame.

The electronic device may detect a swipe-left operation performed on the zoom ratio control 801. In a process of a swipe left, the electronic device may display a user interface 1000 shown in FIG. 2I. "6×" is displayed in the rear-facing viewfinder frame 502 of the user interface 1000. In other words, in the process of the swipe left, the zoom ratio of the rear-facing camera of the electronic device is changed from 12× to 6×. When the swipe left stops, the electronic device may display a user interface 1100 shown in FIG. 2J. A zoom ratio control 1101 is displayed in the rear-facing viewfinder frame 502 of the user interface 1100. The zoom ratio control 1101 indicates that the rear-facing camera continues to acquire an image with the zoom ratio of 6×.

In some embodiments of this application, the user may trigger to adjust the zoom ratio of the front-facing camera or the rear-facing camera.

Method 1:

The electronic device may detect a user operation performed on the proportion setting control 5103 included in the user interface 1100. In response to the user operation, the electronic device may display a user interface 1200 shown in FIG. 2K. The user interface 1200 includes a display region 1201. The display region 1201 includes a control 12011, a control 12012, and a control 12013. The control 12011 is configured to trigger to adjust the human face proportion in the rear-facing viewfinder frame (that is, adjust the zoom ratio of the rear-facing camera based on the human face proportion in the front-facing viewfinder frame) using the human face proportion in the front-facing viewfinder frame as a reference. The control 12012 is configured to trigger to adjust the human face proportion in the front-facing viewfinder frame (that is, adjust the zoom ratio of the front-facing camera based on the human face proportion in the rear-facing viewfinder frame) using the human face proportion in the rear-facing viewfinder frame as a reference. The control 9013 is configured to return to a previous user interface.

The electronic device may detect a user operation performed on the control 12012. In response to the user operation, the electronic device may display a user interface 1300 shown in FIG. 2L. A human face proportion in the rear-facing viewfinder frame 502 of the user interface 1300 is consistent with a human face proportion in the front-facing viewfinder frame 505 of the user interface.

Figure 2C:
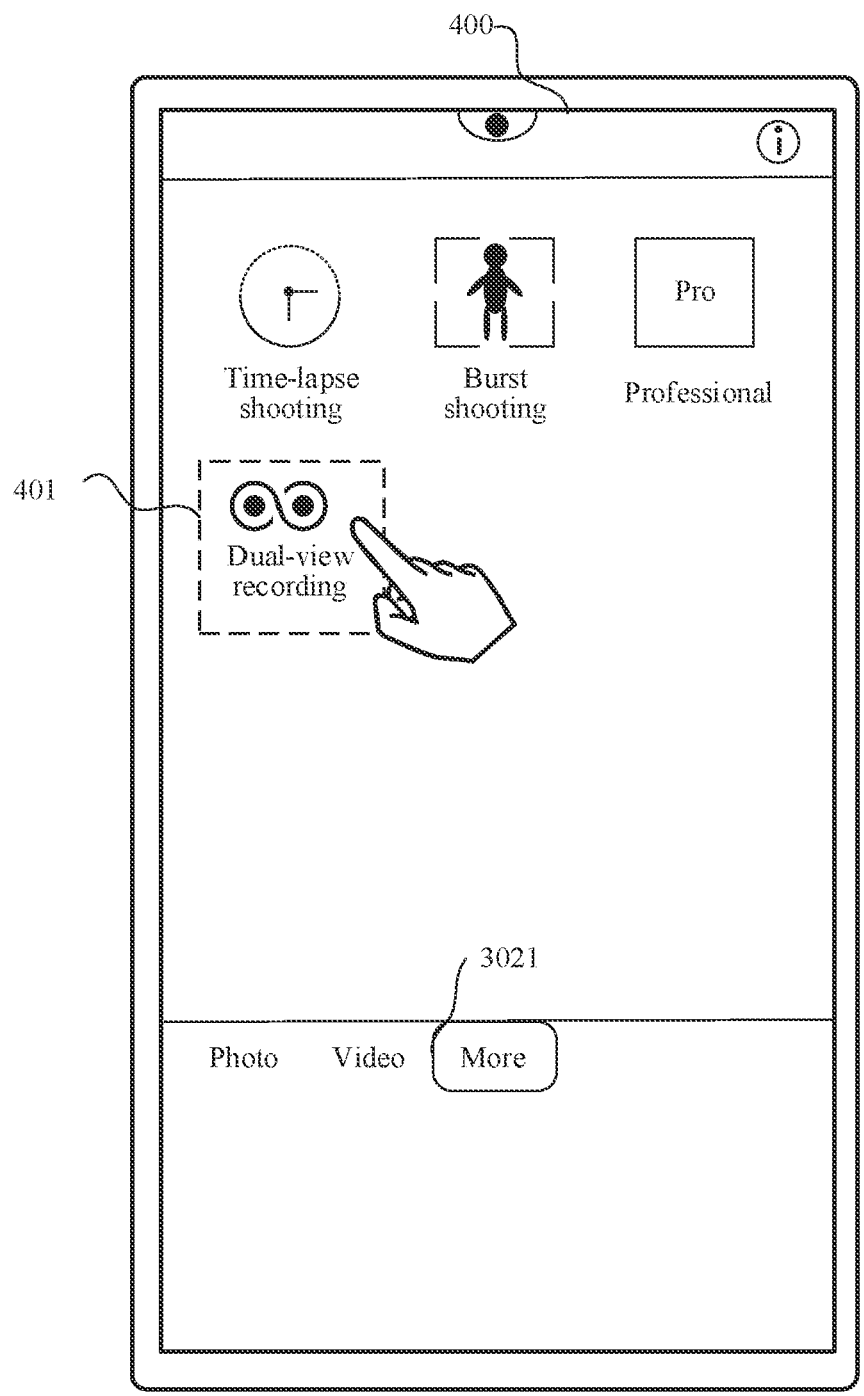
Figure 2D:
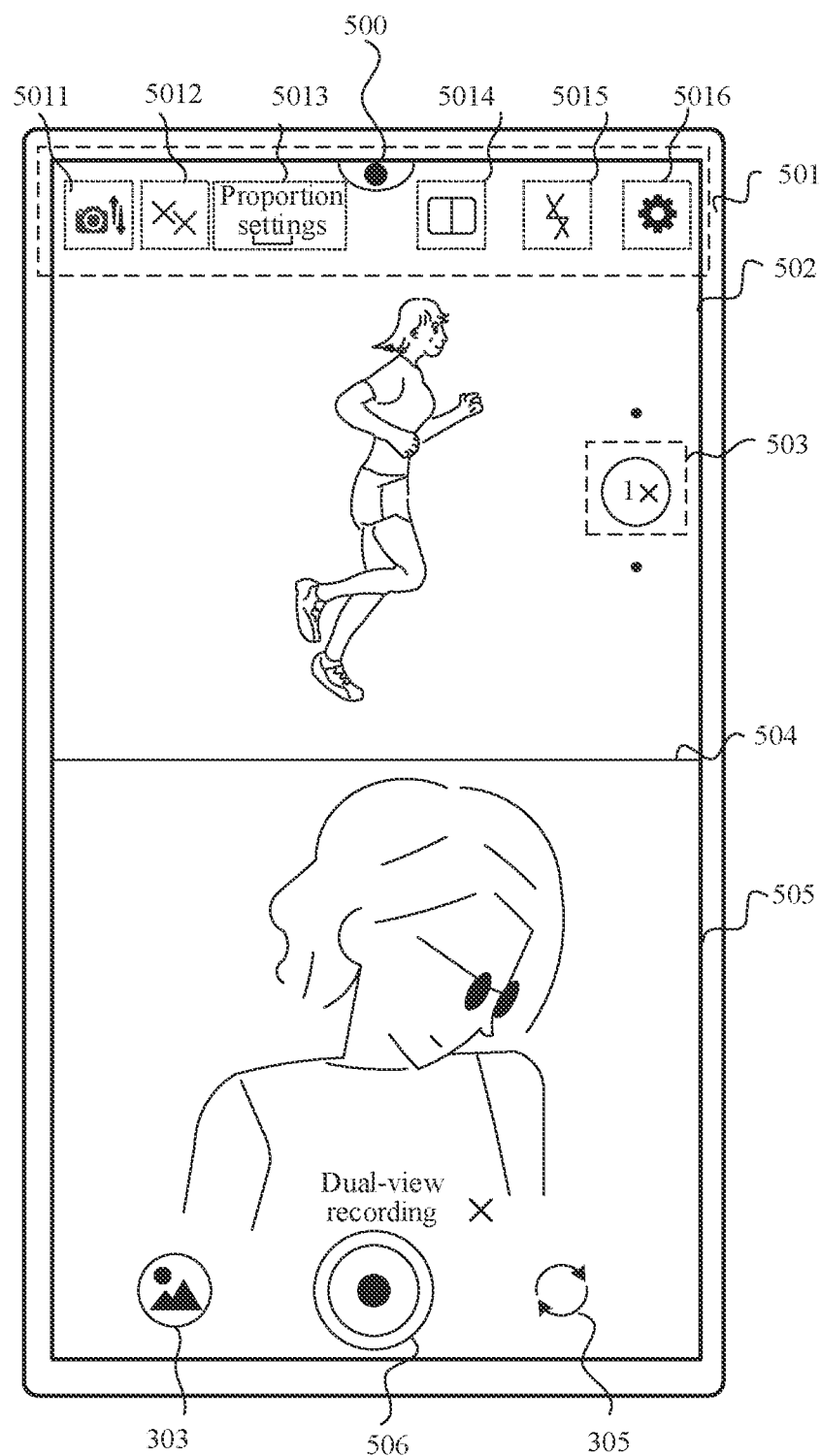
Figure 2E:
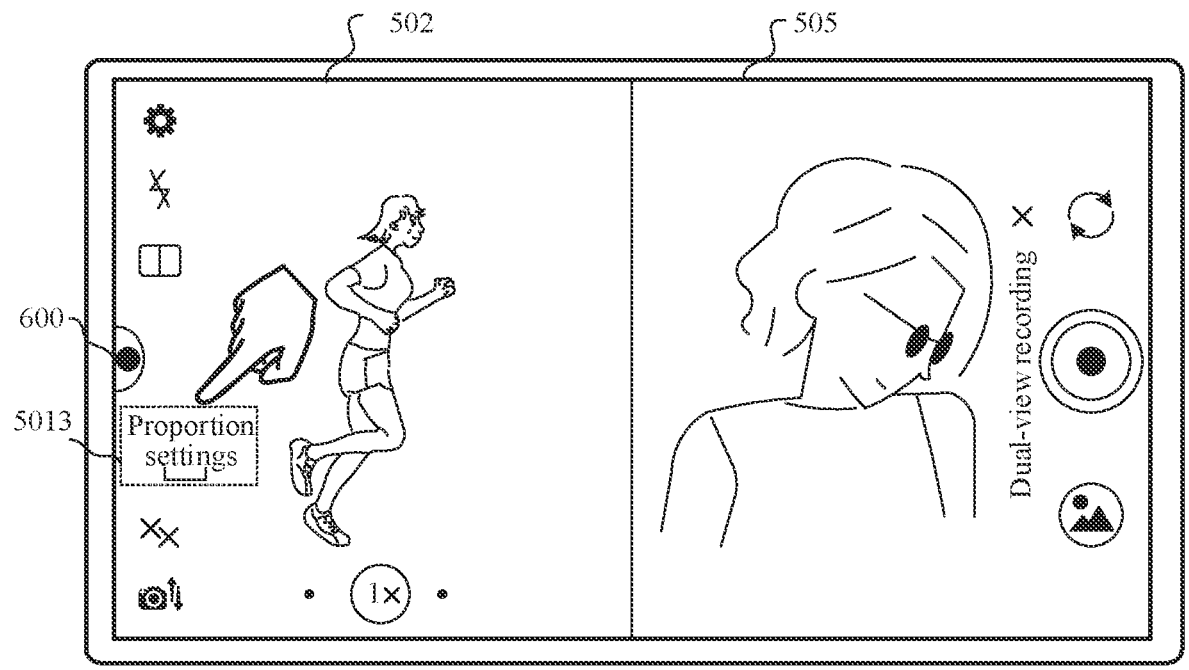
Figure 2F:
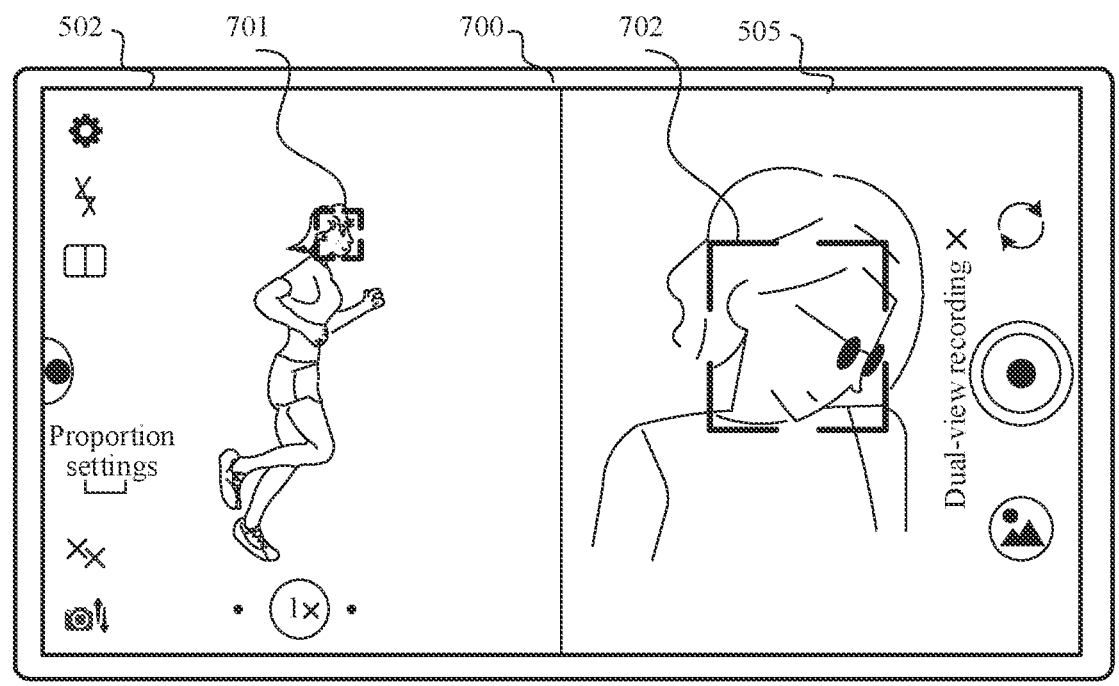
Figure 2G:
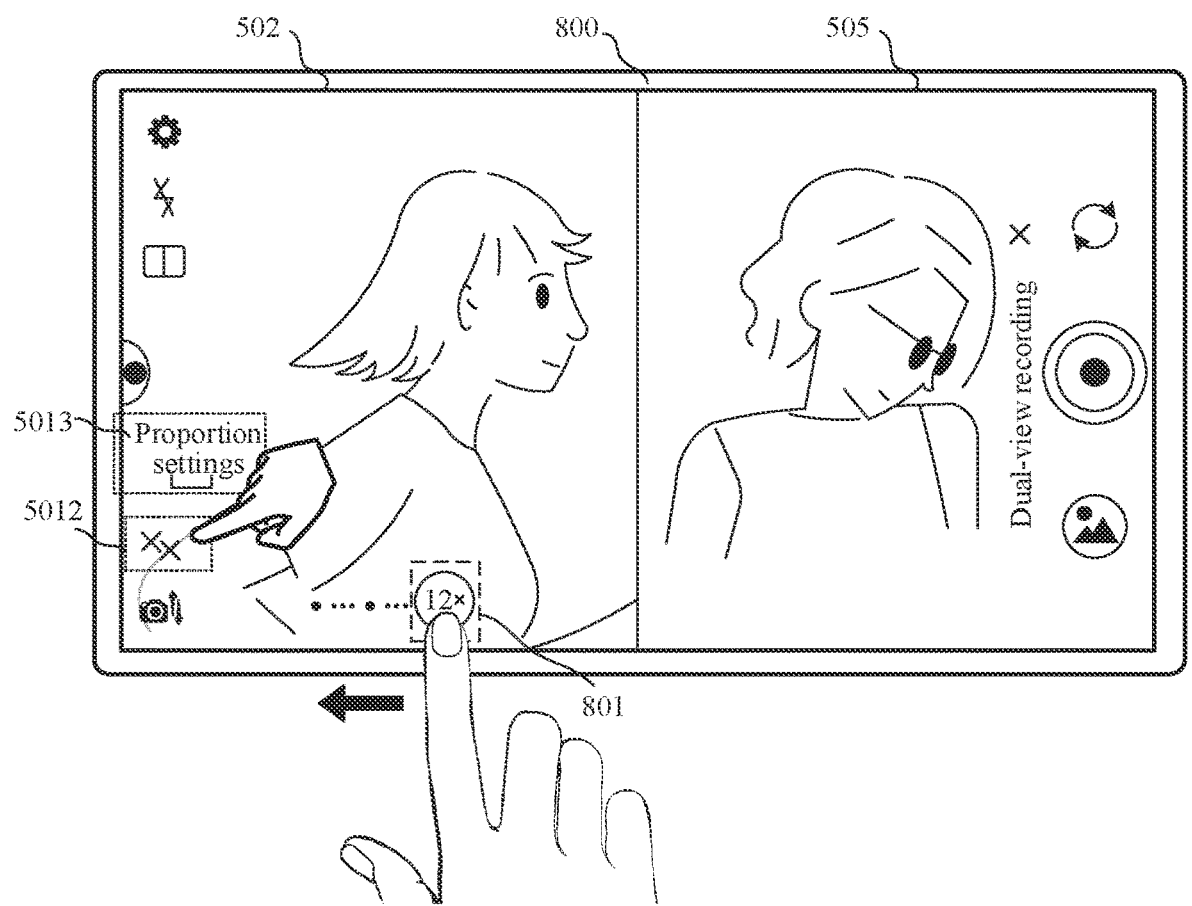
Figure 2H:
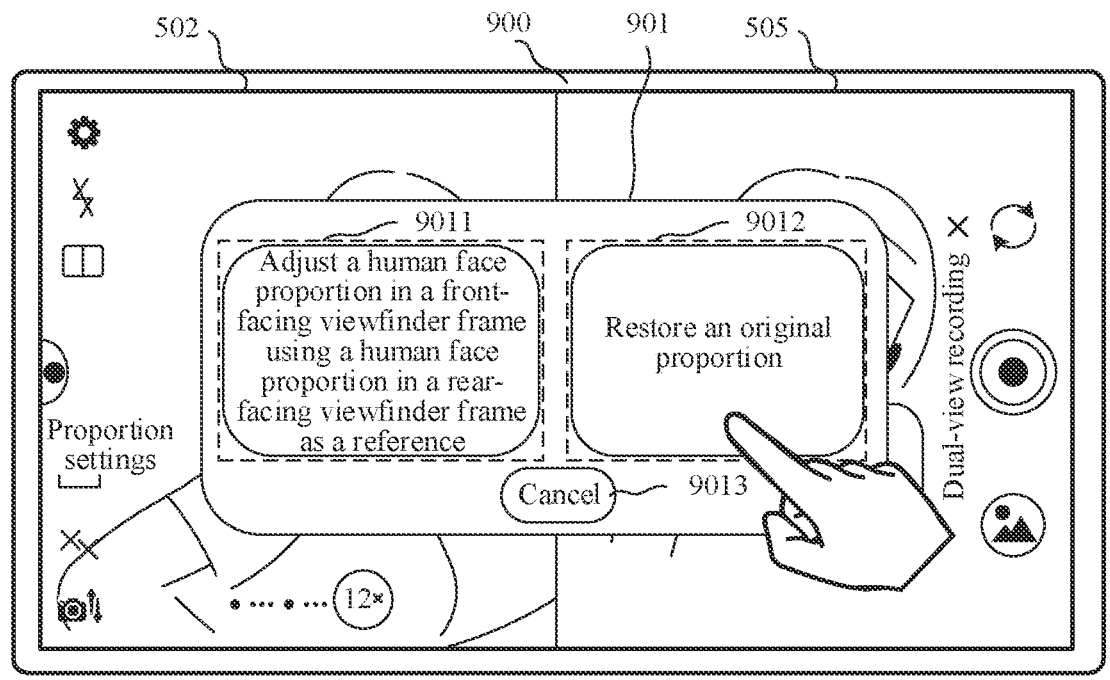
Figure 2I:
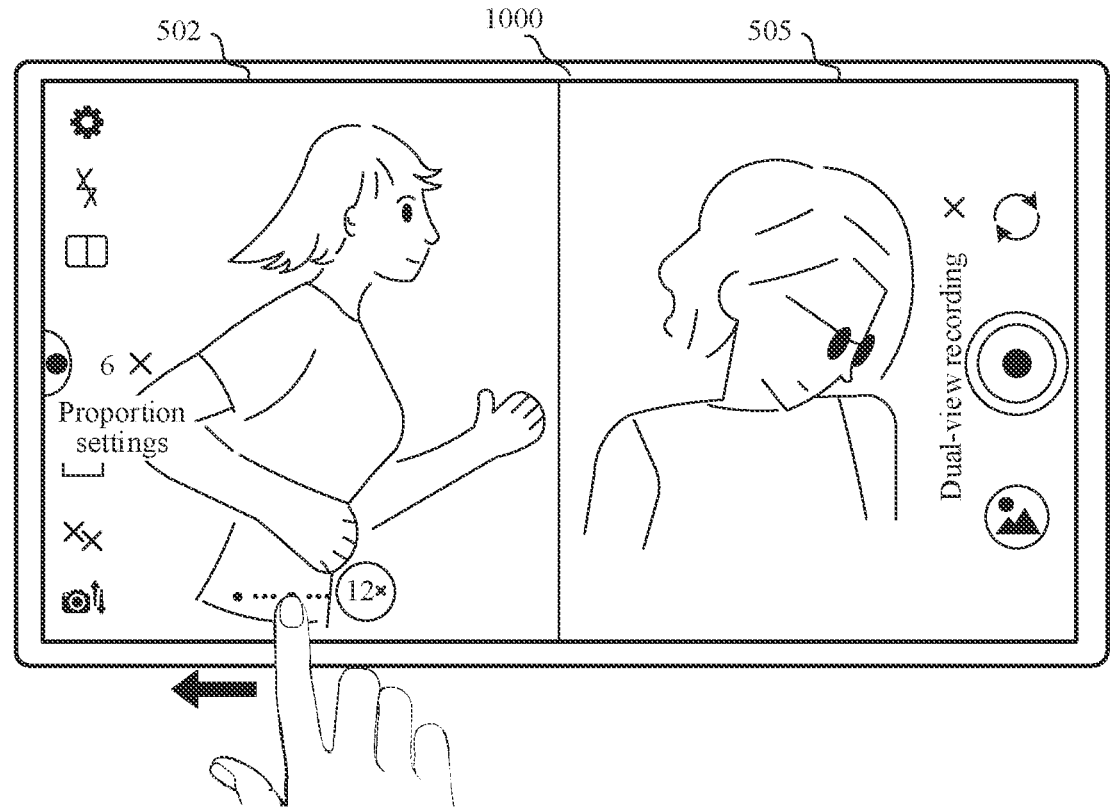
Figure 2J:
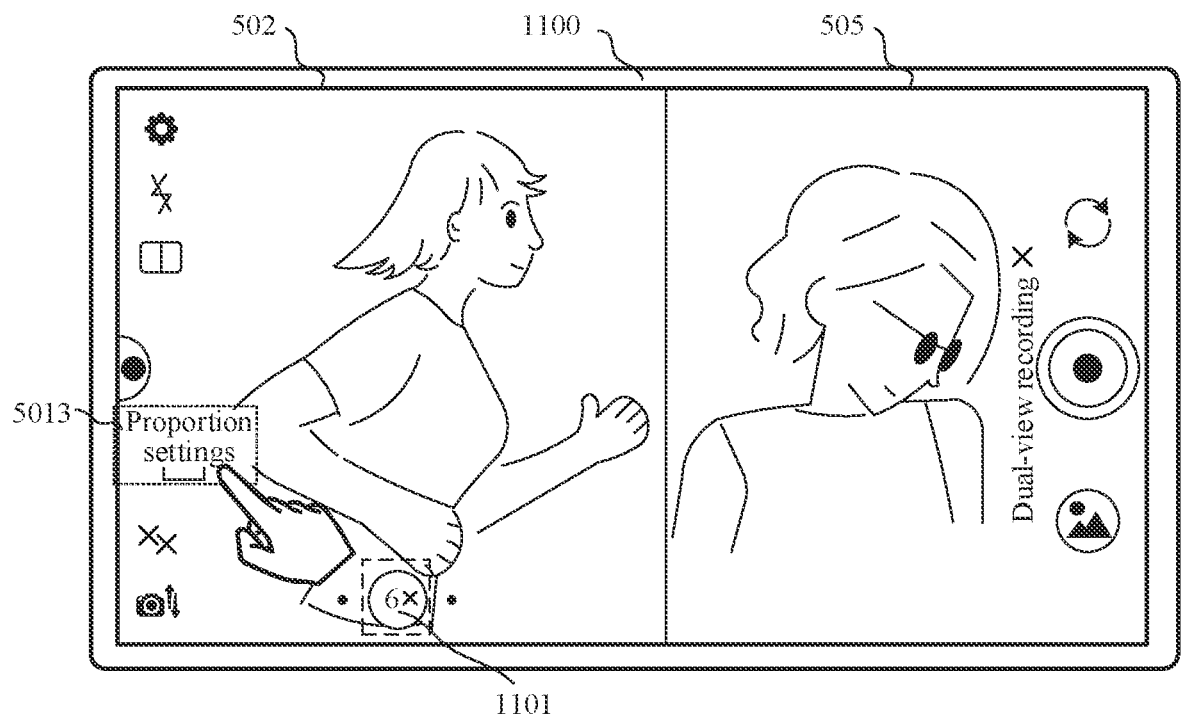
Figure 2K:
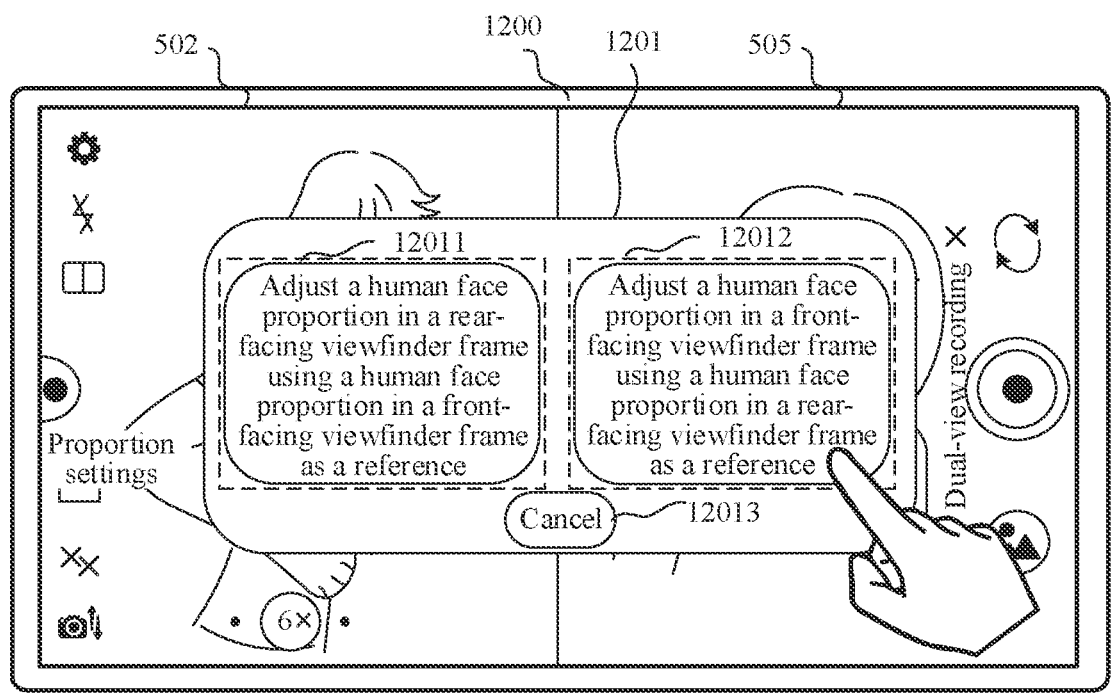
Figure 2L:
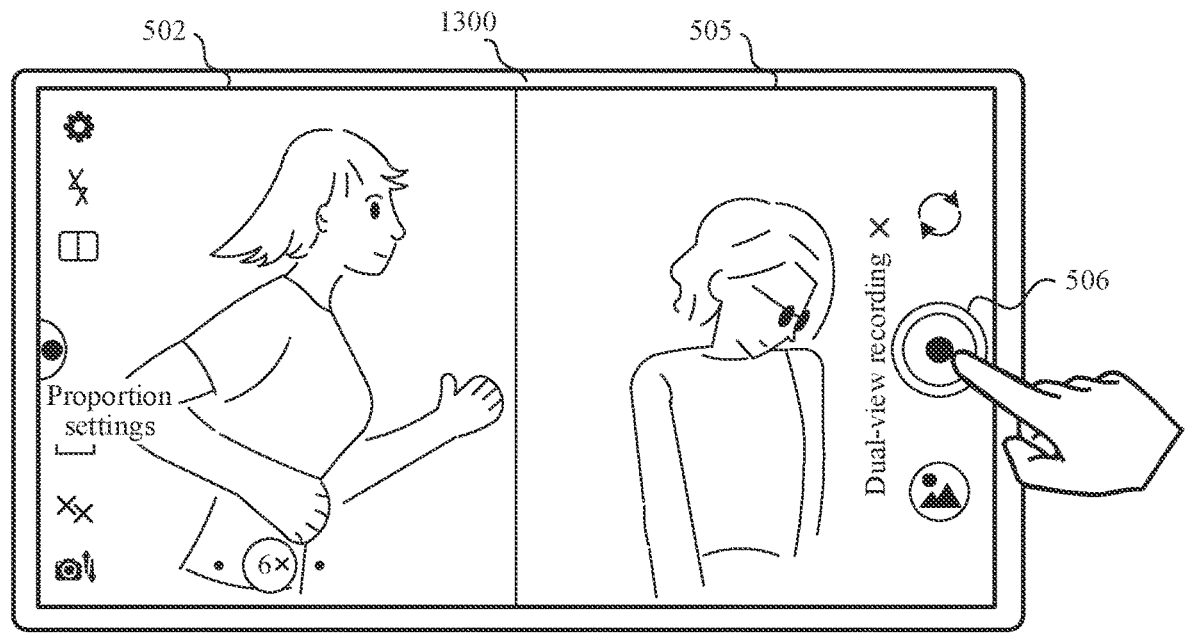
Figure 2M:
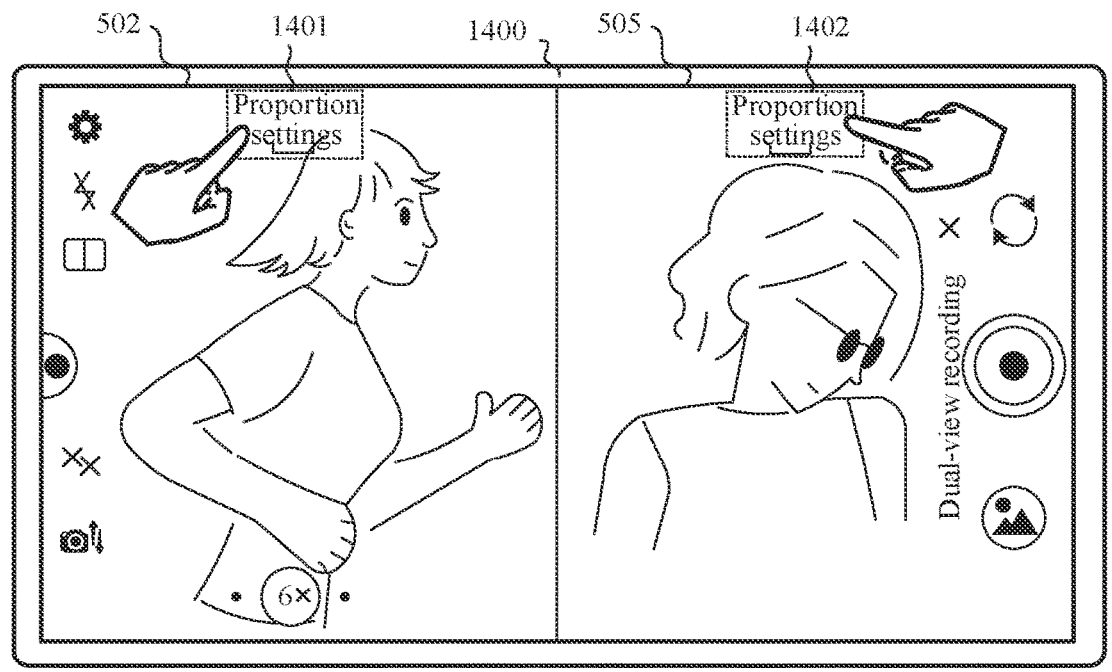
Figure 2N:
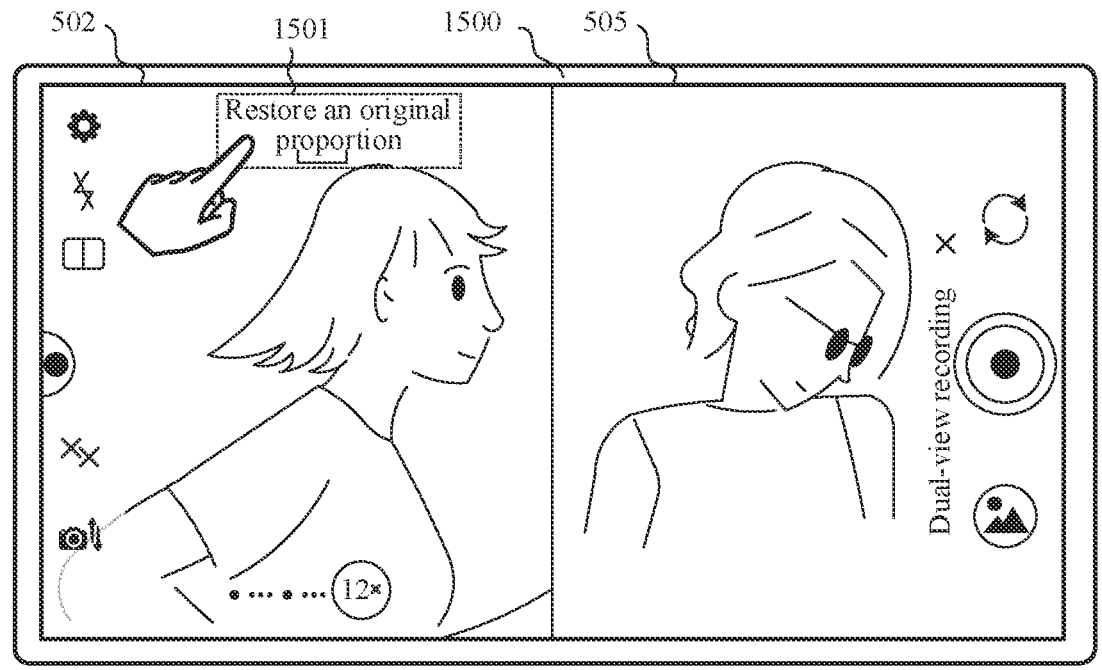
Figure 2O:
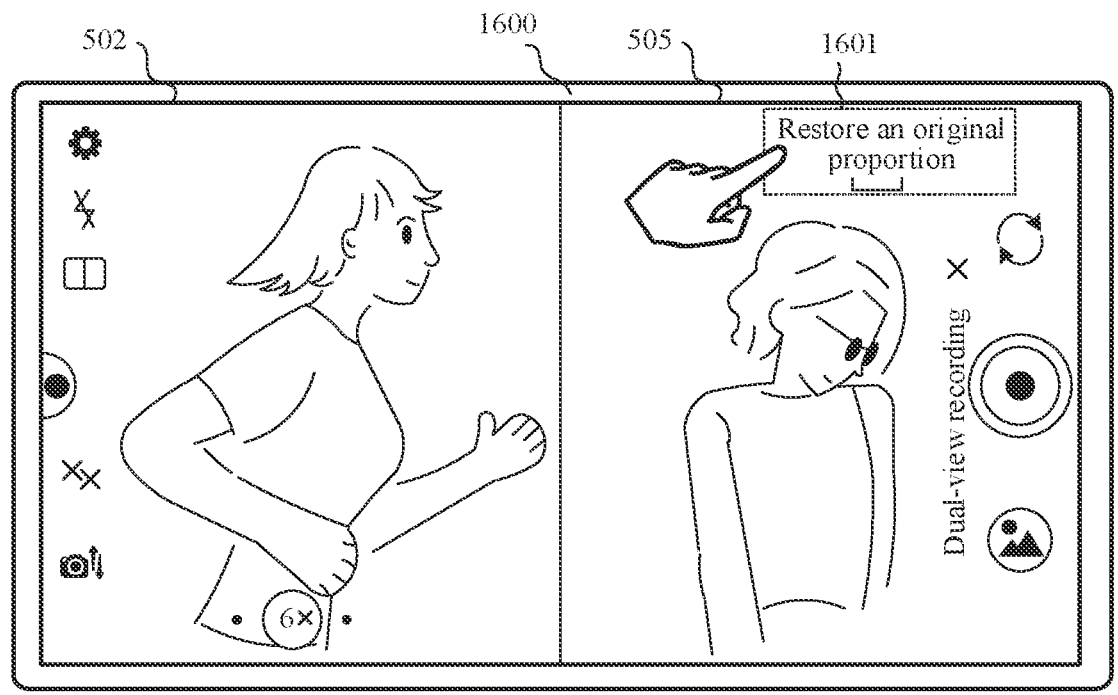

Method 2:

After entering the dual-view recording mode, the electronic device may display a user interface 1400 shown in FIG. 2M. The user interface 1400 may include the rear-facing viewfinder frame 502 and the front-facing viewfinder frame 505. A difference exists between human face proportions in the rear-facing viewfinder frame 502 and the front-facing viewfinder frame 505 in the user interface 1400. A proportion setting control 1401 may be displayed in the rear-facing viewfinder frame 502, and a proportion setting control 1402 may be displayed in the front-facing viewfinder frame 505. It may be understood that the proportion setting control 1401 may be configured to trigger to adjust the zoom ratio of the rear-facing camera, and the proportion setting control 1402 may be configured to trigger to adjust the zoom ratio of the front-facing camera.

It may be understood that the human face proportion in the rear-facing viewfinder frame 502 is a ratio of a human face region in an image displayed in the rear-facing viewfinder frame 502 to a complete image displayed in the rear-facing viewfinder frame 502. The human face proportion in the front-facing viewfinder frame 505 is a ratio of a human face region in an image displayed in the front-facing viewfinder frame 505 to a complete image displayed in the front-facing viewfinder frame 505.

The electronic device may detect a user operation performed on the proportion setting control 1401. In response to the user operation, the electronic device may adjust the zoom ratio of the rear-facing camera, and display a user interface 1500 shown in FIG. 2N. The human face proportions in the images displayed in the rear-facing viewfinder frame 502 and the front-facing viewfinder frame 505 in the user interface 1500 are consistent. The rear-facing viewfinder frame 502 may display an original proportion restoration control 1501. The original proportion restoration control 1501 is configured to adjust the zoom ratio of the rear-facing camera to an initial zoom ratio. It may be understood that the initial zoom ratio of the rear-facing camera is a default zoom ratio of the rear-facing camera after the dual-view recording mode is entered.

The electronic device may detect a user operation performed on the original proportion restoration control 1501. In response to the user operation, the electronic device may adjust the zoom ratio of the rear-facing camera to the initial zoom ratio. In this case, a difference may exist again between the human face proportions in the images acquired by the electronic device with the rear-facing camera and the front-facing camera. Correspondingly, the electronic device may display the user interface 1400 shown in FIG. 2M.

The electronic device may detect a user operation performed on the proportion setting control 1402. In response to the user operation, the electronic device may adjust the zoom ratio of the front-facing camera, and display a user interface 1600 shown in FIG. 2O. The human face proportions in the images displayed in the rear-facing viewfinder frame 502 and the front-facing viewfinder frame 505 in the user interface 1600 are consistent. The front-facing viewfinder frame 505 may display an original proportion restoration control 1601. The original proportion restoration control 1601 is configured to adjust the zoom ratio of the front-facing camera to an initial zoom ratio. It may be understood that the initial zoom ratio of the front-facing camera is a default zoom ratio of the front-facing camera after the dual-view recording mode is entered.

The electronic device may detect a user operation performed on the original proportion restoration control 1601. In response to the user operation, the electronic device may adjust the zoom ratio of the front-facing camera to the initial zoom ratio. In this case, a difference may exist again between the human face proportions in the images acquired by the electronic device with the rear-facing camera and the front-facing camera. Correspondingly, the electronic device may display the user interface 1400 shown in FIG. 2M.

Method 3:

The electronic device may detect a user operation performed on the user interface 1400. In response to the user operation, the electronic device may display the user interface 1500 shown in FIG. 2N or the user interface 1600 shown in FIG. 2O.

For example, the electronic device may detect a double-click operation performed on the user interface 1400. In response to the user operation, the electronic device may adjust the zoom ratio of the rear-facing camera based on the human face proportion in the front-facing viewfinder frame, so that the human face proportion in the rear-facing viewfinder frame is consistent with the human face proportion in the front-facing viewfinder frame. Correspondingly, the electronic device may display the user interface 1500 shown in FIG. 2N.

For example, the electronic device may detect a triple-click operation performed on the user interface 1400. In response to the user operation, the electronic device may adjust the zoom ratio of the front-facing camera based on the human face proportion in the rear-facing viewfinder frame, so that the human face proportion in the front-facing viewfinder frame is consistent with the human face proportion in the rear-facing viewfinder frame. Correspondingly, the electronic device may display the user interface 1600 shown in FIG. 2O.

Certainly, the electronic device may adjust the human face proportions in the front-facing viewfinder frame and the rear-facing viewfinder frame in another manner. This is not limited in this application.

3. Collaborative Zoom (FIG. 2P to FIG. 2U)

The electronic device may detect a user operation performed on the collaborative zoom control 5012 included in the user interface 800. In response to the user operation, the electronic device may display a user interface 1700 shown in FIG. 2P. The user interface 1700 may include a display region 1701. The display region 1701 includes a control 17011, a control 17012, a control 17013, and a control 17014. The control 17011 is configured to trigger to collaboratively increase a zoom ratio. The control 14012 is configured to trigger to collaboratively reduce a zoom ratio. The control 17013 is configured to specifically set a collaborative zoom ratio. It may be understood that, for descriptions of the collaborative zoom ratio, refer to the following text. Details are not described herein. The control 17014 is configured to return to a previous user interface.

The electronic device may detect a user operation performed on the control 17012. In response to the user operation, the electronic device may display the user interface 1300 shown in FIG. 2L.

In some embodiments of this application, the user may trigger set the collaborative zoom ratio.

The electronic device may detect a user operation performed on the control 17013. In response to the user operation, the electronic device may display a user interface 1800 shown in FIG. 2Q. The user interface 1800 may include a display region 1801. The display region 1801 may be a prompt box including a plurality of collaborative zoom ratio options. The display region 1801 includes a control 18011, a control 18012, a control 18013, a control 18014, a control 18015, a control 18016, a control 18017, a control 18018, and a control 18019. The control 18011 is configured to trigger to set the collaborative zoom ratio to 0.5×. The control 18012 is configured to trigger to set the collaborative zoom ratio to 0.8×. The control 18013 is configured to trigger to set the collaborative zoom ratio to 1.2×. The control 18014 is configured to trigger to set the collaborative zoom ratio to 1.6×. The control 18015 is configured to trigger to set the collaborative zoom ratio to 2×. The control 18016 is configured to trigger to set the collaborative zoom ratio to 6×. The control 18017 is configured to trigger to set the collaborative zoom ratio to 10×. The control 18018 is configured to trigger to customize the collaborative zoom ratio. The control 18019 is configured to return to a previous user interface.

The electronic device may detect a user operation performed on the control 18018. In response to the user operation, the electronic device may display a user interface 1900 shown in FIG. 2R. The user interface 1900 may include a display region 1901. The display region 1901 includes an input box 19011 and a control 19012. The input box 19011 is configured to enter the collaborative zoom ratio. The control 19012 is configured to determine data in the input box 19011 to set the collaborative zoom ratio.

A user may enter the collaborative zoom ratio in the input box 19011. For example, the user may enter 20 in the input box 19011. As shown in FIG. 2S, the electronic device may display a user interface 2000. 20 is displayed in the input box 19011 in the user interface 2000. It indicates that the collaborative zoom ratio set by the user is 20×.

The electronic device may detect a user operation performed on the control 19012 included in the user interface 2000. In response to the user operation, the electronic device may display a user interface 2100 shown in FIG. 2T. The user interface 2100 may include a display region 2101. The display region 2101 displays "The entered value is outside a preset collaborative zoom range. Please enter again." and "(The preset collaborative zoom range is 0.5× to 1.5×.)" In other words, 20 entered by the user is outside a collaborative zoom range that can be implemented by the electronic device. The display region 2101 includes a control 21011.

The electronic device may detect a user operation performed on the control 21011. In response to the user operation, the electronic device may display the user interface 1900 shown in FIG. 2R, to allow the user to enter a collaborative zoom ratio again.

In some embodiments of this application, the electronic device may directly display the preset collaborative zoom range, to allow the user to set the collaborative zoom ratio within the range.

The electronic device may detect a user operation performed on the control 18018. In response to the user operation, the electronic device may display a user interface 2200 shown in FIG. 2U. The user interface 2200 includes the display region 1901. The display region 1901 may include a display region 22011 and a control 22012. The user may set the collaborative zoom ratio by dragging a slider in the display region 22011. It may be understood that as shown in FIG. 2U, a range of collaborative zoom ratios that can be implemented by the electronic device is 0.5× to 15×.

It may be understood that in the foregoing process, the user may trigger the recording start control 506 to start dual-view recording.

In some embodiments of this application, the user may set related content of the dual-view recording mode in a settings application.

The electronic device may detect a user operation performed on the settings application icon 201. In response to the user operation, the electronic device may display a user interface 2300 shown in FIG. 2V. The user interface 2300 includes a control 2301. The control 2301 is configured to trigger to enter a recording setting interface.

Figure 2P:
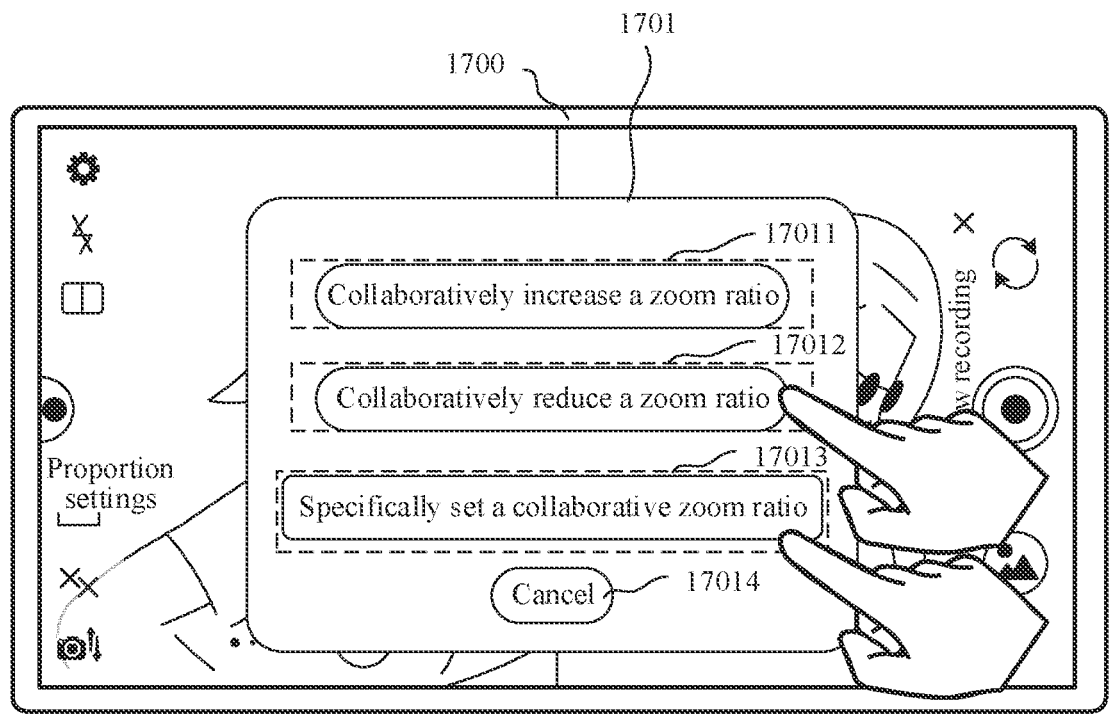
Figure 2Q:
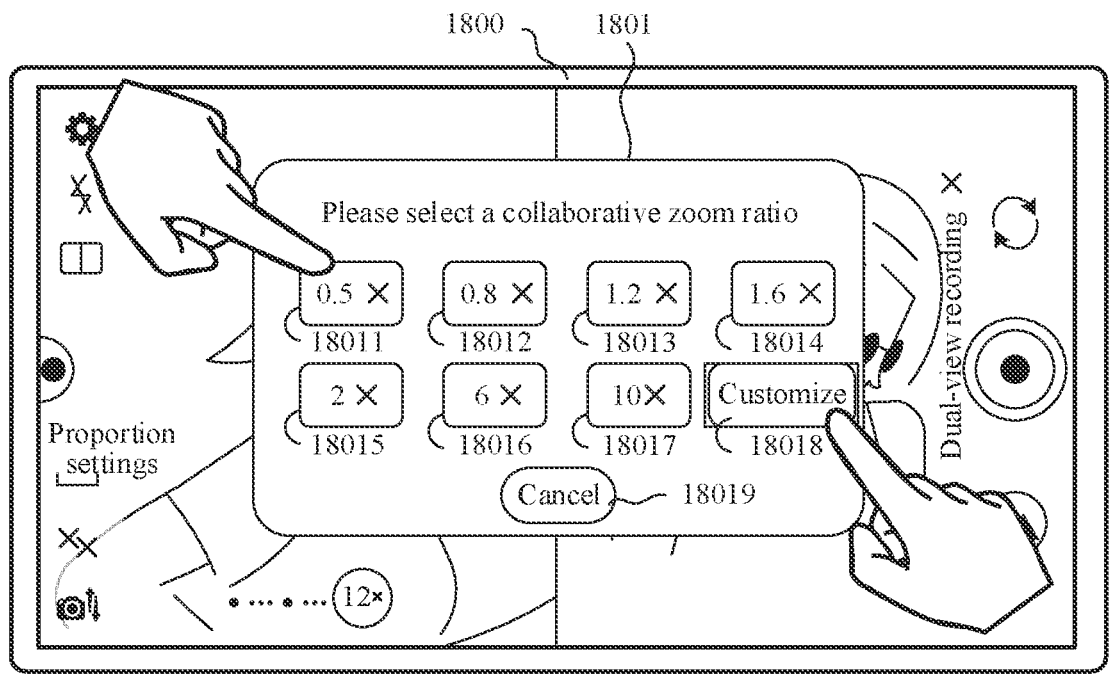
Figure 2R:
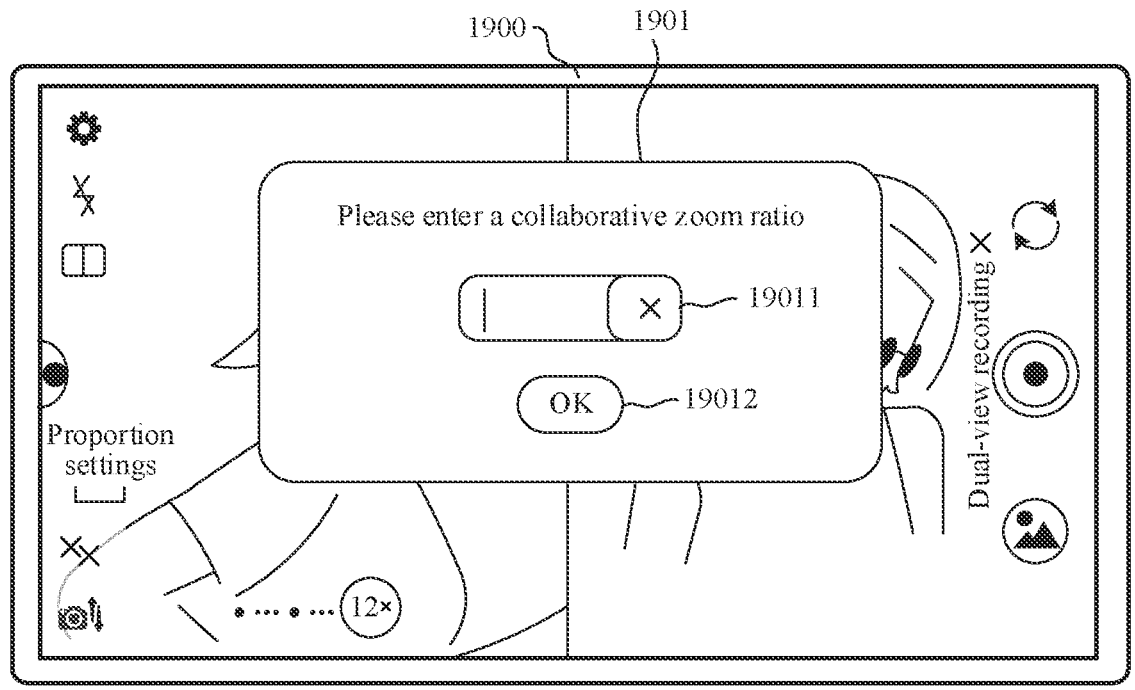
Figure 2S:
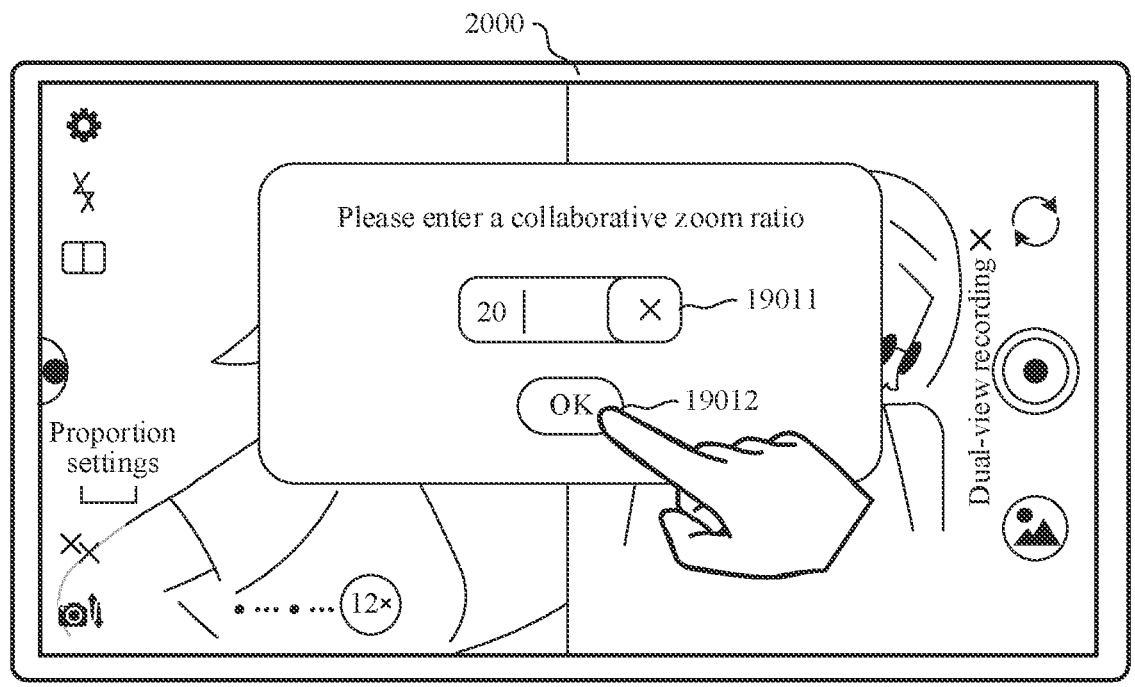
Figure 2T:
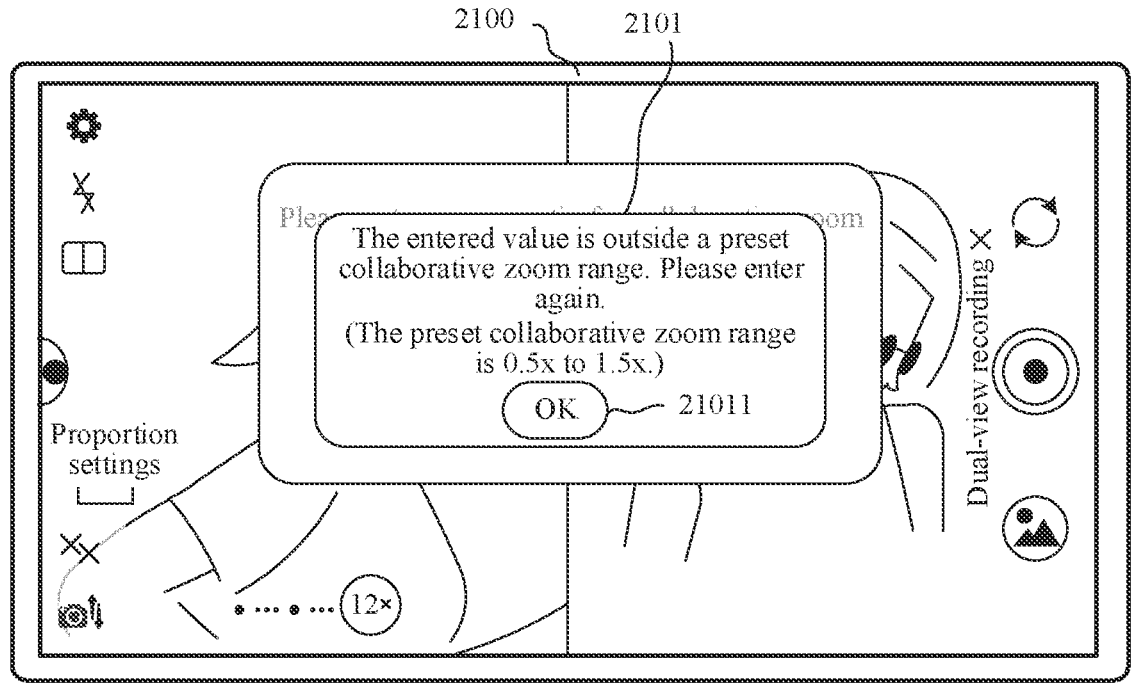

The electronic device may detect a user operation performed on the control 2301. In response to the user operation, the electronic device may display a user interface 2400 shown in FIG. 2W. The user interface 2400 is the recording setting interface. The user interface 2400 includes a control 2401. The control 2401 is configured to trigger to enter a dual-view recording setting interface.

The electronic device may detect a user operation performed on the control 2401. In response to the user operation, the electronic device may display a user interface 2500 shown in FIG. 2X. The user interface 2500 is the dual-view recording setting interface. The user interface 2500 includes a control 2501, a control 2502, and a display region 2503. The control 2501 is configured to set two cameras that are turned on by default in the dual-view recording mode. The control 2502 is configured to set to adjust human face proportions in two viewfinder frames by default in the dual-view recording mode. The display region 2503 includes a control 25031, a control 25032, a control 25033, and a control 25034. The control 25031, the control 25032, the control 25033, and the control 25034 are configured to set a default adjustment rule of the human face proportions in the two viewfinder frames. The control 25031 is configured to set to adjust the human face proportion in the rear-facing viewfinder frame based on the human face proportion in the front-facing viewfinder frame. The control 25032 is configured to set to adjust the human face proportion in the front-facing viewfinder frame based on the human face proportion in the rear-facing viewfinder frame. The control 25033 is configured to set to adjust, using one viewfinder frame with a smaller human face proportion as a reference, a human face proportion in the other viewfinder frame. The control 25034 is configured to set to adjust, using one viewfinder frame with a larger human face proportion as a reference, a human face proportion in the other viewfinder frame.

The electronic device may detect a user operation performed on the control 2501. In response to the user operation, the electronic device may display a user interface 2600 shown in FIG. 2Y. The user interface 2600 includes a display region 2601. The display region 2601 is configured to display different combination forms of the two cameras that are turned on by default in the dual-view recording mode. As shown in FIG. 2Y, in a case that a front-facing camera and a plurality of rear-facing cameras (for example, a rear-facing camera 1, a rear-facing camera 2, and a rear-facing camera 3) are disposed in the electronic device, the user may select, in the display region 2601, two cameras that are turned on by default in the dual-view recording mode.

The electronic device may detect a user operation performed on the control 2502. In response to the user operation, the electronic device may display a user interface 2700 shown in FIG. 2Z. In this case, after entering the dual-view recording mode, the electronic device no longer adjusts a human face proportion in a viewfinder frame by default. The user may use the proportion setting control 5013, the proportion setting control 1401, or the proportion setting control 1402 to trigger to adjust a human face proportion in a viewfinder frame.

It should be noted that the foregoing user interfaces are merely some examples provided in this application and should not be regarded as limits to this application. That is, the foregoing user interfaces may all display more or less content, which is not limited in this application.

The following describes a shooting method provided in this application.

Figure 3A:
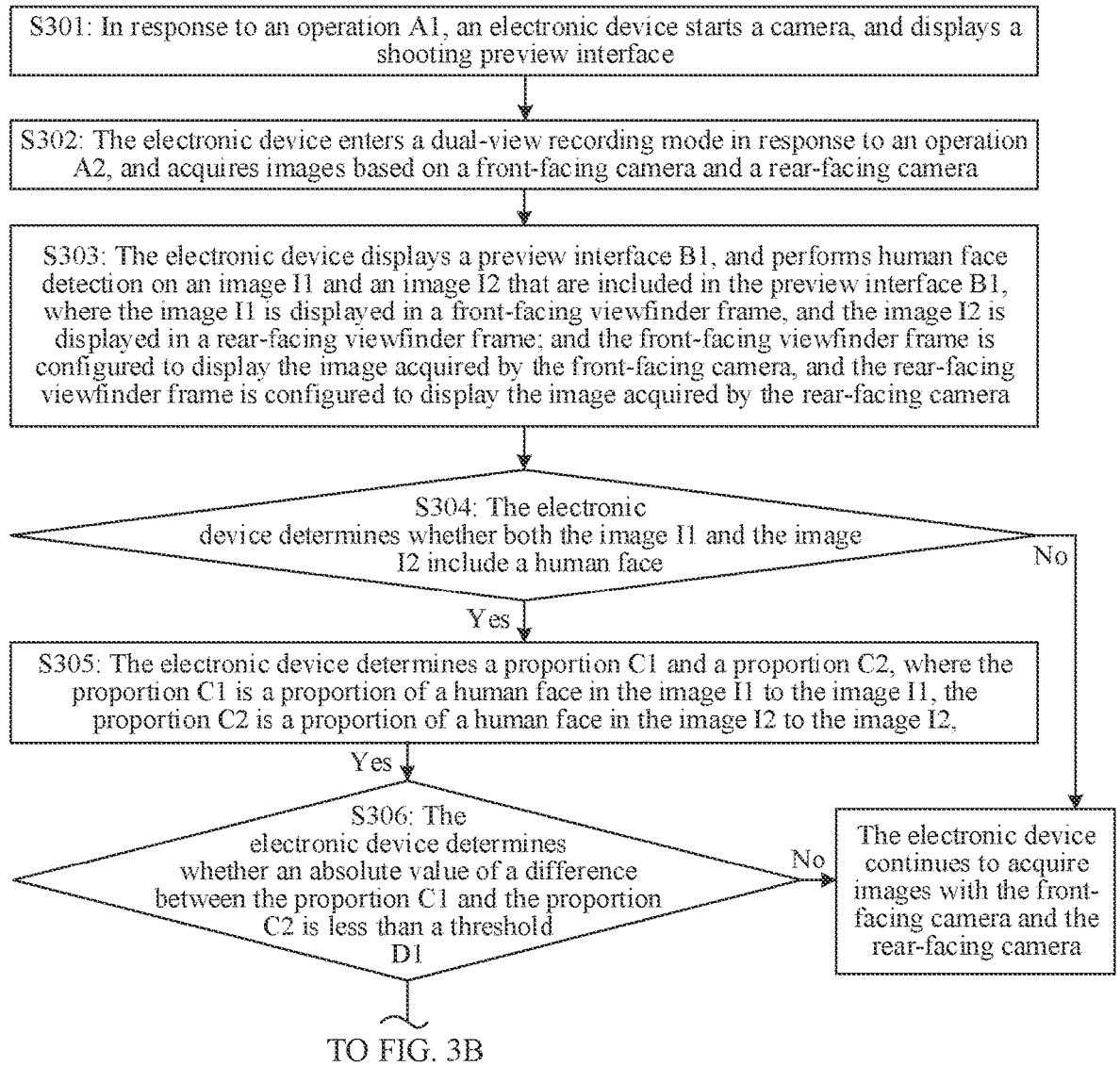

FIG. 3A and FIG. 3B are a flowchart of a photographing method according to an embodiment of this application. The shooting method includes but is not limited to the following steps.

S301: In response to an operation A1, an electronic device starts a camera, and displays a shooting preview interface.

It may be understood that the electronic device may detect the operation A1 on a camera application icon. In response to the operation A1, the electronic device may start the camera, and display the shooting preview interface. The shooting preview interface may include a shutter control and a shooting preview region. Once the electronic device detects a user operation performed on the shutter control, the electronic device may acquire an image with the camera.

It may be understood that the operation A1 may be a touch operation, a voice control operation, a gesture operation, or another user operation. A specific form of the operation A1 is not limited in this application.

For example, the camera application icon may be the camera application icon 202 shown in FIG. 2A. The shooting preview interface may be the shooting interface 300 shown in FIG. 2B.

S302: The electronic device enters a dual-view recording mode in response to an operation A2, and acquires images based on a front-facing camera and a rear-facing camera.

The electronic device may detect the operation A2 performed on the dual-view recording mode control. The electronic device may enter the dual-view recording mode in response to the operation A2, and acquire images based on the front-facing camera and the rear-facing camera.

For example, the dual-view recording mode control may be the dual-view recording mode option 401 shown in FIG. 2C.

In some embodiments of this application, a plurality of rear-facing cameras may be disposed in the electronic device. For example, the plurality of rear-facing cameras may include, but not limited to, an ultra-wide-angle camera, a wide-angle camera, a telephoto camera, and a zoom camera.

In some embodiments of this application, after entering the dual-view recording mode, the electronic device acquires images with the front-facing camera and the rear-facing cameras by default (as shown in FIG. 2D).

Figure 2U:
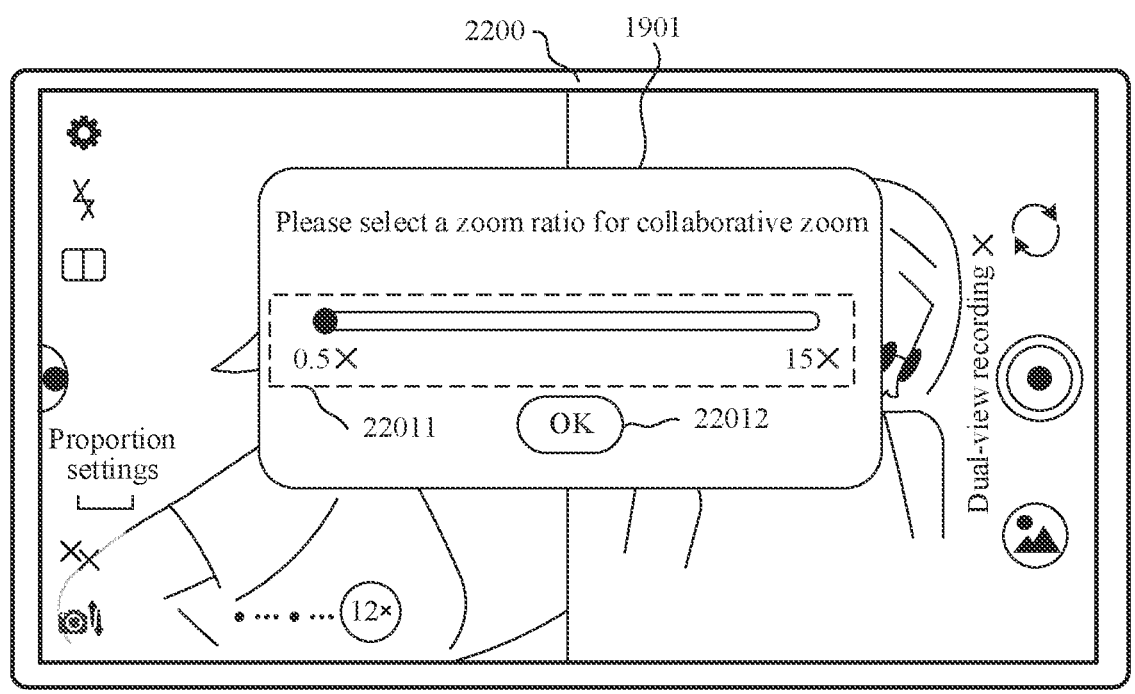
Figure 2V:
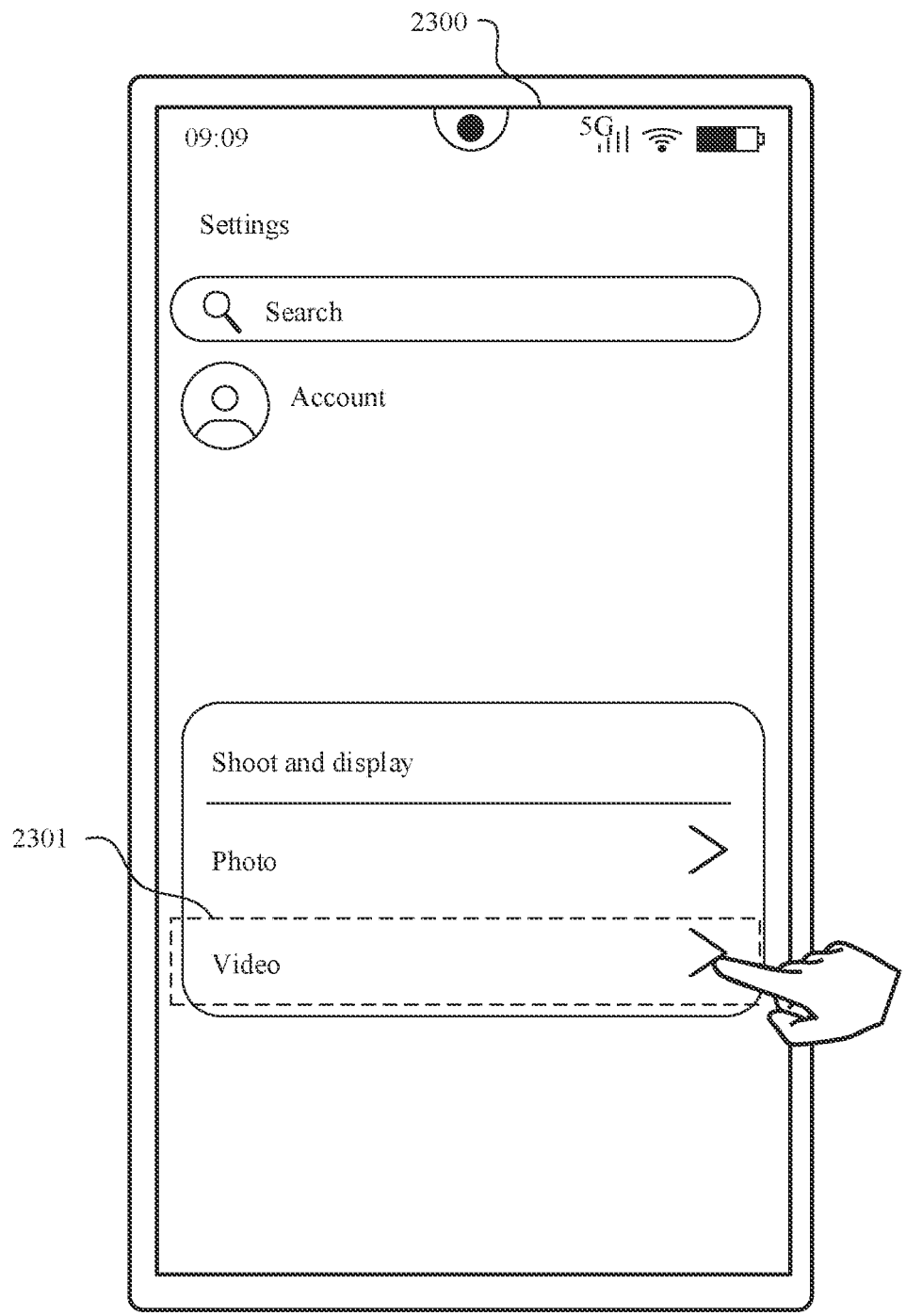
Figure 2W:
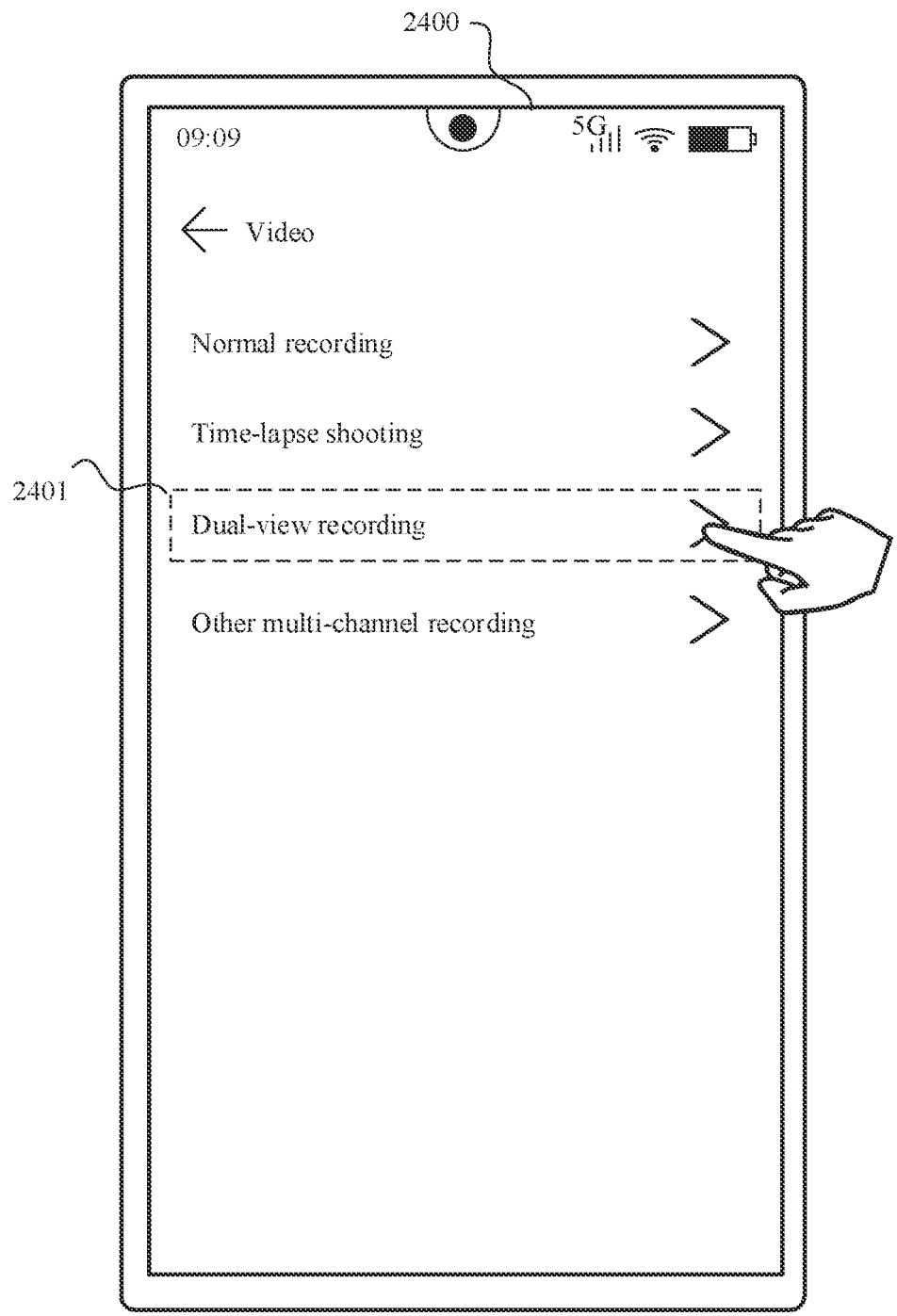
Figure 2X:
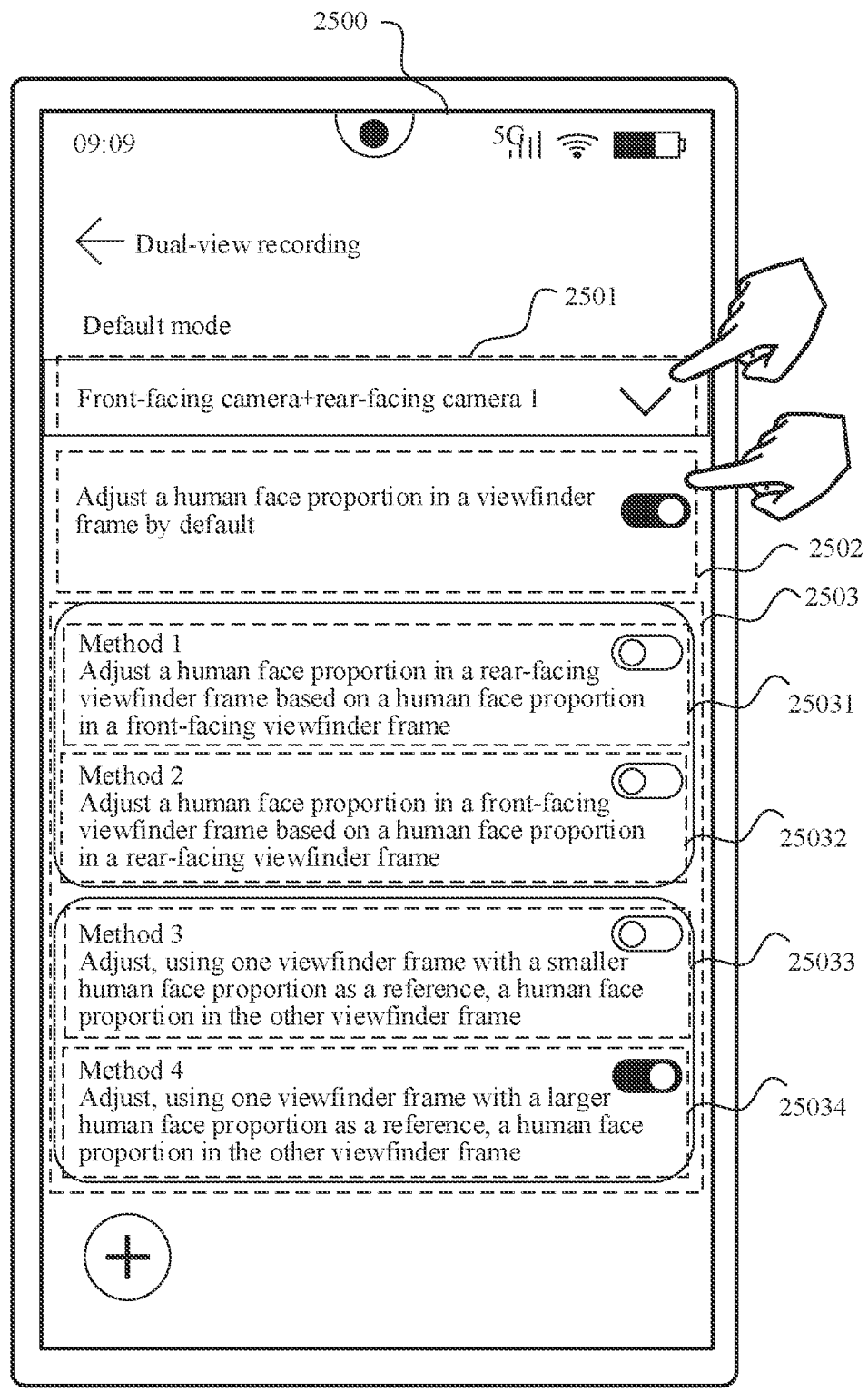
Figure 2Y:
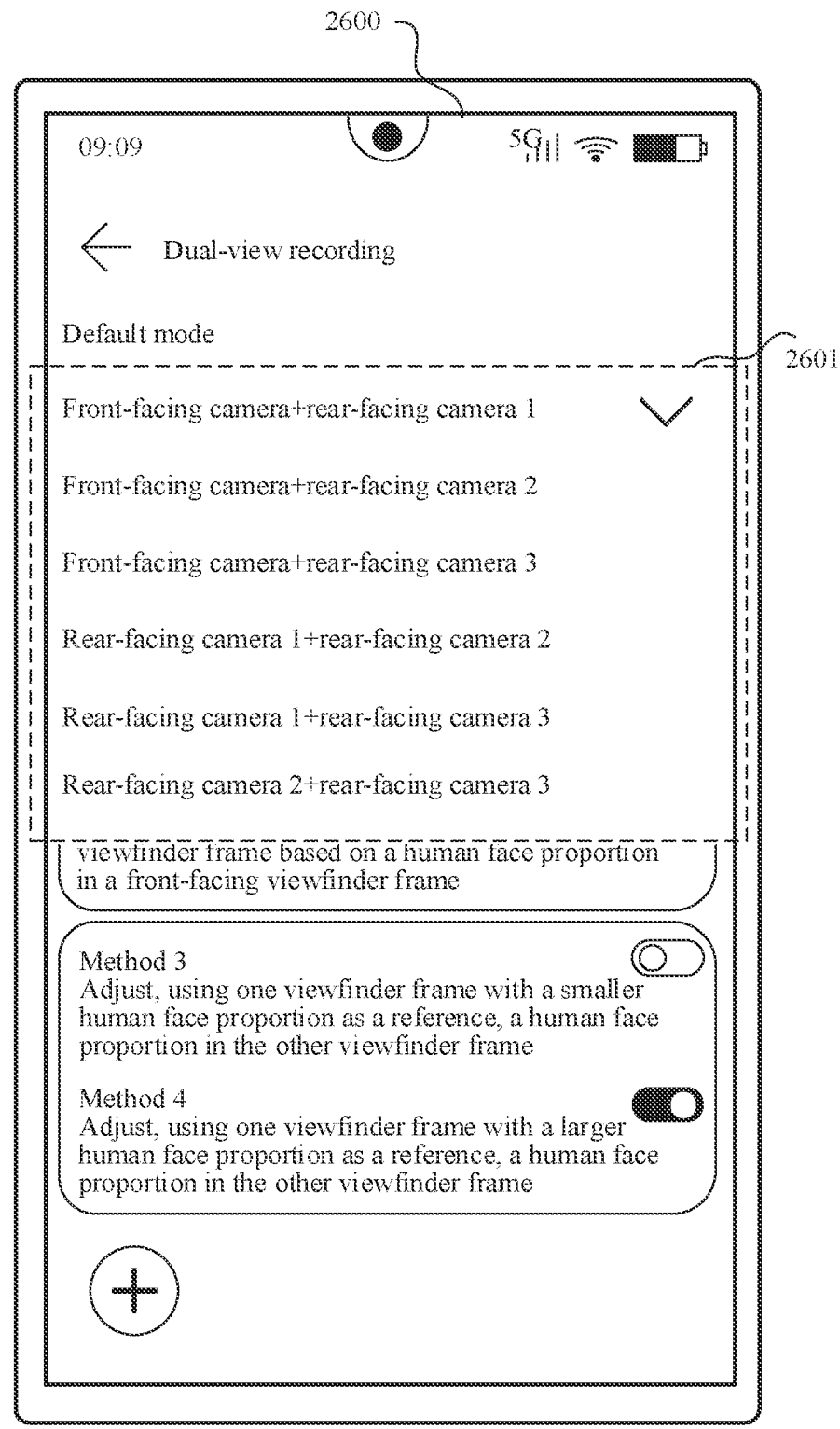
Figure 2Z:
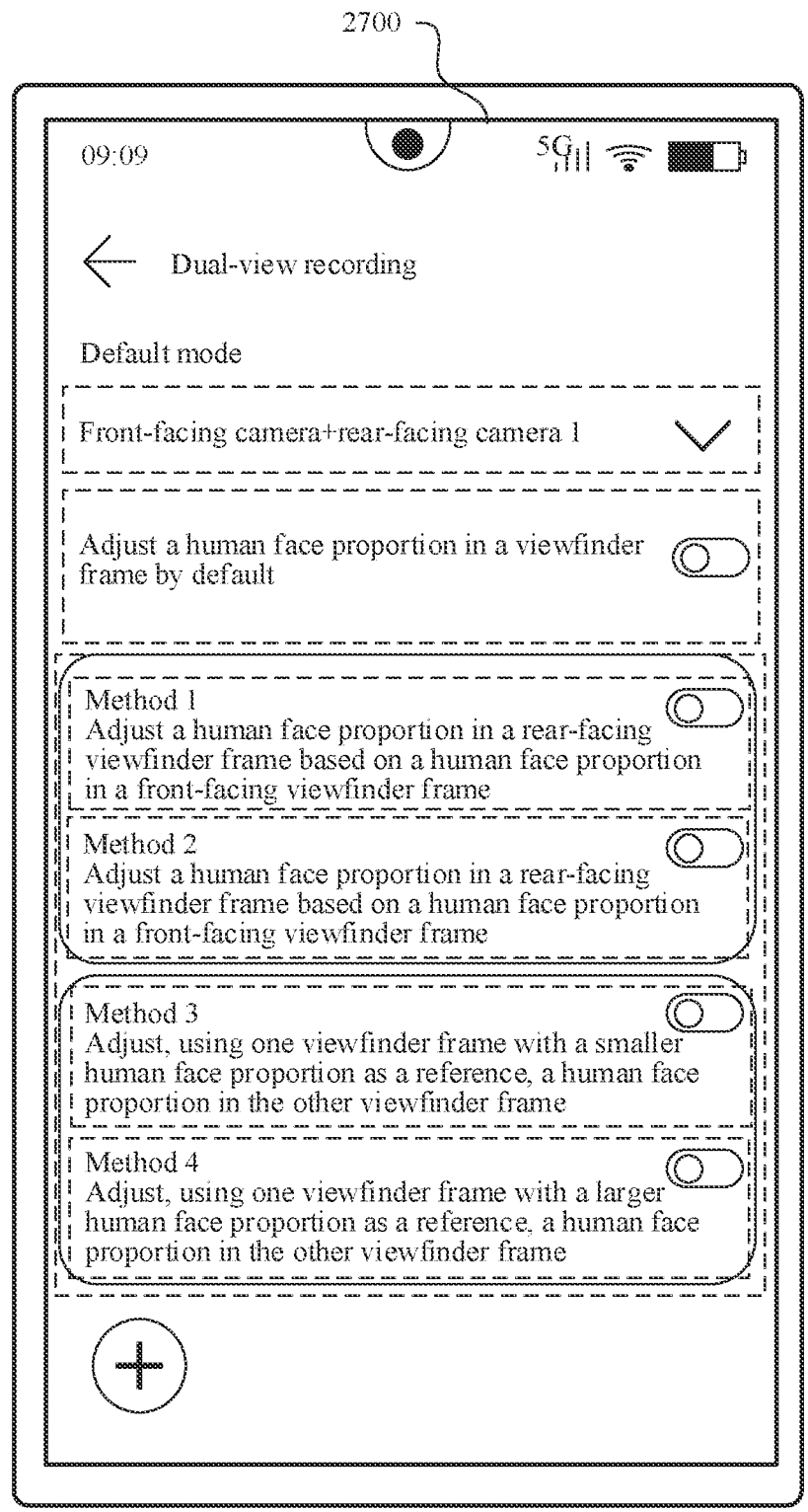

In some embodiments of this application, the user may set a camera used by the electronic device by default in the dual-view recording mode (as shown in FIG. 2U and FIG. 2V). For example, the user may set, in the settings application, that cameras used by the electronic device by default after the dual-view recording mode is entered are a rear-facing wide-angle camera and a rear-facing zoom camera.

S303: The electronic device displays a preview interface B1, and performs human face detection on an image I1 and an image I2 that are included in the preview interface B1. The image I1 is displayed in a front-facing viewfinder frame, and the image I2 is displayed in a rear-facing viewfinder frame. The front-facing viewfinder frame is configured to display an image acquired with the front-facing camera, and the rear-facing viewfinder frame is configured to display an image acquired with the rear-facing camera.

The electronic device may acquire images with the front-facing camera and the rear-facing camera, and display the acquired images in the front-facing viewfinder frame and the rear-facing viewfinder frame in the display. That is, the front-facing viewfinder frame is configured to display the image acquired by the front-facing camera, and the rear-facing viewfinder frame is configured to display the image acquired by the rear-facing camera.

For example, the front-facing viewfinder frame may be the front-facing viewfinder frame 505 shown in FIG. 2D to FIG. 2L. The rear-facing viewfinder frame may be the rear-facing viewfinder frame 502 shown in FIG. 2D to FIG. 2L.

It may be understood that the electronic device may display the preview interface B1 after performing step S302. The preview interface B1 may include the image I1 displayed in the front-facing viewfinder frame and the image I2 displayed in the rear-facing viewfinder frame. The electronic device may further perform human face detection on the image I1 and the image I2. That is, the electronic device may detect whether the image I1 and the image I2 include a human face. The preview interface B1 is a preview interface in the dual-view recording mode. The image I1 and the image I2 are preview images.

For example, the preview interface B1 may be the user interface 700 shown in FIG. 2F. The image I1 may be an image displayed in the front-facing viewfinder frame 505 shown in FIG. 2F. The image I2 may be an image displayed in the rear-facing viewfinder frame 502 shown in FIG. 2F.

It may be understood that the human face detection is determining whether a human face exists in a dynamic scene and a complex background, and separating the human face. In other words, any given image may be searched according to a search policy included in the human face detection to determine whether the image includes a human face.

Human face detection methods are briefly described below.

(1) Template Matching Method

The electronic device may determine a matching degree (that is, a correlation) between an inputted image and one or more preset standard human face models, and then determine, based on the matching degree, whether a human face exists in the image. For example, the electronic device may determine a value relationship between the matching degree and a preset threshold, and determine, based on the value relationship, whether a human face exists in the image. Specifically, if the matching degree is greater than the preset threshold, the electronic device determines that a human face exists in the image, or otherwise, the electronic device determines that no human face exists in the image.

In some embodiments of this application, when determining the matching degree between the inputted image and the one or more preset standard human face models, the electronic device may specifically calculate matching degrees between positions such as a facial contour, a nose, eyes, and a mouth in the inputted image and the standard human face model.

It may be understood that the electronic device may include a template library. The standard human face model may be stored in the template library.

(2) Human Face Rule Method

It may be understood that a human face has particular structural distribution features. The electronic device may extract structural distribution features of a human face from a large number of samples, generate a corresponding rule, and determine, according to the rule, whether a human face exists in an image. The structural distribution features of a human face may include: two symmetric eyes, two symmetric ears, one nose, one mouth, positions and relative distances among the facial features, and the like.

(3) Sample Learning Method

The sample learning method is a method of an artificial neural network. To be specific, a classifier is generated by learning a human face sample set and a non-human face sample set. In other words, the electronic device may train a neural network based on samples. Parameters of the neural network include statistical characteristics of human faces.

(4) Feature Detection Method

The feature detection method is using invariance of human faces in human face detection. Human faces have some robust features with respect to different postures. For example, the color of the eyes and eyebrows of a person is darker than that of the cheek, the color of the lips is darker than that of the surrounding positions of the lips, the color of the bridge of the nose is darker than that on two sides of the bridge of the nose, and the like. The electronic device may extract these features, create a statistical model that can describe relationships between these features, and determine, based on the statistical model, whether a human face exists in an image. It may be understood that the features extracted by the electronic device may be represented as a one-dimensional vector in an image feature space of a human face. When the electronic device creates the statistical model that can describe the relationships between the features, the one-dimensional vector may be converted into a relatively simple feature space.

It should be noted that the foregoing four human face detection methods may be combined in actual detection. In addition, based on the foregoing four human face detection methods, factors such as individual differences (for example, differences in hairstyles, opening and closing of eyes, and the like), blockage of a human face in a shooting environment (for example, blockage of a human face by hair, glasses, and the like), an angle of a human face relative to a camera (for example, a side of a human face is right opposite a camera), a shooting environment (for example, an object near a human face, and the like), and an imaging condition (for example, a light condition, and imaging equipment) may be taken into consideration in human face detection.

It should be noted that the foregoing human face detection methods are merely examples provided in embodiments of this application. The electronic device may perform human face detection by using another human face detection method. The foregoing human face detection methods should not be regarded as limits to this application.

S304: The electronic device determines whether both the image I1 and the image I2 include a human face.

It may be understood that after performing human face detection on the image I1 and the image I2, the electronic device may determine whether both the image I1 and the image I2 include a human face.

It may be understood that if the electronic device detects that both the image I1 and the image I2 do not include a human face, the electronic device may continue to acquire images with the front-facing camera and the rear-facing camera, and no longer performs subsequent steps.

S305: The electronic device determines a proportion C1 and a proportion C2. The proportion C1 is a proportion of a human face in the image I1 to the image I1. The proportion C2 is a proportion of a human face in the image I2 to the image I2.

Specifically, if the electronic device detects that both the image I1 and the image I2 include a human face, the electronic device may determine the proportion of the human face in the image I1 to the image I1, that is, the proportion C1, and the proportion of the human face in the image I2 to the image I2, that is, the proportion C2.

In some embodiments of this application, after detecting the human faces in the image I1 and the image I2, the electronic device may display a human face detection frame on each of the image I1 and the image I2 (as shown in FIG. 2F). It may be understood that the human face detection frame is configured to box-select a human face in an image. In some embodiments of this application, the human face detection frame may be a rectangular frame. Certainly, the human face detection frame may be represented in another shape (for example, a triangle, or the like). This is not limited in this application.

For ease of description, the human face detection frame configured to box-select the human face in the image I1 in this application is denoted as a human face detection frame K1, and the human face detection frame configured to box-select the human face in the image I2 in this application is denoted as a human face detection frame K2.

For example, the human face detection frame K1 may be the human face detection frame 702 shown in FIG. 2F. The human face detection frame K2 may be the human face detection frame 701 shown in FIG. 2F.

In some embodiments of this application, the proportion C1 is a proportion of an area of the human face detection frame K1 to an area of the image I1. The proportion C2 is a proportion of an area of the human face detection frame K2 to an area of the image I2.

It may be understood that in a case that the front-facing viewfinder frame fully displays the image I1, the proportion C1 may be understood as a proportion of the area of the human face detection frame K1 to an area of the front-facing viewfinder frame. Similarly, in a case that the rear-facing viewfinder frame fully displays the image I2, the proportion C2 may be understood as a proportion of the area of the human face detection frame K2 to an area of the rear-facing viewfinder frame.

In some embodiments of this application, after detecting the human faces in the image I1 and the image I2, instead of displaying a human face detection frame on each of the image I1 and the image I2, the electronic device may directly determine a detected human face area, and determine the proportion C1 and the proportion C2 based on the human face area.

S306: The electronic device determines whether an absolute value of a difference between the proportion C1 and the proportion C2 is less than a threshold D1.

It may be understood that after the proportion C1 and the proportion C2 are determined, the electronic device may determine the absolute value of the difference between the proportion C1 and the proportion C2, that is, |the proportion C1−the proportion C2|, and determine whether |the proportion C1−the proportion C2| is less than the threshold D1.

It may be understood that, the threshold D1 may be set according to actual requirements. This is not limited in this application.

In some embodiments of this application, the threshold D1 is 10% of the proportion C1 or 10% of the proportion C2. In some other embodiments of this application, the threshold D1 may be f % of a maximum value/minimum value of the proportion C1 and the proportion C2. f is a positive number. A specific value of f is not limited in this application.

It should be noted that in some embodiments of this application, the electronic device may skip performing step S306.

It may be understood that if the absolute value of the difference between the proportion C1 and the proportion C2 is less than the threshold D1, the electronic device continues to acquire images with the front-facing camera and the rear-facing camera, and no longer performs subsequent steps.

S307: The electronic device determines a target zoom ratio based on the proportion C1 and the proportion C2, and adjust the zoom ratio of the front-facing camera or the rear-facing camera based on the target zoom ratio.

It may be understood that if the absolute value of the difference between the proportion C1 and the proportion C2 is not less than the threshold D1, the electronic device determines the target zoom ratio based on the proportion C1 and the proportion C2, and adjust the zoom ratio of the front-facing camera or the rear-facing camera based to the target zoom ratio.

It should be noted that the zoom ratio in this application may represent a degree of change in a focal length of a camera. Correspondingly, the zoom ratio may also represent a degree of change in an angle of view and a change in size of a shot object in a picture (that is, an image displayed on the display of the electronic device). The shot object is a target object shot by a camera. In some embodiments of this application, the shot object is a human face.

It may be understood that in a case that a distance between the shot object and the camera remains the same, compared with an image acquired with a short-focal length camera, a proportion of the shot object in an image acquired with a long-focal length camera is larger. Specifically, in a case that a focal length is changed to n times an original focal length, a size of the shot object in the picture is also changed to n times an original size. For example, if the focal length of the camera is increased to twice the original focal length, the size of the shot object in the picture is also increased to twice the original size.

In addition, in a case that the focal length is changed, the angle of view also changes correspondingly. Generally, when the focal length is shorter, the angle of view is larger. For example, when the focal length is 15 millimeters (mm), the angle of view is approximately 8 degrees. When the focal length is 10 mm, the angle of view is approximately 12 degrees. When the focal length is 7.5 mm, the angle of view is approximately 14 degrees. When the focal length is 5 mm, the angle of view is approximately 23 degrees. When the focal length is 2.5 mm, the angle of view is approximately 45 degrees.

The zoom ratio may be represented as nx. A meaning of the zoom ratio is changed to n times the original focal length. n is a positive integer. According to the foregoing text, when n is larger, the focal length is longer, the angle of view is smaller, and the shot object in the image acquired with the camera is larger. It may be understood that a specific value of n is not limited in this application. For example, n may be 10, or may be 20, or may be 50. In some embodiments, n may reach 100 or even exceed 100.

In some embodiments of this application, the original focal length is a focal length of a main camera. Basically, the main camera is a camera that is mainly responsible for shooting. Generally, the electronic device may include the main camera and a secondary camera. The main camera is usually configured to capture a shot object (that is, a shooting subject). The main camera has a wide application scope, and may be used in most shooting scenes. The secondary camera is usually configured to add image brightness and details and is used in special shooting scenes such as long-distance shooting and wide-angle shooting. In some other embodiments of this application, the original focal length is a focal length of a standard camera. The standard camera is a camera with an angle of view that is generally within a range of 35 degrees to 50 degrees. A focal length of the standard camera is approximately equal to a diagonal length of an image acquired by the standard camera.

For example, when the electronic device performs shooting with the main camera, a zoom ratio is 1×. The electronic device may detect a user operation performed on the zoom ratio control. In response to the user operation, the electronic device may change the zoom ratio. For example, the electronic device may adjust the zoom ratio to 2×, or may adjust the zoom ratio to 0.6×.

For example, the zoom ratio control may be the zoom ratio control 801 shown in FIG. 2G, or may be the zoom ratio control 1101 shown in FIG. 2J.

It may be understood that the foregoing main camera and standard camera may be rear-facing cameras of the electronic device.

In some embodiments of this application, an original focal length of a front-facing camera of the electronic device is not the same as an original focal length of a rear-facing camera of the electronic device. In other words, a focal length and an angle of view of the front-facing camera of the electronic device when a zoom ratio of the front-facing camera is 1× may be not equal to a focal length and an angle of view of the rear-facing camera of the electronic device when a zoom ratio of the rear-facing camera is 1×.

Generally, a currently used zoom ratio (as shown in FIG. 2E to FIG. 2L) of a camera may be displayed on the display of the electronic device.

In some embodiments of this application, the electronic device may adjust the zoom ratio of the rear-facing camera using a human face proportion (for example, the proportion C1) in a front-facing viewfinder frame as a reference, to adjust a human face proportion in a rear-facing viewfinder frame. In this case, the target zoom ratio is a ratio of the proportion C1 to the proportion C2. Correspondingly, the electronic device may adjust the zoom ratio of the rear-facing camera to the target zoom ratio, so that the human face proportion in the rear-facing viewfinder frame is consistent with the human face proportion in the front-facing viewfinder frame.

In some embodiments of this application, the electronic device may adjust the zoom ratio of the front-facing camera using the human face proportion (for example, the proportion C2) in the rear-facing viewfinder frame as a reference, to adjust a human face proportion in a front-facing viewfinder frame. In this case, the target zoom ratio is a ratio of the proportion C2 to the proportion C1. Correspondingly, the electronic device may adjust the zoom ratio of the front-facing camera to the target zoom ratio, so that the human face proportion in the front-facing viewfinder frame is consistent with the human face proportion in the rear-facing viewfinder frame.

It may be understood that the foregoing human face proportion in the front-facing viewfinder frame is a proportion that is determined by the electronic device and that is of an area of a human face detection frame displayed in the front-facing viewfinder frame to an area of the front-facing viewfinder frame in a case that the front-facing viewfinder frame fully displays the image acquired by the front-facing camera (that is, a size of the front-facing viewfinder frame is the same as a size of the image acquired by the front-facing camera). Similarly, the foregoing human face proportion in the rear-facing viewfinder frame is a proportion that is determined by the electronic device and that is of an area of a human face detection frame displayed in the rear-facing viewfinder frame to an area of the rear-facing viewfinder frame in a case that the rear-facing viewfinder frame fully displays the image acquired by the rear-facing camera (that is, a size of the rear-facing viewfinder frame is the same as a size of the image acquired by the rear-facing camera).

For example, in a case that the proportion C1 is greater than the proportion C2, the electronic device may determine that the target zoom ratio is the ratio of the proportion C1 to the proportion C2. In a case that the proportion C2 is greater than the proportion C1, the electronic device may determine that the target zoom ratio is the ratio of the proportion C2 to the proportion C1.

It should be noted that the user may select to adjust the zoom ratio of the front-facing camera or adjust the zoom ratio of the rear-facing camera. As shown in FIG. 2K, the user may trigger the control 12011 or the control 12012 to determine whether to adjust the zoom ratio of the front-facing camera or adjust the zoom ratio of the rear-facing camera.

It may be understood that the electronic device may adjust a zoom ratio of a camera through optical zoom. The optical zoom is an effect that is generated when locations of a lens of the camera, a shot object, and a focus are changed. The optical zoom may specifically include moving a lens in a case that a photosensitive element in the camera is kept stationary. That is, it is equivalent to that the focus is moving. In other words, a focal length changes correspondingly. Therefore, a size of the shot object in an image changes correspondingly.

In some embodiments of this application, a camera (for example, a zoom camera) of the electronic device may include a plurality of groups of zoom lenses. The electronic device may change the focal length of the camera by changing relative locations of different zoom lenses (for example, by moving the lenses). In this way, the zoom ratio of the camera is adjusted. Correspondingly, the size of the shot object in the image changes correspondingly.

In some embodiments of this application, the electronic device may include a plurality of rear-facing cameras. In a case that focal lengths of the plurality of rear-facing cameras are different, the electronic device may adjust a zoom ratio by switching the rear-facing cameras.

For example, the rear-facing cameras of the electronic device may include a standard camera, a wide-angle camera, an ultra-wide-angle camera, and a telephoto camera. A focal length of the standard camera is 50 mm, a focal length of the wide-angle camera is 30 mm, a focal length of the ultra-wide-angle camera is 20 mm, and a focal length of the telephoto camera is 100 mm. It may be understood that the electronic device may switch from the standard camera to the telephoto camera, to adjust the zoom ratio from 1× to 2×. The electronic device may switch from the standard camera to the wide-angle camera, to adjust the zoom ratio from 1× to 0.6×.

Similarly, the electronic device may also include a plurality of front-facing cameras. In a case that focal lengths of the plurality of front-facing cameras are different, the electronic device may adjust a zoom ratio by switching the front-facing cameras. It may be understood that for specific descriptions about switching the front-facing cameras, refer to the foregoing descriptions about switching the rear-facing cameras. Details are not described herein again.

It may be understood that the electronic device may adjust a zoom ratio of a camera through digital zoom (that is, digital zoom). The digital zoom is increasing or reducing an area of each pixel in an image through a process of a camera module of the electronic device to implement zoom in or zoom out. It may be understood that the digital zoom is essentially processing and compensating for an image in a software manner, but does not really change a focal length. In this case, the zoom ratio is a change ratio of an area of a pixel. For example, in a case that the zoom ratio is changed from 1× to 10×, an area of each pixel in an image is increased to 10 times an original area.

In some embodiments of this application, the electronic device may implement digital zoom using a software module (for example, image processing software). For example, the electronic device may crop an acquired image using the software module, to reduce an area in a surrounding region of a shot object in an image, to increase a proportion of the shot object in the image to a cropped image. The electronic device may amplify the cropped image using the software module. It may be understood that when cropping the acquired image, the electronic device may keep the shot object in a central region of the cropped image.

In some embodiments of this application, the foregoing software module may be disposed in an image signal processor (Image Signal Processor. ISP) of the electronic device.

It may be understood that the electronic device may adjust a zoom ratio of a camera through hybrid zoom. As the name implies, the hybrid zoom is a zoom mode that combines optical zoom and digital zoom. In some embodiments of this application, the hybrid zoom may include software enhancement and calculation. Specifically, in a process of the hybrid zoom, the electronic device may synthesize a plurality of frames of images into one frame of image with optimal quality. It may be understood that the quality of image in this application may include considerations in factors such as definition, brightness, and color.

In some embodiments of this application, the electronic device may first acquire an image through optical zoom. The acquired image may fail to meet zoom requirements of a user. Further, the electronic device may process (for example, perform digital zoom on) the image using a corresponding module (for example, the foregoing software module) to obtain a processed image. The processed image meets the zoom requirements of the user.

For example, the electronic device may first adjust a zoom ratio of a camera to 5× through optical zoom, and acquire an image based on the zoom ratio. The electronic device then amplifies a size of the acquired image to twice that of an original image based on the processor of the camera module and the software module, and crops the amplified image to make the size of the image meet a shooting size. It may be understood that the shooting size is a size of an image acquired by the camera, for example, full screen, 1:1, 4:3, 16:9, or the like. It may be understood that compared with an image acquired before zoom, a proportion of a shot object in the cropped image is 10 times that before zoom. In other words, the electronic device adjusts the zoom ratio of the camera to 10× based on optical zoom, digital zoom, and corresponding software processing.

It should be noted that the electronic device may adjust the zoom ratio of the camera in other manners. This is not limited in this application.

It should be noted that, in some embodiments of this application, if the target zoom ratio is not within a preset zoom range, the electronic device may select a zoom ratio closest to the target zoom ratio from the preset zoom range, and adjust the zoom ratio of the front-facing camera or the rear-facing camera to the zoom ratio. It may be understood that, the preset zoom range is related to software and hardware configurations (for example, an optical zoom capability and a digital zoom capability of a camera, and a software processing capability) of the electronic device, and may be specifically set according to actual requirements.

S308: The electronic device displays a preview interface B2. The preview interface B2 includes an image I3 and an image I4. The image I3 is displayed in a front-facing viewfinder frame, and the image I4 is displayed in a rear-facing viewfinder frame. An absolute value of a difference between a proportion C3 and a proportion C4 is less than a threshold D2. The proportion C3 is a proportion of a human face in the image I3 to the image I3. The proportion C4 is a proportion of a human face in the image I4 to the image I4. The threshold D2 is less than the threshold D1.

It may be understood that after adjusting the zoom ratio of the front-facing camera or the rear-facing camera, the electronic device may display the preview interface B2. The preview interface B2 may include the image I3 and the image I4. The image I3 is displayed in a front-facing viewfinder frame, and the image I4 is displayed in a rear-facing viewfinder frame. An absolute value of a difference between the proportion C3 and the proportion C4 is less than the threshold D2. The proportion C3 is a proportion of a human face in the image I3 to the image I3. The proportion C4 is a proportion of a human face in the image I4 to the image I3.

It should be noted that the absolute value of the difference between the proportion C3 and the proportion C4 is less than the absolute value of the difference between the proportion C1 and the proportion C2.

For example, the preview interface B2 may be the user interface 800 shown in FIG. 2G.

In some embodiments of this application, after detecting the human faces in the image I3 and the image I4, the electronic device may display a human face detection frame on each of the image I3 and the image I4. It may be understood that for descriptions of the human face detection frame, refer to the foregoing text. Details are not described herein again.

For ease of description, the human face detection frame configured to box-select the human face in the image I3 in this application is denoted as a human face detection frame K3, and the human face detection frame configured to box-select the human face in the image I4 in this application is denoted as a human face detection frame K4.

In some embodiments of this application, the proportion C3 is a proportion of an area of the human face detection frame K3 to an area of the image I3. The proportion C4 is a proportion of an area of the human face detection frame K4 to an area of the image I4.

It may be understood that in a case that the front-facing viewfinder frame fully displays the image I3, the proportion C3 may be understood as a proportion of the area of the human face detection frame K3 to an area of the front-facing viewfinder frame. Similarly, in a case that the rear-facing viewfinder frame fully displays the image I4, the proportion C4 may be understood as a proportion of the area of the human face detection frame K4 to an area of the rear-facing viewfinder frame.

In some embodiments of this application, after detecting the human faces in the image I3 and the image I4, instead of displaying a human face detection frame (as shown in FIG. 2G) on each of the image I3 and the image I4, the electronic device may directly determine a detected human face area, and determine the proportion C3 and the proportion C4 based on the human face area.

In some embodiments of this application, an absolute value of a difference between the proportion C3 and the proportion C4 is less than the threshold D2. It may be understood that, the threshold D2 may be set according to actual requirements. This is not limited in this application. In some embodiments of this application, the threshold D2 is less than the threshold D1. In some embodiments of this application, the threshold D2 may be 0.01. In some other embodiments of this application, the threshold D2 may be 0.1.

In some embodiments of this application, after determining the target zoom ratio based on the proportion C1 and the proportion C2, the electronic device adjusts the zoom ratio of the front-facing camera to the target zoom ratio. The electronic device may continue to acquire images with the front-facing camera and the rear-facing camera, and display the image I3 and the image I4 in the front-facing viewfinder frame and the rear-facing viewfinder frame. For example, the target zoom ratio may be a ratio of the proportion C2 to the proportion C1.

In some embodiments of this application, after determining the target zoom ratio based on the proportion C1 and the proportion C2, the electronic device adjusts the zoom ratio of the rear-facing camera to the target zoom ratio. The electronic device may continue to acquire images with the front-facing camera and the rear-facing camera, and display the image I3 and the image I4 in the front-facing viewfinder frame and the rear-facing viewfinder frame. For example, the target zoom ratio may be a ratio of the proportion C1 to the proportion C2.

In some embodiments of this application, the image I3 may be an image obtained by processing the image I1. For example, the electronic device may amplify and crop the image I1 to obtain the image I3.

In some embodiments of this application, the image I3 may be the image I1.

In some embodiments of this application, the image I4 may be an image obtained by processing the image I2. For example, the electronic device may amplify and crop the image I2 to obtain the image I4.

In some embodiments of this application, the image I4 may be the image I2.

It should be noted that after acquiring an original image with the front-facing camera, the electronic device may process the original image to obtain a processed image, and display, on the display, the processed image, for example, the image I3. Similarly, after acquiring an original image with the rear-facing camera, the electronic device may process the original image to obtain a processed image, and display, on the display, the processed image, for example, the image I4.

S309: The electronic device collaboratively adjusts the zoom ratios of the front-facing camera and the rear-facing camera in response to an operation A3, and displays a preview interface B3. The preview interface B3 includes an image I5 and an image I6. The image I5 is displayed in a front-facing viewfinder frame, and the image I6 is displayed in a rear-facing viewfinder frame. An absolute value of a difference between a proportion difference E1 and a proportion difference E2 is less than a threshold D3. The proportion difference E1 is a difference between a proportion C5 and the proportion C3. The proportion difference E2 is a difference between a proportion C6 and the proportion C4. The proportion C5 is a proportion of a human face in the image I5 to the image I5. The proportion C6 is a proportion of a human face in the image I6 to the image I6.

The electronic device may detect the operation A3 performed on the collaborative zoom control. The electronic device may collaboratively adjust the zoom ratios of the front-facing camera and the rear-facing camera in response to the operation A3, and display the preview interface B3. The preview interface B3 includes the image I5 and the image I6. The image I5 is displayed in a front-facing viewfinder frame, and the image I6 is displayed in a rear-facing viewfinder frame.

For example, the collaborative zoom control may be the collaborative zoom control 5012 shown in FIG. 2G. The preview interface B3 may be the user interface 1300 shown in FIG. 2L. The image I5 may be an image displayed in the front-facing viewfinder frame 505 shown in FIG. 2L. The image I6 may be an image displayed in the rear-facing viewfinder frame 502 shown in FIG. 2L.

It may be understood that, the absolute value of the difference between the proportion difference E1 and the proportion difference E2 is less than the threshold D3. The proportion difference E1 is the difference between the proportion C5 and the proportion C3. The proportion difference E2 is the difference between the proportion C6 and the proportion C4. The proportion C5 is a proportion of a human face in the image I5 to the image I5. The proportion C6 is a proportion of a human face in the image I6 to the image I6.

It may be understood that, the threshold D3 may be set according to actual requirements. This is not limited in this application. In some embodiments of this application, the threshold D3 may be 0.01. In some other embodiments of this application, the threshold D3 may be 0.1.

In some embodiments of this application, after the electronic device displays the preview interface B3, the user may click the recording start control to trigger dual-view recording.

In some embodiments of this application, after the electronic device performs step S308, the user may click the recording start control to trigger dual-view recording. In a process of performing dual-view recording, the electronic device may collaboratively adjust the zoom ratios of the front-facing camera and the rear-facing camera in response to the operation, and display a dual-view recording interface B4. The dual-view recording interface B4 may include the image I5 and the image I6. The image I5 is displayed in a front-facing viewfinder frame, and the image I6 is displayed in a rear-facing viewfinder frame. It may be understood that for related descriptions of the image I5 and the image I6, refer to the foregoing text. Details are not described herein again.

In some embodiments of this application, the electronic device may adjust the zoom ratios of the front-facing camera and the rear-facing camera based on the collaborative zoom ratio. It may be understood that the collaborative zoom ratio in this application is a zoom ratio using the zoom ratios of the front-facing camera and the rear-facing camera before the operation A3 is performed as a reference. Colloquially, the collaborative zoom ratio in this application is a ratio by which a shot object displayed in the front-facing viewfinder frame and the rear-facing viewfinder frame are amplified or shrunk together. The collaborative zoom ratio may represent a degree of collaborative change in a size of the shot object in images acquired based on the front-facing viewfinder frame and the rear-facing viewfinder frame.

For example, before the electronic device performs step S306, the zoom ratio of the front-facing camera of the electronic device is 1×, and the zoom ratio of the rear-facing camera is 1×. After the electronic device performs step S306, the zoom ratio of the front-facing camera of the electronic device is 2×, and the zoom ratio of the rear-facing camera remains unchanged and is still 1×. In this case, human face proportions in the images acquired by the electronic device with the front-facing camera and the rear-facing camera are consistent. The electronic device may detect the operation A3. The electronic device may perform collaborative zoom on the front-facing camera and the rear-facing camera in response to the operation A3. It may be understood that when the collaborative zoom ratio is 2×, it means that focal lengths of the front-facing camera and the rear-facing camera are adjusted to twice original focal lengths. In other words, the electronic device adjusts the zoom ratio of the front-facing camera to 4×, and adjusts the zoom ratio of the rear-facing camera to 2×.

For example, before the electronic device performs step S306, the zoom ratio of the front-facing camera of the electronic device is 1×, and the zoom ratio of the rear-facing camera is 1×. After the electronic device performs step S306, the zoom ratio of the rear-facing camera of the electronic device is 2×, and the zoom ratio of the front-facing camera remains unchanged and is still 1×. In this case, human face proportions in the images acquired by the electronic device with the front-facing camera and the rear-facing camera are consistent. The electronic device may detect the operation A3. The electronic device may perform collaborative zoom on the front-facing camera and the rear-facing camera in response to the operation A3. It may be understood that when the collaborative zoom ratio is 0.5×, it means that the focal lengths of the front-facing camera and the rear-facing camera are adjusted to 0.5 times the original focal lengths. In other words, the electronic device adjusts the zoom ratio of the front-facing camera to 1×, and adjusts the zoom ratio of the rear-facing camera to 0.5×.

In some embodiments of this application, the electronic device may determine a front-facing zoom ratio and a rear-facing zoom ratio based on the collaborative zoom ratio, adjust the zoom ratio of the front-facing camera to the front-facing zoom ratio, and adjust the zoom ratio of the rear-facing camera to the rear-facing zoom ratio. For ease of description, in this application, the zoom ratio of the front-facing camera before the collaborative zoom is denoted as n1×, and the zoom ratio of the rear-facing camera before the collaborative zoom is denoted as n2×. In this application, the collaborative zoom ratio may be denoted as m×. n1, n2, and m are all positive integers. The electronic device may determine that the front-facing zoom ratio is (n1×m)×, and the rear-facing zoom ratio is (n2×m)×.

For example, before the electronic device performs step S306, the zoom ratio of the front-facing camera of the electronic device is 1×, and the zoom ratio of the rear-facing camera is 1×. After the electronic device performs step S306, the zoom ratio of the front-facing camera of the electronic device is 3×, and the zoom ratio of the rear-facing camera remains unchanged and is still 1×. In this case, human face proportions in the images acquired by the electronic device with the front-facing camera and the rear-facing camera are consistent. The electronic device may detect the operation A3. The electronic device may perform collaborative zoom on the front-facing camera and the rear-facing camera in response to the operation A3. It may be understood that when the collaborative zoom ratio is 2×, it means that focal lengths of the front-facing camera and the rear-facing camera are adjusted to twice original focal lengths. The electronic device may determine that the front-facing zoom ratio is 6×, and the rear-facing zoom ratio is 2×. The electronic device may adjust the zoom ratio of the front-facing camera to 6×, and adjust the zoom ratio of the rear-facing camera to 2×.

It should be noted that, in some embodiments of this application, the collaborative zoom ratio is within a preset collaborative zoom range. The front-facing zoom ratio and the rear-facing zoom ratio are within a preset zoom range. For descriptions of the preset zoom range, refer to the foregoing text. Details are not described herein again. It may be understood that, similar to the preset zoom range, the preset collaborative zoom range is also related to software and hardware configurations (for example, an optical zoom capability and a digital zoom capability of a camera, and a software processing capability) of the electronic device, and may be specifically set according to actual requirements.

In some embodiments of this application, the collaborative zoom ratio may include a first default collaborative zoom ratio and a second default collaborative zoom ratio. Specifically, in a case that the electronic device detects a user operation of collaboratively increasing a zoom ratio, the electronic device perform zoom on the front-facing camera and the rear-facing camera based on the first default collaborative zoom ratio. In a case that the electronic device detects a user operation of collaboratively reducing a zoom ratio, the electronic device perform zoom on the front-facing camera and the rear-facing camera based on the second default collaborative zoom ratio.

For example, the electronic device may detect a user operation performed on the control 17011 included in the user interface 1700 shown in FIG. 2P. In response to the user operation, the electronic device may perform zoom on the front-facing camera and the rear-facing camera based on the first default collaborative zoom ratio.

For example, the electronic device may detect a user operation performed on the control 17012 included in the user interface 1700 shown in FIG. 2P. In response to the user operation, the electronic device may perform zoom on the front-facing camera and the rear-facing camera based on the second default collaborative zoom ratio.

In some embodiments of this application, the collaborative zoom ratios may be set by the user.

The following describes an apparatus revolved in an embodiment of this application.

Figure 4:
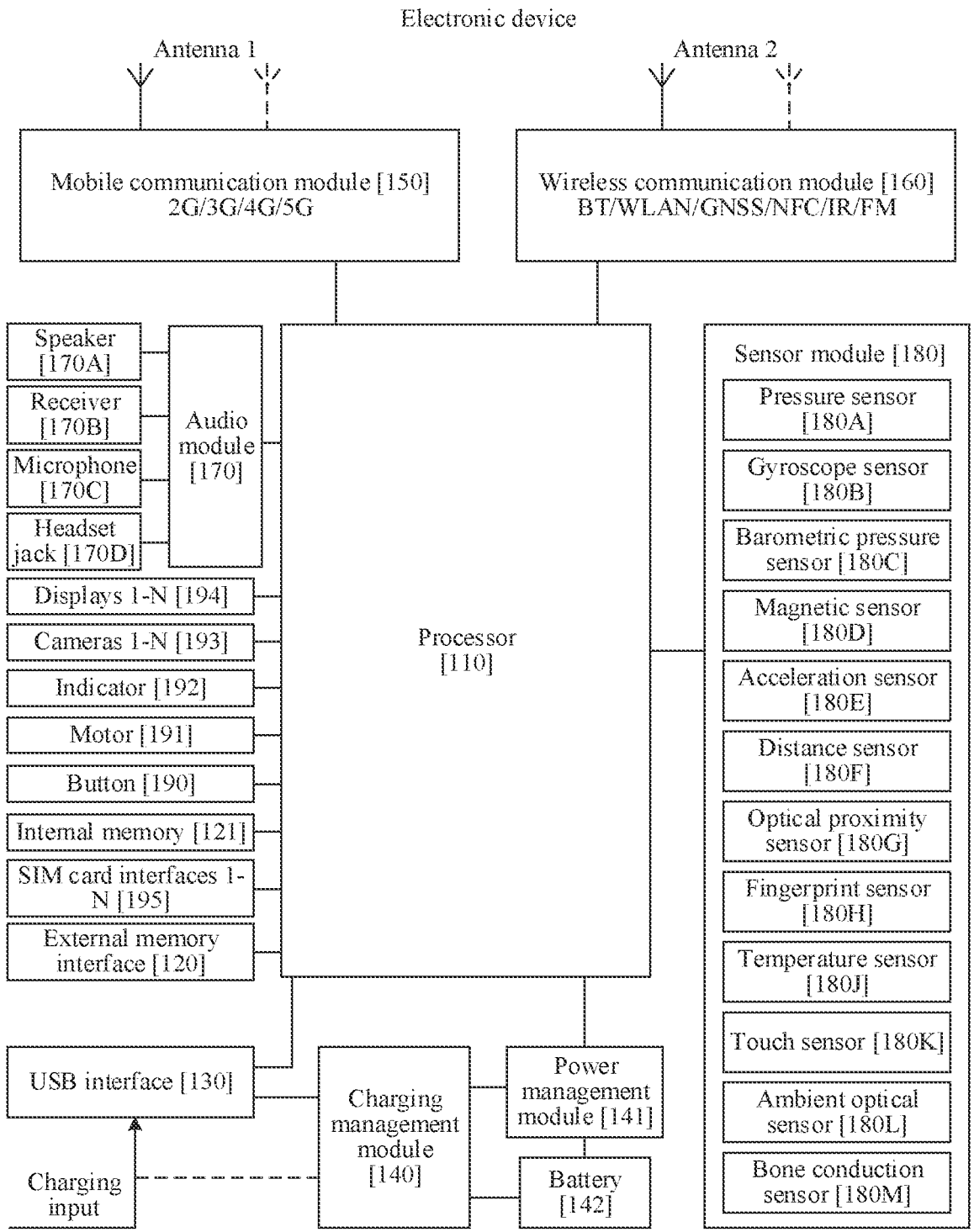
FIG. 4 is a schematic diagram of a hardware structure of an electronic device according to an embodiment of this application.

FIG. 4 is a schematic diagram of a hardware structure of an electronic device according to an embodiment of this application.

The electronic device may include a processor 110, an external memory interface 120, an internal memory 121, a universal serial bus (Universal Serial Bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (Subscriber Identification Module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient optical sensor 180L, a bone conduction sensor 180M, and the like.

It may be understood that the structure illustrated in this embodiment of the present invention does not constitute a specific limitation on the electronic device. In some other embodiments of this application, the electronic device may include more or fewer components than those shown in the figure, or combine some components, or split some components, or have a different component arrangement. The components in the figure may be implemented by hardware, software or a combination of software and hardware.

The processor 110 may include one or more processing units. For example, the processor 110 may include an application processor (Application Processor, AP), a modem processor, a graphics processing unit (Graphics Processing unit, GPU), an image signal processor (ISP), a controller, a memory, a video codec, a digital signal processor (Digital Signal Processor. DSP), a baseband processor, a neural-network processing unit (Neural-network Processing Unit, NPU), and/or the like. Different processing units may be independent devices or may be integrated into one or more processors.

A controller may be a nerve center and command center of the electronic device. The controller may generate an operation control signal based on instruction operation code and a timing signal, to complete control of instruction reading and instruction execution.

In an embodiment provided in this application, the electronic device may perform the shooting method through the processor 110.

A memory may further be disposed in the processor 110, and is configured to store instructions and data. In some embodiments the memory in the processor 110 is a cache memory. The memory may store instructions or data that is just used or is cyclically used by the processor 110. If the processor 110 needs to use the instructions or the data again, the processor may directly call the instructions or the data from the memory, to prevent repeated access and reduce waiting time of the processor 110, thereby improving system efficiency.

In some embodiments, the processor 110 may include one or more interfaces. The USB interface 130 is an interface that complies with a USB standard specification, and may be specifically a Mini USB interface, a Micro USB interface, a USB Type C interface, or the like. The USB interface 130 may be configured to connect to the charger to charge the electronic device, or may be configured for data transmission between the electronic device and a peripheral device, or may be configured to connect to a headset to play audio through the headset. The interface may alternatively be configured to be connected to another electronic device such as an AR device.

The charging management module 140 is configured to receive a charging input from a charger. The charging management module 140, while charging the battery 142, may also supply power to the electronic device through the power management module 141.

The power management module 141 is configured to be connected to the battery 142, the charging management module 140, and the processor 110. The power management module 141 receives input from the battery 142 and/or the charging management module 140, and supplies power to the processor 110, the internal memory 121, the external memory, the display 194, the camera 193, the wireless communication module 160, and the like.

A wireless communication function of the electronic device may be implemented through the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna in the electronic device may be configured to cover a single communication frequency band or a plurality of communication frequency bands. Different antennas may be further multiplexed to increase an antenna utilization rate.

The mobile communication module 150 may provide a solution that includes wireless communication such as 2G/3G/4G/5G and that is applied to the electronic device. The mobile communication module 150 may include at least one filter, a switch, a power amplifier, a low noise amplifier (Low Noise Amplifier, LNA), and the like. The mobile communication module 150 may receive an electromagnetic wave by using the antenna 1, perform processing such as filtering and amplification on the received electromagnetic wave, and send the processed electromagnetic wave to the modem processor for demodulation. The mobile communication module 150 may further amplify a signal modulated by the modem processor, and convert, through the antenna 1, the amplified signal into an electromagnetic wave for radiation.

The modulation and demodulation processor may include a modulator and a demodulator. The modulator is configured to modulate a to-be-sent low-frequency baseband signal into an intermediate-/high-frequency signal. The demodulator is configured to demodulate the received electromagnetic wave signal into a low-frequency base-band signal. Then the demodulator transfers the low-frequency base-band signal obtained through demodulation to the base-band processor for processing. The low-frequency base-band signal is processed by the base-band processor and then transferred to an application processor. The application processor outputs a sound signal by using an audio device (which is not limited to the speaker 170A, the telephone receiver 170B, and the like), or displays an image or a video by using the display 194.

The wireless communication module 160 may provide a wireless communication solution that is applied to the electronic device and that includes a wireless local area network (Wireless Local Area Networks, WLAN) (for example, a wireless fidelity (Wireless Fidelity, Wi-Fi) network), Bluetooth (Bluetooth, BT), a global navigation satellite system (Global Navigation Satellite System, GNSS), frequency modulation (Frequency Modulation, FM), a near field communication (Near Field Communication, NFC) technology, an infrared (Infrared, IR) technology, and the like. The wireless communication module 160 may be one or more devices integrating at least one communications processor module. The wireless communication module 160 receives an electromagnetic wave through the antenna 2, performs frequency modulation and filtering processing on an electromagnetic wave signal, and sends the processed signal to the processor 110. The wireless communication module 160 may further receive a to-be-sent signal from the processor 110, perform frequency modulation and amplification on the to-be-sent signal, and convert the to-be-sent signal into an electromagnetic wave for radiation by using the antenna 2.

In some embodiments, the antenna 1 and the mobile communication module 150 in the electronic device are coupled, and the antenna 2 and the wireless communication module 160 are coupled, so that the electronic device can communicate with a network and another device by using a wireless communication technology.

The electronic device implements a display function through the GPU, the display 194, the application processor, and the like. The GPU is a microprocessor for image processing and connects the display 194 and the application processor. The GPU is configured to perform mathematical and geometric computation, and render an image. The processor 110 may include one or more GPUs, and the GPU executes program instructions to generate or change display information.

The display 194 is configured to display an image, a video, or the like. The display 194 includes a display panel. The display panel may be a liquid crystal display (Liquid Crystal Display, LCD), an organic light-emitting diode (Organic Light-Emitting Diode, OLED), an active-matrix organic light emitting diode (Active-Matrix Organic Light Emitting Diode, AMOLED), a flexible light-emitting diode (Flex Light-Emitting Diode, FLED), a mini-LED, a micro-LED, a micro-OLED, a quantum dot light emitting diode (Quantum Dot Light Emitting Diodes, QLED), or the like. In some embodiments, the electronic device may include one or N displays 194, where N is a positive integer greater than 1.

The electronic device may implement an obtaining function by using the ISP, the camera 193, the video codec, the GPU, the display 194, the application processor, and the like.

The ISP is configured to handle data returned by the camera 193. For example, during shooting, a shutter is enabled, light is transmitted to a camera photosensitive element through a lens, an optical signal is converted into an electrical signal, and the camera photosensitive element transmits the electrical signal to the ISP for processing, to convert the electrical signal into an image or a video visible to a naked eye. The ISP may also perform algorithm optimization on noise point, brightness, and color of an image. The ISP may further optimize parameters such as exposure and a color temperature of a shooting scene. In some embodiments, the ISP may be disposed in the camera 193.

The camera 193 is configured to capture a still image or a video. An optical image of an object is generated through a lens, and is projected onto a photosensitive element. The photosensitive element may be a charge coupled device (Charge Coupled Device, CCD) or a complementary metal-oxide-semiconductor (Complementary Metal-Oxide-Semiconductor, CMOS) phototransistor. The photosensitive element converts an optical signal into an electrical signal, and then transfers the electrical signal to the ISP to convert the electrical signal into a digital image or a video signal. The ISP outputs the digital image or the video signal to the DSP for processing. The DSP converts the digital image or the video signal into an image or a video signal in a standard format, for example, RGB or YUV.

In some embodiments, the electronic device may include one or N cameras 193. N is a positive integer greater than 1. For example, in some embodiments, the electronic device may obtain images with a plurality of exposure coefficients through the N cameras 193. Further, during video post-processing, the electronic device may synthesize an HDR image through HDR technology based on the images with a plurality of exposure coefficients.

The digital signal processor is configured to process a digital signal. In addition to processing a digital image or video signal, the digital signal processor may further process another digital signal. For example, when the electronic device performs frequency selection, the digital signal processor is configured to perform Fourier transform and the like on frequency energy.

The video encoder and decoder is configured to compress or decompress a digital video. The electronic device may support one or more video codecs. In this way, the electronic device may play or record videos in a plurality of coding formats, for example, moving picture experts group (Moving Picture Experts Group, MPEG)-1, MPEG-2, MPEG-3, and MPEG-4.

The NPU is a neural-network (Neural-Network, NN) computing processor, quickly processes input information by referring to a structure of a biological neural network, for example, a transmission mode between neurons in a human brain, and may further continuously perform self-learning. Applications such as intelligent cognition of the electronic device may be implemented by using the NPU, for example, image recognition, facial recognition, voice recognition, and text understanding.

The external memory interface 120 may be configured to connect to an external storage card, for example, a micro-SD card, to extend a storage capability of the electronic device. The external memory card communicates with the processor 110 by using the external memory interface 120, to implement a data storage function, for example, store files such as music and a video into the external memory card.

The internal memory 121 may be configured to store computer executable program code, and the executable program code includes an instruction. The processor 110 runs the instructions stored in the internal memory 121, to perform various functional applications and data processing of the electronic device. The internal memory 121 may include a storage program area and a storage data area. The program storage area may store an operating system, an application required by at least one function (for example, a sound playing function or an image/video playing function), and the like. The data storage area may store data (for example, audio data or a phone book) created in a use process of the electronic device.

The electronic device may implement audio functions by using the audio module 170, the speaker 170A, the receiver 170B, the microphone 170C, the headset jack 170D, the application processor, and the like, such as music playing and audio recording.

The audio module 170 is configured to convert digital audio information into an analog audio signal for outputting, and is also configured to convert an analog audio input into a digital audio signal.

The speaker 170A, also referred to as a "horn", is configured to convert an electrical audio signal into a sound signal.

The phone receiver 170B, also referred to as "handset", is configured to convert an electrical audio signal into a sound signal.

The microphone 170C, also referred to as a "mic" or "microphone", is configured to convert sound signals into electrical signals. At least one microphone 170C may be disposed on the electronic device.

The headset jack 170D is configured to connect a wired earphone.

The sensor module 180 may include one or more sensors, and these sensors may be of a same type or different types. It may be understood that, the sensor module 180 shown in FIG. 4 is merely an example division manner, and there may be another division manner. This is not limited in this application.

The pressure sensor 180A is configured to sense a pressure signal, and is capable of converting the pressure signal to an electrical signal. In some embodiments, the pressure sensor 180A may be provided at the display 194. When a touch operation is performed on the display 194, the electronic device detects a strength of the touch operation by using the pressure sensor 180A. The electronic device may also calculate a touch location based on a detection signal of the pressure sensor 180A. In some embodiments, touch operations performed on a same touch position with different touch operation strength may correspond to different operation instructions.

The gyroscope sensor 180B may be configured to determine a motion posture of the electronic device. In some embodiments, an angular velocity of the electronic device around three axes (namely, an x axis, a y axis, and a z axis) may be determined by using the gyroscope sensor 180B. The gyroscope sensor 180B may be used for image stabilization in image capture.

The barometric pressure sensor 180C is used to measure a barometric pressure. In some embodiments, the electronic device calculates an altitude through a barometric pressure value measured by the barometric pressure sensor 180C, to assist in positioning and navigation.

The magnetic sensor 180D may include a Hall sensor. The electronic device may detect opening and closing of a flip cover or a leather case through the magnetic sensor 180D.

The acceleration sensor 180E may detect magnitudes of acceleration of the electronic device in various directions (generally on three axes). When the electronic device is static, magnitude and a direction of gravity may be detected, may be further configured to recognize a posture of the electronic device, and is applied to applications such as switching between a landscape mode and a portrait mode and a pedometer.

A distance sensor 180F is configured to measure a distance. The electronic device may measure a distance through infrared or laser. In some embodiments, in a shooting scene, the electronic device may measure a distance through the distance sensor 180F, to implement quick focusing.

The optical proximity sensor 180G may include, for example, a light emitting diode (LED) and an optical detector. The electronic device detects infrared reflected light from a nearby object through the photodiode.

The ambient optical sensor 180L is configured to sense ambient light luminance. The electronic device may adaptively adjust a luminance of the display 194 based on the perceived brightness of the ambient light. The ambient light sensor 180L may also be configured to automatically adjust the white balance in shooting. The ambient light sensor 180L may further cooperate with the optical proximity sensor 180G to detect whether the electronic device is in a pocket, to prevent an accidental touch.

In some embodiments of this application, the ambient light sensor 180L in the electronic device may be configured to obtain ambient brightness and transmit the ambient brightness to a corresponding processing module (for example, the processor 110).

The fingerprint sensor 180H is configured to obtain a fingerprint.

The temperature sensor 180J is configured to detect a temperature.

The touch sensor 180K is also called a "touch panel". The touch sensor 180K may be disposed on the display 194. The touch sensor 180K and the display 194 form a touchscreen, also referred to as a "touchscreen". The touch sensor 180K is configured to detect a touch operation on or near the touch sensor The touch sensor can transfer the detected touch operation to the application processor to determine a type of a touch event. The touch sensor may provide a visual output related to the touch operation by using the display 194. In some other embodiments, the touch sensor 180K may be alternatively disposed on a surface of the electronic device, which is different from the position of the display 194.

The bone conduction sensor 180M may collect a vibration signal.

The button 190 includes a power-on/off button, a volume button, and the like. The button 190 may be a mechanical button, or may be a touch button. The electronic device may receive key input and generate key signal input related to user setting and function control of the electronic device.

The motor 191 may generate a vibration alert. The motor 191 may be configured to provide a vibration alert for an incoming call, and may be further configured to provide vibration feedback for a touch. For example, touch operations performed on different applications (for example, shooting or audio playing) may correspond to different vibration feedback effects. The motor 191 may also correspond to different vibration feedback effects for touch operations applied to different areas of the display 194. Different application scenarios (for example, a time reminder, information receiving, an alarm clock, and a game) may further correspond to different vibration feedback effects. The touch vibration feedback effect may also be customized.

The indicator 192 may be an indicator light, may be configured to indicate a charging status or a change in charge, and may be further configured to indicate a message, a missed incoming call, a notification, and the like.

The SIM card interface 195 is configured to connect to an SIM card. The SIM card may be inserted into the SIM card interface 195 or unplugged from the SIM card interface 195, to come into contact with or be separated from the electronic device. The electronic device can support 1 or N SIM card interfaces, where N is a positive integer greater than 1. The electronic device exchanges with a network by using a SIM card, to implement functions such as a call and data communication. In some embodiments, the electronic device uses an eSIM, that is, an embedded SIM card. The eSIM card may be embedded in the electronic device and cannot be separated from the electronic device.

A software structure of the electronic device may use a layered architecture, an event-driven architecture, a microkernel architecture, a microservice architecture, or a cloud architecture.

Figure 5:
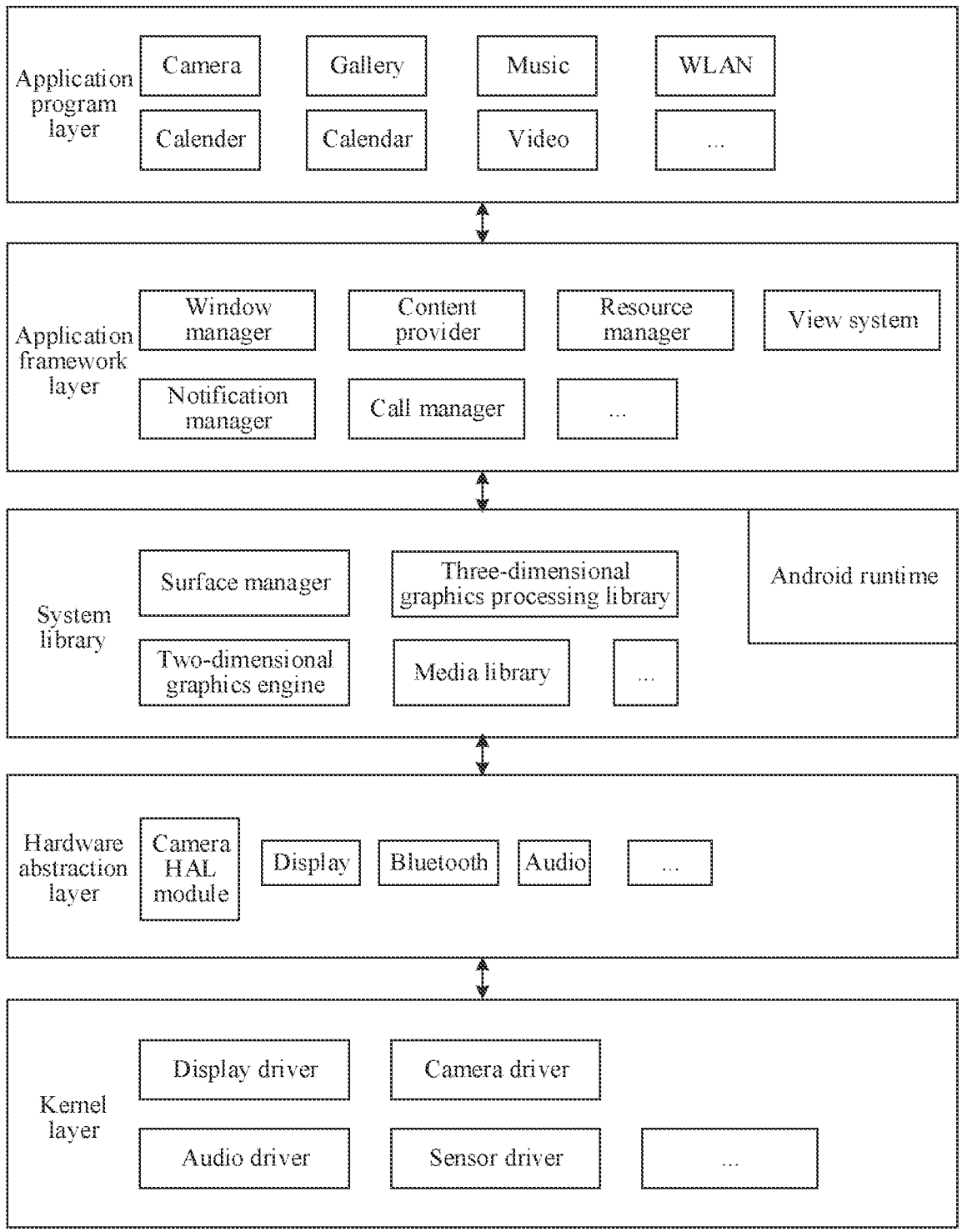
FIG. 5 is a schematic diagram of a software structure of an electronic device according to an embodiment of this application.

FIG. 5 is a schematic diagram of a software structure of an electronic device according to an embodiment of this application.

As shown in FIG. 5, a software framework of the electronic device in this application may include an application program layer, an application program framework layer (framework, FWK), a system library, an Android runtime, a hardware abstraction layer, and a kernel layer (kernel).

The application layer may include a series of application packages, such as a camera, a gallery, a calendar, a phone, WLAN, music, a video, and other application programs (also referred to as applications). The camera is configured to capture an image and a video. For other applications of the application layer, reference may be made description and explanation in conventional technologies, which is not described in this application. In this application, an application on the electronic device may be a native application (for example, an application installed in the electronic device when an operating system is installed before the electronic device is delivered from a factory), or may be a third-party application (for example, an application downloaded and installed by a user by using an AppGallery). This is not limited in this embodiment of this application.

The application program framework layer provides an application programming interface (Application Programming Interface, API) and a programming framework for the application programs at the application program layer. An application framework layer includes some predefined functions.

As shown in FIG. 5, the application framework layer may include a window manager, a content provider, a view system, a phone manager, a resource manager, notification manager, and the like.

The window manager is configured to manage a window application. The window manager may obtain a size of a display, determine whether there is a state bar, perform screen locking, take a screenshot, and the like.

The content provider is configured to store and obtain data, and enable the data to be accessible by an application program. The data may include a video, an image, audio, calls that are made and answered, a browsing history and bookmarks, an address book, and the like.

The view system includes visual controls such as a control for displaying a text and a control for display a picture. The view system may be configured to create an application program. A display user interface may include one or more views. For example, a display user interface including a message notification icon may include a view for displaying text and a view for displaying pictures.

The call manager is configured to provide a communication function of the electronic device, for example, management of a call state (including answering, declining, or the like).

The resource manager provides various resources for an application program, such as a localized string, an icon, a picture, a layout file, and a video file.

The notification manager enables an application to display notification information in a state bar, and may be configured to convey a notification message that may automatically disappear after a short pause without requiring user interaction. For example, the notification manager is configured to provide a notification of download completion, a message reminder, and the like. The notification manager may alternatively be a notification that appears on a top state bar of the system in a form of a graph or a scroll bar text, for example, a notification of an application running on the background, or may be a notification that appears on the screen in a form of a dialog user interface. For example, text information is displayed in the state bar, a prompt tone is made, the electronic device vibrates, or the indicator light flashes.

Runtime (Runtime) includes a core library and a virtual machine. The runtime is responsible for scheduling and managing a system.

The core library includes two parts: a performance function that needs to be invoked by a programming language (for example, java language), and a system core library.

The application program layer and the application program framework layer are run in the virtual machine. The virtual machine executes programming files (for example, Java files) of the application layer and the application framework layer as binary files. The virtual machine is configured to perform functions such as lifecycle management of an object, stack management, thread management, security and exception management, and garbage collection.

The system library may include a plurality of functional modules, for example, a surface manager (Surface Manager), a media library (Media Libraries), a three-dimensional graphics processing library (for example, OpenGL ES), and a two-dimensional graphics engine (for example, SGL).

The surface manager is configured to manage a display subsystem and provides fusion between a two-dimensional (2-Dimensional, 2D) layer and a three-dimensional (3-Dimensional, 3D) layer for a plurality of application programs.

The media library supports playback and recording in a plurality of commonly used audio and video formats, static image files, and the like. The media library may support a plurality of audio and video encoding formats, such as: MPEG 4, H.264, MP3, AAC, AMR, JPG, and PNG.

The three-dimensional graphics processing library is used for implementing 3D graphics drawing, image rendering, composition, layer processing, and the like.

The 2D graphics engine is a drawing engine of the 2D drawing.

The hardware abstraction layer (HAL) is an interface layer between an operating system kernel and an upper layer of software, and is intended to abstract hardware. The hardware abstraction layer is an abstraction interface driven by a device kernel, and is used to provide an application programming interface for accessing an underlying device to a higher-level Java API framework. The HAL includes a plurality of library modules, such as a camera HAL module, a display, Bluetooth, and audio. Each library module implements an interface for a specific type of hardware component. When a system framework layer API requires to access hardware of a portable device, an Android operating system loads the library module for the hardware component. In some embodiments of this application, the user may trigger to adjust the zoom ratio of the front-facing camera or the rear-facing camera.

The kernel layer is a basis of the Android operating system, and a function of the Android operating system is finally completed through the kernel layer. The kernel layer includes at least a display driver, a camera driver, an audio driver, and a sensor driver, It should be noted that the schematic diagram of the software structure of the electronic device shown in FIG. 5 provided in this application is only an example, and does not limit specific module division in different layers of the Android operating system. For details, refer to the description of the software structure of the Android operating system in conventional technologies. In addition, the shooting method provided in this application may also be implemented based on another operating system, which is not listed one by one in this application.

The foregoing embodiments are merely intended for describing the technical solutions of this application, but not for limiting this application. Although this application is described in detail with reference to the foregoing embodiments, persons of ordinary skill in the art should understand that the persons of ordinary skill may still make modifications to the technical solutions described in the foregoing embodiments or make equivalent replacements to some technical features thereof, without departing from the scope of the technical solutions of embodiments of this application.

What is claimed is:

1. A shooting method, comprising:
    detecting a first operation performed on a first control;
    entering a dual-view recording mode in response to the first operation, and acquiring images based on a first camera and a second camera;
    displaying a first interface that comprises a first image and a second image, wherein a proportion of a target object region in the first image to the first image is a first proportion, a proportion of a target object region in the second image to the second image is a second proportion, and an absolute value of a difference between the first proportion and the second proportion is a first value; and
    displaying a second interface that comprises a third image and a fourth image, wherein the second interface is displayed after a zoom ratio of the first camera or the second camera is adjusted, a proportion of a target object region in the third image to the third image is a third proportion, a proportion of a target object region in the fourth image to the fourth image is a fourth proportion, and an absolute value of a difference between the third proportion and the fourth proportion is a second value,
    wherein the first image and the third image are acquired by the first camera,
    wherein the second image and the fourth image are acquired by the second camera, and
    wherein the second value is less than the first value.

2. The method of claim 1, wherein displaying the second interface is in response to a second operation performed on the first interface.

3. The method of claim 2, wherein the first interface comprises a second control and a third control, the second control is configured to adjust the zoom ratio of the first camera, the third control is configured to adjust the zoom ratio of the second camera, each zoom ratio represents a degree of change in a focal length of a respective camera, and detecting the second operation and displaying the second interface comprises:
    detecting the second operation performed on the second control, and displaying the second interface, wherein the fourth proportion is equal to the second proportion, and the third proportion is not equal to the first proportion; or
    detecting the second operation performed on the third control, and displaying the second interface, wherein the fourth proportion is not equal to the second proportion, and the third proportion is equal to the first proportion.

4. The method of claim 3, wherein the second control is located in a first viewfinder frame in the second interface, the first viewfinder frame is configured to display the images acquired with the first camera, the third control is located in a second viewfinder frame in the second interface, and the second viewfinder frame is configured to display the images acquired with the second camera.

5. The method of claim 3, wherein the first interface comprises a fourth control, and before displaying the second interface, the method further comprises displaying a prompt region in the first interface in response to an operation performed on the fourth control, wherein the prompt region in the first interface comprises the second control and the third control.

6. The method of claim 1, wherein before displaying the second interface, the method further comprises:
determining a target zoom ratio based on the first proportion and the second proportion; and
adjusting the zoom ratio of the first camera or the second camera based on the target zoom ratio, wherein a zoom ratio represents a degree of change in a focal length of a camera.

7. The method of claim 6, wherein the target zoom ratio is a ratio of the first proportion to the second proportion, and adjusting the zoom ratio of the first camera or the second camera based on the target zoom ratio comprises adjusting the zoom ratio of the second camera to the target zoom ratio if the target zoom ratio is within a preset zoom range.

8. The method of claim 6, wherein the target zoom ratio is a ratio of the first proportion to the second proportion, and adjusting the zoom ratio of the first camera or the second camera based on the target zoom ratio comprises selecting a zoom ratio closest to the target zoom ratio from a preset zoom range if the target zoom ratio is not within the preset zoom range, and adjusting the zoom ratio of the second camera to the zoom ratio closest to the target zoom ratio.

9. The method of claim 6, wherein the target zoom ratio is a ratio of the second proportion to the first proportion, and adjusting the zoom ratio of the first camera or the second camera based on the target zoom ratio comprises adjusting the zoom ratio of the first camera to the target zoom ratio if the target zoom ratio is within a preset zoom range.

10. The method of claim 6, wherein the target zoom ratio is a ratio of the second proportion to the first proportion, and adjusting the zoom ratio of the first camera or the second camera based on the target zoom ratio comprises selecting a zoom ratio closest to the target zoom ratio from a preset zoom range the target zoom ratio is not within the preset zoom range, and adjusting the zoom ratio of the first camera to the zoom ratio closest to the target zoom ratio.

11. The method of claim 1, wherein after displaying the second interface, the method further comprises:
detecting a third operation performed on a fifth control, wherein the third operation is to adjust the zoom ratios of the first camera and the second camera based on a collaborative zoom ratio, and the collaborative zoom ratio is an increase ratio or a decrease ratio of the zoom ratios of the first camera and the second camera; and
displaying a third interface in response to the third operation, wherein the third interface comprises a fifth image and a sixth image, the fifth image is acquired by the first camera with the zoom ratio of the first camera adjusted, and the sixth image is acquired by the second camera with the zoom ratio of the second camera adjusted.

12. The method of claim 11, wherein a fifth proportion is a proportion of a target object region in the fifth image to the fifth image, a first proportion difference is a difference between the fifth proportion and the third proportion, a sixth proportion is a proportion of a target object region in the sixth image to the sixth image, a second proportion difference is a difference between the sixth proportion and the fourth proportion, an absolute value of a difference between the first proportion difference and the second proportion difference is less than a first threshold, and an absolute value of the first proportion difference and an absolute value of the second proportion difference are both greater than a second threshold.

13. The method of claim 11, wherein before displaying the third interface, the method further comprises:
detecting a fourth operation performed on a sixth control;
starting to record a video in response to the fourth operation; and
displaying a dual-view recording interface that comprises a first region and a second region, wherein the first region is configured to display the images acquired by the first camera, and the second region is configured to display the images acquired by the second camera.

14. The method of claim 13, wherein the first camera comprises a front-facing camera, and the second camera comprises a rear-facing camera.

15. The method of claim 14, wherein the target object region comprises a human face region of a shot object.

16. The method of claim 11, wherein after displaying the third interface, the method further comprises:
detecting a fourth operation performed on a sixth control;
starting to record a video in response to the fourth operation; and
displaying a dual-view recording interface that comprises a first region and a second region, wherein the first region is configured to display the images acquired by the first camera, and the second region is configured to display the images acquired by the second camera.

17. An electronic device, comprising:
one or more processors;
a plurality of cameras coupled to the one or more processors;
a display coupled to the one or more processors; and
a memory configured to store a instructions that, when executed by the one or more processors, cause the electronic device to be configured to:
detect a first operation performed on a first control on the display;
enter a dual-view recording mode in response to the first operation, and acquire images based on a first camera and a second camera of the plurality of cameras;
display a first interface that comprises a first image and a second image, wherein a proportion of a target object region in the first image to the first image is a first proportion, a proportion of a target object region in the second image to the second image is a second proportion, and an absolute value of a difference between the first proportion and the second proportion is a first value; and
display a second interface that comprises a third image and a fourth image, wherein the second interface is displayed after a zoom ratio of the first camera or the second camera is adjusted, a proportion of a target object region in the third image to the third image is a third proportion, a proportion of a target object region in the fourth image to the fourth image is a fourth proportion, and an absolute value of a difference between the third proportion and the fourth proportion is a second value,
wherein the first image and the third image are acquired by the first camera,
wherein the second image and the fourth image are acquired by the second camera, and
wherein the second value is less than the first value.

18. The electronic device of claim 17, wherein the second interface is displayed is in response to a second operation performed on the first interface.

19. The electronic device of claim 18, wherein the first interface comprises a second control and a third control, the second control is configured to adjust the zoom ratio of the first camera, the third control is configured to adjust the zoom ratio of the second camera, each zoom ratio represents a degree of change in a focal length of a respective camera, and detecting the second operation and displaying the second interface comprises:
- detecting the second operation performed on the second control, and displaying the second interface, wherein the fourth proportion is equal to the second proportion, and the third proportion is not equal to the first proportion; or
- detecting the second operation performed on the third control, and displaying the second interface, wherein the fourth proportion is not equal to the second proportion, and the third proportion is equal to the first proportion.

20. A non-transitory computer-readable storage medium, comprising computer instructions that, when executed by one or more processors of an electronic device, cause the electronic device to be configured to:
- detect a first operation performed on a first control;
- enter a dual-view recording mode in response to the first operation, and acquire images based on a first camera and a second camera;
- display a first interface that comprises a first image and a second image, wherein a proportion of a target object region in the first image to the first image is a first proportion, a proportion of a target object region in the second image to the second image is a second proportion, and an absolute value of a difference between the first proportion and the second proportion is a first value; and
- display a second interface that comprises a third image and a fourth image, wherein the second interface is displayed after a zoom ratio of the first camera or the second camera is adjusted, a proportion of a target object region in the third image to the third image is a third proportion, a proportion of a target object region in the fourth image to the fourth image is a fourth proportion, and an absolute value of a difference between the third proportion and the fourth proportion is a second value,
wherein the first image and the third image are acquired by the first camera,
wherein the second image and the fourth image are acquired by the second camera, and
wherein the second value is less than the first value.

* * * * *